United States Patent
Almeida

(10) Patent No.: US 10,642,970 B2
(45) Date of Patent: May 5, 2020

(54) VIRUS IMMUNE COMPUTER SYSTEM AND METHOD

(71) Applicant: John Almeida, Plano, TX (US)

(72) Inventor: John Almeida, Plano, TX (US)

(*) Notice: Subject to any disclaimer, the term of this patent is extended or adjusted under 35 U.S.C. 154(b) by 212 days.

(21) Appl. No.: 16/005,399

(22) Filed: Jun. 11, 2018

(65) Prior Publication Data

US 2019/0180026 A1 Jun. 13, 2019

Related U.S. Application Data

(63) Continuation-in-part of application No. 15/839,450, filed on Dec. 12, 2017.

(51) Int. Cl.
| | | |
|---|---|---|
| *H04L 9/06* | (2006.01) |
| *H04L 9/08* | (2006.01) |
| *H04L 9/32* | (2006.01) |
| *G06F 21/51* | (2013.01) |
| *G06F 21/56* | (2013.01) |
| *G06F 21/54* | (2013.01) |
| *G06F 8/61* | (2018.01) |

(52) U.S. Cl.
CPC ............. *G06F 21/51* (2013.01); *G06F 8/61* (2013.01); *G06F 21/54* (2013.01); *G06F 21/56* (2013.01); *H04L 9/0894* (2013.01); *G06F 2221/033* (2013.01)

(58) Field of Classification Search
CPC ......... H04L 9/006; G06F 21/72; G06F 21/73; G06F 21/57; G06F 21/602; G06F 21/6209
USPC ......................................................... 713/189
See application file for complete search history.

(56) References Cited

U.S. PATENT DOCUMENTS

| | | |
|---|---|---|
| 4,757,534 A | 7/1988 | Matyas et al. |
| 4,847,902 A | 7/1989 | Hampson |
| 6,212,635 B1 | 4/2001 | Reardon |
| 6,941,284 B2 | 9/2005 | DeFilippo et al. |

(Continued)

FOREIGN PATENT DOCUMENTS

JP 2016048951 A 4/2016

OTHER PUBLICATIONS

Korean Intellectual Property Office, Written Opinion of the International Searching Authority on PCT/US2018/051665, the PCT counterpart of this '399 application, Feb. 12, 2019, 189 Cheongsa-ro, Seo-gu, Daejeon, 35208, Republic of Korea.

(Continued)

*Primary Examiner* — Haresh N Patel
(74) *Attorney, Agent, or Firm* — Louis Ventre, Jr.

(57) ABSTRACT

A method and apparatus prevents hacker code from infecting an application program by requiring decryption of the application program prior to running the application program on a computer. The method includes steps of: providing a security device that is a separate unit from components necessary to operate the computer; storing a symmetric private key on the security device; using the device symmetric private key to produce an encrypted application program upon first installation; thereafter decrypting that part of the encrypted application program needed implement a command to run the application program; and, decrypting, on the fly, only those follow-on parts of the encrypted application program needed to perform functions called for during operation of the application program.

11 Claims, 22 Drawing Sheets

(56) References Cited

U.S. PATENT DOCUMENTS

| | | | |
|---|---|---|---|
| 7,228,436 B2 | 6/2007 | Kawaguchi | |
| 7,233,997 B1* | 6/2007 | Leveridge | G06F 21/33 |
| | | | 709/217 |
| 9,189,627 B1 | 11/2015 | Islam | |
| 2002/0029347 A1 | 3/2002 | Edelman | |
| 2002/0077177 A1* | 6/2002 | Elliott | A63F 13/12 |
| | | | 463/40 |
| 2003/0177422 A1* | 9/2003 | Tararoukhine | H04L 41/00 |
| | | | 714/48 |
| 2004/0105546 A1* | 6/2004 | Chernyak | H04L 9/3073 |
| | | | 380/259 |
| 2006/0002562 A1* | 1/2006 | Berenstein | H04L 9/0825 |
| | | | 380/278 |
| 2006/0036861 A1* | 2/2006 | Chernyak | H04L 9/0841 |
| | | | 713/171 |
| 2006/0155988 A1* | 7/2006 | Hunter | G06F 21/575 |
| | | | 713/164 |
| 2007/0234428 A1* | 10/2007 | Rash | G06F 21/552 |
| | | | 726/25 |
| 2008/0141381 A1* | 6/2008 | Walkoe | G06F 21/10 |
| | | | 726/28 |
| 2008/0320097 A1* | 12/2008 | Sawicki | G06F 3/0607 |
| | | | 709/216 |
| 2009/0254762 A1* | 10/2009 | Priel | G06F 21/79 |
| | | | 713/193 |
| 2009/0293130 A1* | 11/2009 | Henry | G06F 21/74 |
| | | | 726/26 |
| 2009/0293132 A1* | 11/2009 | Henry | G06F 21/72 |
| | | | 726/27 |
| 2009/0319769 A1* | 12/2009 | Betouin | H04L 9/0861 |
| | | | 713/150 |
| 2010/0017623 A1 | 1/2010 | Ogram | |
| 2011/0035813 A1 | 2/2011 | Trantham | |
| 2011/0083197 A1 | 4/2011 | Claudatos et al. | |
| 2011/0113235 A1 | 5/2011 | Erickson | |
| 2011/0219241 A1 | 9/2011 | Takeda | |
| 2013/0145105 A1* | 6/2013 | Sawicki | G06F 3/0619 |
| | | | 711/147 |
| 2013/0151653 A1* | 6/2013 | Sawicki | G06F 21/522 |
| | | | 709/216 |
| 2014/0075517 A1 | 3/2014 | Alrabady et al. | |
| 2014/0108786 A1* | 4/2014 | Kreft | G06F 21/71 |
| | | | 713/156 |
| 2016/0078437 A1* | 3/2016 | Tahon | H04L 9/14 |
| | | | 705/77 |
| 2016/0378690 A1 | 12/2016 | Kiperberg et al. | |
| 2017/0220330 A1 | 8/2017 | Soini et al. | |

OTHER PUBLICATIONS

Korean Intellectual Property Office, International Search Report of the International Searching Authority on PCT/US2018/051665, the PCT counterpart of this '399 application, Feb. 12, 2019, 189 Cheongsa-ro, Seo-gu, Daejeon, 35208, Republic of Korea.

Korean Intellectual Property Office, Written Opinion of the International Searching Authority on PCT/US2018/051196, dated Jan. 3, 2019, 189 Cheongsa-ro, Seo-gu, Daejeon, 35208, Republic of Korea.

Korean Intellectual Property Office, International Search Report of the International Searching Authority on PCT/US2018/051196, dated Jan. 3, 2019, 189 Cheongsa-ro, Seo-gu, Daejeon, 35208, Republic of Korea.

* cited by examiner

700 — COMPUTER VIRUS 710 | GOOD SOFTWARE CODE 720

FIG. 15    CODE INJECTION HACKING
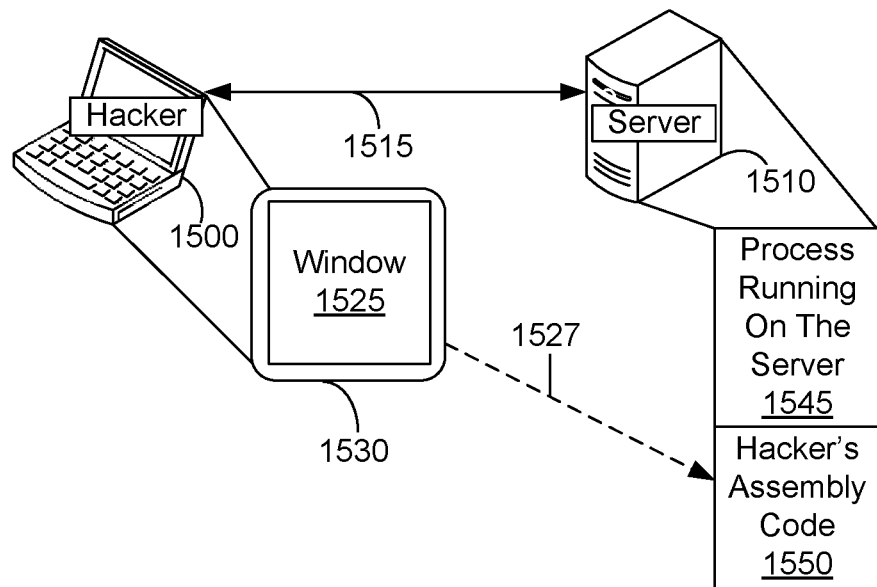
FIG. 16    CODE EXECUTION OF THE PRIOR ART
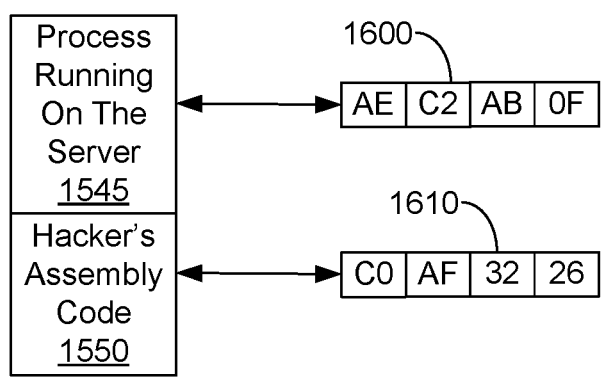

| |
|---|
| Method: method for preventing hacker code from infecting an application program     2400 |

| |
|---|
| Accessing step: accessing a computer comprising a second-non-transitory computer storage medium; a random access memory; an address bus; a central processing unit; and an operating system, the operating system stored in the second-non-transitory computer storage medium of the computer     2401 |

| |
|---|
| Providing step: providing a security device comprising a first-non-transitory computer storage medium, said security device being a separate unit from components necessary to operate the computer     2405 |

| |
|---|
| Storing step: storing a symmetric private key on the security device, the symmetric private key being symmetric in that it is usable for encryption and decryption of the application program stored in the random access memory of the computer     2410 |

| |
|---|
| Using step: using the symmetric private key to produce an encrypted application program upon first installation of the application program on the computer, the encrypted application program comprising encrypted operational instructions needed to run the application program, such that after such first installation, the encrypted application program is an only installed version of the application program on the computer     2415 |

| |
|---|
| Loading step: upon receiving a command to run the application program, loading the encrypted application program into the random access memory of the computer     2420 |

| |
|---|
| Decrypting step: requiring the central processing unit to decrypt, using the symmetric private key, that part of the encrypted application program needed implement the command to run the application program     2425 |

| |
|---|
| Requiring step: requiring the central processing unit to decrypt, on the fly, only those follow-on parts of the encrypted application program needed to perform functions called for during operation of the application program     2435 |

FIG.24

VIRUS IMMUNE COMPUTER SYSTEM AND METHOD

CROSS-REFERENCE TO RELATED APPLICATIONS

This application is a continuation-in-part of application Ser. No. 15/839,450, filed 12 Dec. 2017, which is hereby incorporated by reference herein in its entirety.

TECHNICAL FIELD

In the field of information security, a system and method is disclosed to prevent the execution of hacker code on a computer, improving the function, operation, and security of data on the computer.

BACKGROUND ART

Currently, computer programs (also referred to as executable code) are configured to be executed in a specific operating system and an executable code for a specific operating system can be executed in any machine running that specific operating system.

Therefore, any piece of executable code, malicious or not, for specific operating system will be executed in any computer running that operating system. It is done this way to enable a single program (i.e., executable code), to be written once and executed in any machine running the same operating system. This is the currently in use mechanism which lays in the core of currently in-use computer technology (e.g., the combination of hardware/software), which we use in our everyday lives.

The vast majority of living humans in every nation of the world uses a computer of some sort, every single day—be it in the form of a server computer, a laptop computer, a desktop computer, a cellphone, a pad computer or any device which make the use of computer technology: hardware and software.

In the developed world, most humans are so dependent on computers, helping us with all kind of tasks in our daily lives that most cannot function properly without a computer's help. Many are not now able to travel from one city's location to another without the use of electronic maps in our mobile devices.

Most of the computer programs (also termed software applications or just applications) used are for our wellbeing, and we all are glad for their existences. But there are other kinds of adverse applications that are programmed for the single purpose, to create havoc and disruption in our daily lives. And they are called computer viruses, computer worms, adware, fishing software, ransomware, etc. (each such adverse application may be referred to herein as hacker code, a computer virus, or a virus).

In cryptography, encryption is the process of encoding a message or information in such a way that only authorized parties can access it. Encryption does not in itself prevent interference, but denies the intelligible content to a would-be interceptor. In an encryption scheme, the intended information or message, referred to as plaintext, is encrypted using an encryption algorithm, generating cipher-text that can only be read, if decrypted.

For technical reasons, an encryption scheme usually uses a pseudo-random encryption key generated by an algorithm. It is in principle possible to decrypt the message without possessing the key, but, for a well-designed encryption scheme, considerable computational resources and skills are required, which sometimes, can take a great length of time in the number of many years of computational prowess using very expensive and powerful computers, which in many cases, is not feasible or economically possible. But on the other hand, an authorized message recipient possessing the decryption key can easily decrypt the message using the key supplied by the originator/message's sender to the message recipient.

Basically, encryption is a form for hiding a message as not to make its actual/original content available to an intermediary which is not supposed to know the actual message/content. For instance, if the message would have been: "9", and the pre-agreed upon method was to multiply the value of "7" to the message before it was sent, then once "7" is multiplied to "9" the result will be "63". Anyone reading this message will not know that the actual value is "9", but once the intend recipient receives the value "63" all that will be needed will be to divide the received value "7" by "63", and the result will be "9"—the original value.

This example, while simplistic, gives an idea how encryption works. In an actual computer encryption, a sophisticated method would be preferable. Some such methods may use the computer's logical functions or a sophisticated mathematical algorithm. It should be recognized that any kind of available encryption mechanism in use today or to be invented in the future can be used to achieve the purpose of encrypting a non-encoded software code and to decrypt an encrypted one. But for the sake of full disclosure, a more complex format used by the computer will be explained herein.

Software installation and the behavior of the operating system (120) is altered using the disclosed methods and will be different from the operating systems of the prior art currently known or in use. With the prior art operating systems, the operating system gets an un-encrypted software code and installs it on the computer by creating all the required procedures for its later execution, then saving it unencrypted on the computer's non-transitory storage.

Software execution of the prior art involves acting on user input to request that the computer, upon which the unencrypted software is installed, engage the operating system to read software executable code and cause the central processing unit to execute it, thus, initiating the software's operation.

Computer infection of the prior art software is possible since, any program once installed in the computer is in a single format. A virus can, therefore, be installed and executed the same as any other program and is usually introduced into the computer without the user's awareness, or the operating system sensing or reporting anything abnormal.

In virus execution under the prior art, the central processing unit does not distinguish what kind of software code being executed, it may be a good code (e.g., an accounting software) or a bad code (e.g., a virus), and therefore, a virus can be executed without the user's awareness, or the operating system sensing or reporting anything abnormal.

SUMMARY

A method prevents hacker code from infecting an application program by requiring decryption of the application program prior to running the application program on a computer. The method includes steps of: providing a security device that is a separate unit from components necessary to operate the computer; storing a device symmetric private key on the security device; using the symmetric private key to produce an encrypted application program upon first installation, such that after such first installation, the encrypted application program is the only installed version of the application program on the computer; thereafter loading the encrypted application program into the random access memory of the computer; decrypting that part of the encrypted application program needed implement a command to run the application program; and, using the symmetric private key to decrypt, on the fly, only those follow-on parts of the encrypted application program needed to perform functions called for during operation of the application program.

Optional steps include: producing a modulus value by causing the central processing unit to perform a modulus operand between an address bus value and a length of the symmetric private key to derive a remainder, adding a value of one to the remainder deriving a summed remainder, using the summed remainder to locate a byte location of the symmetric private key; using the modulus value to point to a byte value in the symmetric private key; requiring the central processing unit to use the byte value for decryption of the encrypted byte of the application program stored in the computer random access memory addressed by the value at the address bus of the central processing unit, and precluding the computer from running any part of the application program that has not been first encrypted with the device symmetric private key.

Additional optional steps include: receiving a hacker code on the computer, the hacker code containing a non-encrypted software instruction that if executed would implement an unwanted operational command; retaining the hacker code only in the random access memory of the computer along with the encrypted application program; receiving a request from the central processing unit to execute the non-encrypted software instruction of the hacker code stored in the random access memory of the computer; decrypting the non-encrypted software instruction of the hacker code using the symmetric private key, said decrypting producing a non-functional software instruction; and terminating the attempted execution of the non-functional software instruction.

Additional optional steps include: preventing access to the device symmetric private key after the device symmetric private key is successfully used to produce the encrypted application program, unless express authorization is first obtained; limiting the security device to a microchip integrated into a motherboard of the computer, said microchip not having a dedicated central processing unit; preventing access to the device symmetric private key by producing and sending an automated signal from an operating system of the computer to the security device, by acting on manual input by a user at said computer, producing and sending an automated signal from an basic input and output system of the computer to the security device, by automatically using a tristate switch, or by causing the operating system to change a value in a flag to one recognized as a command to prevent such access.

Additional optional steps include: limiting the non-transitory computer storage medium of the security device to an electronic chip or a removable compact disk.

Additional optional steps include: hosting the security device in an electronic chip integrated into the computer; hosting a first-electronic tristate switch in the electronic chip; and activating the first-electronic tristate switch in order to prevent access to the device symmetric private key.

Additional optional steps include: hosting a second-electronic tristate switch in the electronic chip; and activating the second-electronic tristate switch in order to prevent reading of the device symmetric private key from the read-access memory of the computer.

A preferred security device according to the disclosure herein is for improving operation of a computer to provide it immunity from infection of a software program by a software virus or in memory software code injection. The security device includes: a first-non-transitory computer storage medium installed within a unit that is separate from components necessary for the operation of the computer; a symmetric private key usable for encryption and decryption of a software program, the symmetric private key stored on the first-non-transitory computer storage medium within the unit; a second-non-transitory computer storage medium that is necessary for operation of the computer, the second-non-transitory computer storage medium storing computer code operable to: enable the computer to which the unit is connected to use the symmetric private key to encrypt a software program upon first installation of the software program and thereby create a first-encrypted software program; require the computer to use the symmetric private key upon each startup of the first-encrypted software program to decrypt the first-encrypted software program to produce a first-decrypted software program; execute the first-decrypted software program on the computer; and prevent access to the symmetric private key after the symmetric private key is first accessed to produce the first-decrypted software program, unless express authorization is first obtained.

Optionally, the security device includes computer code that is further operable to preclude running on the computer any software program that has not been encrypted with the symmetric private key.

Optionally, the first-non-transitory computer storage medium of the security device is incorporated into a component such as an electronic chip, a computer board, a wireless communication device, a central processor unit, and a universal serial bus device.

Optionally, the security device includes an electronic chip incorporating the unit. It further includes an electronic tristate switch in the electronic chip, and the electronic chip configured to activate the electronic tristate switch to prevent transfer of the symmetric private key from the first-non-transitory computer storage medium a second time while the electronic chip is powered-up.

An alternative preferred method, as disclosed herein, is for improving operation of a computer to provide the computer with immunity from infection of a software program by a software virus or by memory software code injection. This alternative preferred method includes steps of: hosting an operating system in a non-transitory computer storage medium accessible by a computer; receiving at the computer an encrypted device symmetric private key through a network connection; decrypting the encrypted device symmetric private key on the computer to derive a decrypted device symmetric private key; encrypting a software program using the decrypted device symmetric private key upon first installation of the software program and thereby create an encrypted software program that is the only installed version of the software program on the computer; when executing a command to start the software program, requiring the operating system to use the decrypted device symmetric private key to decrypt a first part of the encrypted software program necessary to start the software program; requiring the computer to use the decrypted device symmetric private key to subsequently decrypt any second part of the encrypted software program that is needed during operation of the first part; and precluding the operating system from running any executable code that has not been previously encrypted with the decrypted device symmetric private key.

Optionally the alternative preferred method includes a step of storing the first part and any second part that is decrypted in a random access memory accessible by the computer.

A second alternative preferred method, as disclosed herein, includes steps for improving the operation of a computer to provide the computer with immunity from infection of a software program by a software virus or by memory software code injection. This second alternative preferred method includes steps of: hosting an operating system in a non-transitory computer storage medium accessible by a computer; receiving at the computer an encrypted device symmetric private key through a network connection; decrypting the encrypted device symmetric private key on the computer to derive a decrypted device system symmetric private key; encrypting a software program using the decrypted device symmetric private key upon first installation of the software program and thereby create an encrypted software program that is the only installed version of the software program on the computer; when executing a command to start the software program, requiring the operating system to use the decrypted device symmetric private key to decrypt a first part of the encrypted software program necessary to start the software program; requiring the computer to use the decrypted device symmetric private key to subsequently decrypt any second part of the encrypted software program that is needed during operation of the first part; and storing the first part and any second part that is decrypted in a random access memory accessible by the computer.

Optionally, the second alternative preferred method includes a step of precluding the operating system from running any executable code that has not been previously encrypted with the decrypted device symmetric private key.

Technical Problem

Any piece of executable code programmed for one operating system will be able to run in any computer processing the operating system, and a computer virus designed to be executed in one operating system (e.g. MICROSOFT WINDOWS) will run in any computer running the WINDOWS operating system. And, if the executable code happens to be a virus, once it is programmed using a computer running WINDOWS, it will run in any computer with the WINDOWS operating system.

The reason that this happen is for the archaic way that operating system functions, it will not distinguish between a bad and good executable code.

Computer virus take advantage of this flaw, causing billions of dollars in loss around the globe and at present, no solution is available to stop their spread. When a virus infects one computer, it can easily infect any number of other computers, spreading from computer to computer. Then in many times, the infected computers are used to perform a coordinated cyberattack at a specific location Denial Of Service attack (i.e. the common acronym is DOS), server computer or website.

With the passing of time, hackers have become more and more prominent globally and they are always in search for means to cause the greatest damage possible. And once a compromised server falls to a hacker's handiwork, the loss of data and intellectual property of the compromised server sometimes reaches into the millions of dollars. In some cases, a hacker's code can bring down an organization. And other times, it is capable of influencing politically—possibly changing the course of elections and the freedom of society.

Hacker code is introduced into a computer by a cyberattack, direct hacking, phishing, etc., on the daily basis around the world. Hacker code can cause a disruption in the political process. One example of such disruption is the theft and release of information pertaining to the U.S. Democratic Party, which was reportedly done to influence the US Presidential Election of 2016.

A number of global cyberattacks, introducing hacker code in the form of "ransomware" has reportedly crippled government and business operation across 74 countries in 2017. Once a computer is infected with ransomware, the virus encrypts the files of the infected computer. Then, the hackers controlling the ransomware, demand to be paid to restore the infected computer.

Presently, the way to deal with computer viruses is by creating an antivirus software which inspects the computer's behaviors while working in conjunction with the computer's operating system, inspecting files when they are created, opened and read. For an antivirus to work, it first needs to have the virus structure and this is only possible after it becomes well know and after it had already spread to, and damaged many computers.

Antivirus software is of little use in preventing modern computer hacking before the first attack occurs. One problem is that once a hacker locates a software flaw running in the compromised computer, the hacker injects the adverse code, in many cases, specially designed for the compromised computer. Once the code is injected into the running process, the hacker is able to take full control of the computer. A problem with existing antivirus programs is that for one to be useful, it needs to scan the computer's memory to locate the invading virus. But, because the way the computer is designed, if any program scans a running process, that process may crash.

A virus is to a computer what a flu virus is to a human being, and antivirus is to a computer what a flu medicine is to a human.

What is missing from the state of the art and what is needed is, in effect, a computer virus vaccine which works as a shield to protect the computer before the virus or the computer hacking is activated. The prior art anti-viral programs are costly and cumbersome, requiring sophisticated software. They are computer medicine which is only effective after the infection or hacking has already happened.

Solution to Problem

The solution is a method and mechanism in the hardware and at the operating system level to stop the introduction of the virus in a computer by enabling each computer to have its own serial code like a human DNA, and once the serial code is used by the operating system to encode each piece of executable code, and therefore, a piece of encoded code from one computer will not execute in another computer, even when both computers are running the same piece of software running on the same operating system. Further, an executable code not having any kind of encoding, like viruses, will not be able to execute in a computer utilizing any of the devices or methods disclosed herein.

The solution lies in the limitation that only the authorized encrypted version of a program, namely its digital-DNA, can be executed on the computer. This limitation prevents any hacker code or other computer infection from running on the computer. Securing the computer in such way is not currently possible. And in the process offering the computer's owner peace of mind. The device and method disclosed will save a great deal of money in human resources devoted to computer security and in expenditures for all manner of antivirus software which will not now be needed by the computer owner.

Preferred methods and devices disclosed herein enable the protection of any kind of computing device at a low cost without slowing the device's functioning. It stops the running of injected code into a running software, and it also stops the running of computer virus of any kind. Preferred methods and devices disclosed herein are a computer vaccine shield, which stops virus infection and computer hacking before they happen.

Advantageous Effects

The devices and methods disclosed herein involve a hardware and software combination to encrypt/decrypt executable computer software code as to inhibit a code not part of the computer from being executed in the computer, thus, disabling the spread of all sorts computer virus and hacking by not allowing a foreign piece of software code to be installed or executed in the computer in the first place.

The methods and devices disclosed enable the user to avoid the expenses currently associated with antivirus software and other hacker prevention methods or devices which may currently be necessary to prevent a virus or unwanted code from executing in any kind of computer (e.g., personal, desktop, server, mobile, etc.): It has important uses for any network computer (whether or not wired, wireless, Internet, server, etc.) running any kind of Operating System (WINDOWS, UNIX, LINUX, APPLE Operating Systems, etc.).

Unlike current generation antivirus technology which may only become effective after the virus has already spread infecting and damaging many computers, the methods and devices disclosed herein prevent a computer virus from becoming an operable part of the computer by disabling it before it can cause any damage to the computer.

BRIEF DESCRIPTION OF DRAWINGS

The drawings illustrate preferred embodiments of the Virus immune computer system and method according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 7 illustrates a computer virus of the prior art.

FIG. 15 illustrates how code hacking can occur in the prior art.

FIG. 16 illustrates code execution of the prior art.

FIG. 24 diagrams a preferred embodiment of the method for preventing a hacker code from infecting an application program on a computer.

DESCRIPTION OF EMBODIMENTS

Figure 1A:
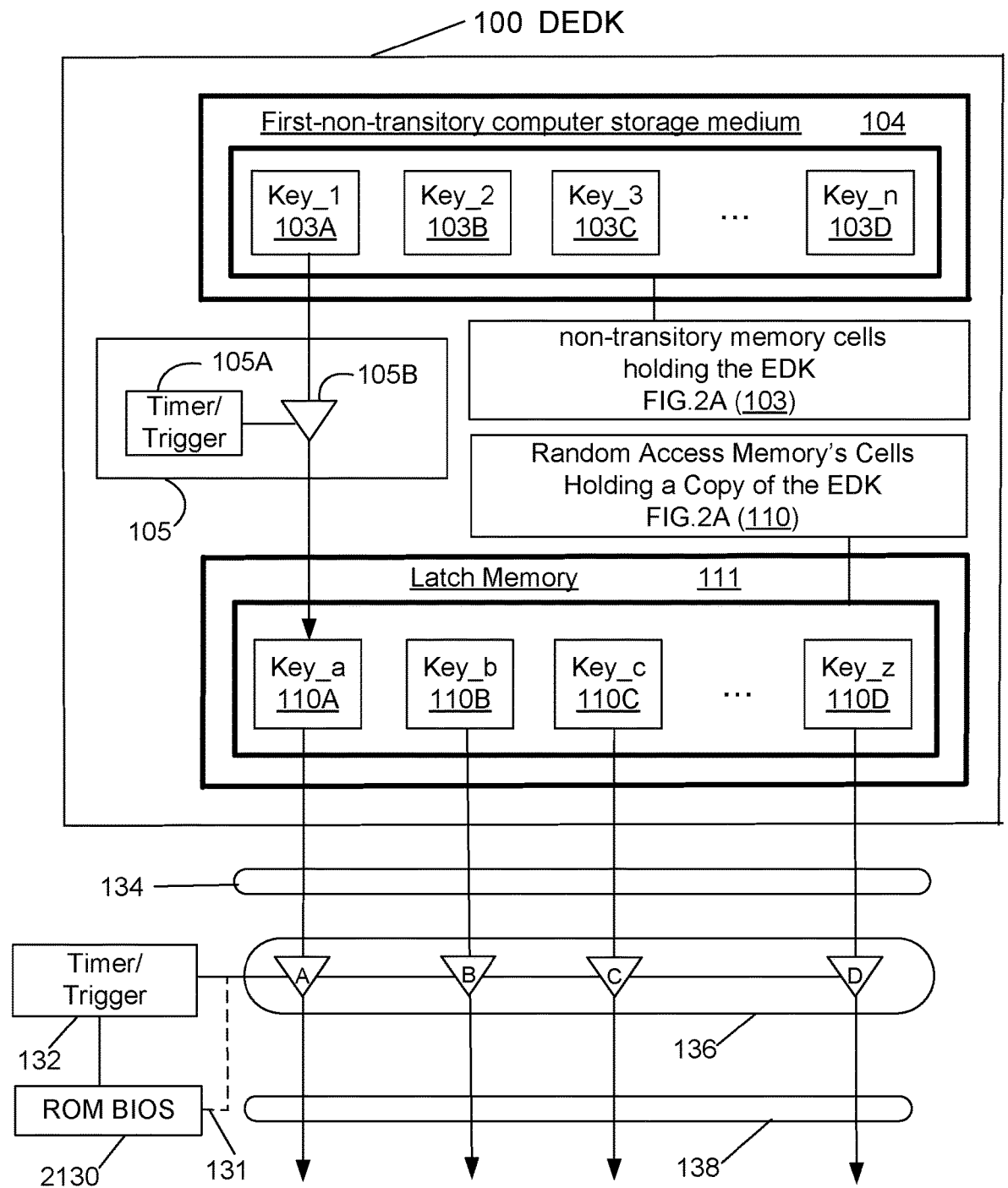
FIG. 1A illustrates the circuitry of the device-with-encryption-decryption-key.

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

This description is organized by first presenting a concise disclosure of the methods and devices followed by a more thorough detailed disclosure with examples.

Concise Disclosure

Methods and devices to prevent a hacker code infection of a computer are disclosed herein. A method (2400) is disclosed for preventing hacker code from infecting an application program on a computer (130). Method2 (2800) discloses its use for a computer operating system, which is also considered an application program. The terms "application program," "software application," "software application program," "software program (330)," "non-encoded software (310)," "software/driver" and "computer software file" are used interchangeably herein.

The method (2400) is a process for preventing any hacker code from infecting an application program, (i.e. a software program (330)) on a computer (130). Essentially, the method requires encrypting a software application, i.e., the non-encoded software (310)), producing the digital-DNA (300) upon first installation and then requires decryption of the software application (i.e. requires decryption of the digital-DNA (300)) prior to each instance of running the non-encoded software (310)) on the computer (130).

The method (2400) includes an accessing step (2401); a providing step (2405); a storing step (2410); a using step (2415); a loading step (2420); a decrypting step (2425); and a requiring step (2435). The method (2400) with the aforementioned seven steps is referred to as the base method that may be performed with other optional steps described below.

The accessing step (2401) is accessing a computer (130) comprising a second-non-transitory computer storage medium (350); a random access memory (925); an address bus; a central processing unit (905); and an operating system (120), the operating system (120) stored in the second-non-transitory computer storage medium (350) of the computer (130).

The providing step (2405) is providing a security device, which is also referred to herein as a device-with-encryption-decryption-key (100). The security device, (to wit, the device-with-encryption-decryption-key (100)), comprises a non-transitory computer storage medium, which is also referred to as a "first-non-transitory computer storage medium (104)." The security device, (to wit, the device-with-encryption-decryption-key (100)) may be integrated into the computer (130) or it may be a separate unit, such as a universal serial bus device, a computer board, or a mobile device (1430). Whether the device-with-encryption-decryption-key (100) is an independent component, or is a chip integrated into the motherboard of the computer (130), the security device, (i.e. the device-with-encryption-decryption-key (100) is a separate unit from the components needed to power-up or operate the computer (130) in the sense that if it were removed, the computer (130) could be started up without it.

The storing step (2410) involves storing a symmetric private key on the security device (i.e. on the device-with-encryption-decryption-key (100). The symmetric private key is also referred to as the "encryption/decryption key (103)." More specifically, it is storing the device symmetric private key (i.e., the encryption/decryption key (103)) in the first-non-transitory computer storage medium (104) in the security device, i.e., in the device-with-encryption-decryption-key (100). The symmetric private key is one or more cryptographic keys and comprises an algorithm used for cryptography. The symmetric private key uses the same cryptographic keys for both encryption of plaintext and decryption of ciphertext. The cryptographic keys are preferably identical for encryption and decryption. Additionally, there may be a simple transformation to go between the two cryptographic keys. In uses as described herein, the device symmetric private key is preferably symmetric in that it is usable for encryption and decryption of an application program stored in the random access memory of the computer.

The using step (2415) is using the symmetric private key (to wit, using the encryption/decryption key (103)) to produce an encrypted application program (i.e. produce the digital-DNA (300)) upon first installation of the application program on the computer. The encrypted application program, i.e., the digital-DNA (300), includes encrypted operational instructions needed to run the application program. After such first installation, the encrypted application program is the only installed version of the application program on the computer.

The loading step (2420) occurs upon receiving a command to run the application program. When this run command is executed on the computer, the loading step (2420) is performed which involves loading the encrypted application program into the random access memory (925) of the computer (130).

The decrypting step (2425) includes requiring the central processing unit in the computer (130) to decrypt that part of the encrypted application program needed to implement the command to run the application program. The decrypting step (2425) performs this step using the symmetric private key, (i.e. using the encryption/decryption key (103)), to decrypt as much of the encrypted application program as is needed to fully implement the run command.

Requiring a decryption step prior to running any application, is what ensures that no stray hacker code can be run on the computer (130) because will never be an option or opportunity to encrypt hacker code on the computer (130). Thus, decryption forces the operational hacker code to undergo the decryption process, which destroys its functionality as an executable code.

The requiring step (2435) includes requiring the central processing unit to decrypt, on the fly, only those follow-on parts of the encrypted application program needed to perform functions called for during operation of the application program. Thus, whenever the application requires code that has not already been decrypted, it draws that code from the encrypted application program and decrypts it for use as it is needed.

Additional optional steps in the method (2400) include a producing step (2505); a pointing step (2510); an incrementing step (2515); a hacking step (2520); a retaining step (2525); a running step (2530); a destroying step (2535); a terminating step (2540); a disabling step (2605); a limiting step (2610); a key-limiting step (2615); a memory-limiting step (2620); a storage-hosting step (2625); a precluding step (2630); a first-hosting step (2705); a first-activating step (2710); a second-hosting step (2715); and a second-activating step (2720).

When the producing step (2505) is added to the method, the producing step (2505) includes producing a modulus value by causing the central processing unit to perform a modulus operand between an address bus value and a length of the device symmetric private key to derive a remainder, adding the value of one to the remainder to derive the summed remainder, using the summed remainder to locate a byte location of the symmetric private key. When this step is performed, it is preferably followed by the pointing step (2510), which includes using the modulus value to point to a byte value in the symmetric private key. Then, when the pointing step (2510) is performed, it is preferably followed by the incrementing step (2515), which includes requiring the central processing unit to use the byte value for decryption of any follow-on parts of the encrypted byte of the application program stored in the computer random access memory addressed by the value at the address bus.

The hacking step (2520) includes receiving a hacker code on the computer, the hacker code containing a non-encrypted software instruction that if executed would implement an unwanted operational command. When this step is performed, it is preferably followed by 4 additional steps: The retaining step (2525); the running step (2530); the destroying step (2535); and the terminating step (2540).

The retaining step (2525) includes retaining the hacker code only in the random access memory of the computer along with the encrypted application program. In the present method disclosed, this is the location where all application programming code is stored as a predicate for executing it.

The running step (2530) includes receiving a request from the central processing unit to execute, i.e. to run, the non-encrypted software instruction of the hacker code stored in the random access memory of the computer. Such a request is a function of the hacker code and may be user initiated or be automatically triggered.

The destroying step (2535) includes decrypting the non-encrypted software instruction of the hacker code using the device symmetric private key. This step is a direct result of the running step (2530) seeking to execute the hacker code. The method disclosed requires a decryption operation on any executable code. Thus, the retaining step (2525) forces the hacker code to undergo a decryption process, thus rendering it inoperable. This steps thus converts hacker code to a non-functional software instruction.

The terminating step (2540) is the last step in this 5-step supplement to the base method. The terminating step (2540) includes the central processing unit terminating attempted execution of the non-functional software instruction because it has in fact become non-functional by virtue of the retaining step (2525).

The disabling step (2605) includes preventing access to the device symmetric private key after the device symmetric private key is successfully used to produce the encrypted application program, unless express authorization is first obtained. This disabling step (2605) prevents a hacker code from gaining access to the device symmetric private key to circumvent the method by encrypting the hacker code and forcing its storage in the random access memory.

The limiting step (2610) includes limiting the security device to a microchip integrated into a motherboard of the computer, said microchip not having a dedicated central processing unit. Thus, one embodiment can be implemented by having an integrated circuit in the motherboard of the computer. Such integrated circuit would still be required to meet the other limitations for the security device, just that it would be formed within as a non-removable component.

The key-limiting step (2615) specifies preferred alternate procedures with which access to the device symmetric private key can be prevented from being accessed. The key-limiting step (2615) includes preventing access to the device symmetric private key by implementing a procedure selected from the group consisting of: producing and sending an automated signal from an operating system of the computer to the security device; acting on manual input by a user at said computer, producing and sending an automated signal from an basic input and output system of the computer to the security device, automatically using a tristate switch and causing the operating system or the microchip to change a value in a flag to one recognized as a command to prevent such access.

The memory-limiting step (2620) includes limiting the non-transitory computer storage medium of the security device to non-transitory computer storage medium selected from the group consisting of an electronic chip, and a removable compact disk.

The storage-hosting step (2625) includes hosting the security device in an electronic chip integrated into the computer. Essentially, the storage-hosting step (2625) would enable the security device to be an electronic component that is built into the motherboard of the computer (130).

The precluding step (2630), which is optional, includes precluding the computer from running any part of the application program that has not been first encrypted with the device symmetric private key. This step prevents the execution of any code in the application program without that code having been first decrypted using the device symmetric private key. The precluding step (2630) is optional since some software modules, like operating system kernels and others which are not feasible to be encrypted, will not be turned into digital-DNA (300). Modern operating systems use digital signatures to certify their software modules and if encrypted, at the execution time the module will crash.

Additional optional steps in the method (2400) including a first-hosting step (2705); a first-activating step (2710); a second-hosting step (2715); and a second-activating step (2720).

The first-hosting step (2705) includes hosting a first-electronic tristate switch in the electronic chip. When this step is performed it is preferably followed by the first-activating step (2710). The first-activating step (2710) includes activating the first-electronic tristate switch in order to prevent access to the device symmetric private key. Such activation may be manual, such as user activated, or automatic by operation of electronic timing trigger to the first-electronic tristate switch.

When the first-hosting step (2705) and the first-activating step (2710) are performed, then preferably the method may further include the second-hosting step (2715) and the second-activating step (2720). The second-hosting step (2715) includes hosting a second-electronic tristate switch in the electronic chip. The second-activating step (2720) includes activating the second-electronic tristate switch in order to prevent reading of the device symmetric private key from the read-access memory of the computer.

A preferred device that implements the methods disclosed herein is a security device in the sense that it comprises first-non-transitory computer storage medium (104) storing an encryption/decryption key (103), which may be referred to herein as an EDK (encryption/decryption key). The security device may be referred to herein as a DEDK (device-with-encryption-decryption-key (100)).

The device-with-encryption-decryption-key (100) may be in the form of any peripheral or built in device, including as examples, an electronic microchip, a computer (130), a computer board/blade, a removable storage medium, a universal serial bus device, a circuit within the computer's central processing unit, or a mobile device connectible via BLUETOOTH, etc.

The purpose of the device-with-encryption-decryption-key (100) is to improve the functioning and operation of the computer (130) by providing the computer (130) with the means to block operability of a hacker's code (1550) that would otherwise be operable once injected into software program, i.e. once injected into the digital-DNA (300), installed on the computer (130). The device-with-encryption-decryption-key (100) provides immunity from an otherwise operable software viral infection after the first installation of the software program (330) on the computer (130). Use of the device-with-encryption-decryption-key (100) prevents operability on the computer (130) of any memory software code injection subsequent to first installation of the software program (330).

The encryption/decryption key (103) is a symmetric private key usable for encryption/decryption of a software program (330). This symmetric private key, namely the encryption/decryption key (103), is stored on the non-transitory computer storage medium which for purposes of distinguishing it from other memory is referred to as a first-non-transitory computer storage medium (104) that is installed within a unit (also referred to as a housing) that is separate from components necessary for the operation of the computer (130). The first-non-transitory computer storage medium (104) is a component part of the DEDK. The first-non-transitory computer storage medium (104) is not necessary for the operation of the computer (130).

The computer (130) includes a second-non-transitory computer storage medium (350). This second-non-transitory computer storage medium (350), unlike the first-non-transitory computer storage medium (104), is necessary for operation of the computer (130). The second-non-transitory computer storage medium (350) is used for storing computer code operable to accomplish at least 5 tasks:

A first task is to enable the computer (130) to which the unit is connected to use the device symmetric private key, namely the encryption/decryption key (103), to encrypt a software program (330) upon first installation of the software program (330) and thereby create a first-encrypted software program, termed and referred to herein as the Digital-DNA (300).

Figure 3:
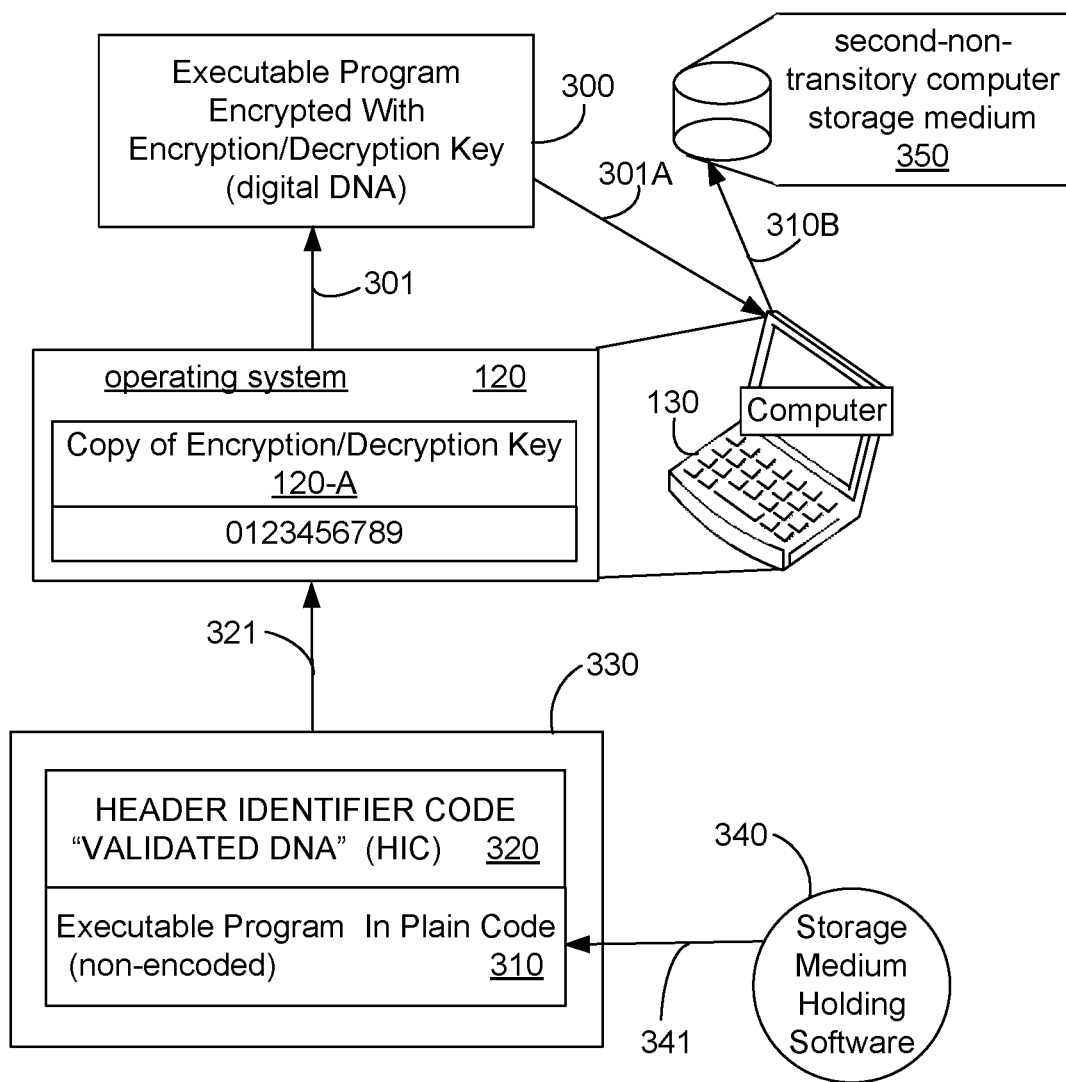
FIG. 3 illustrates the operating system using the encryption/decryption key to encrypt a non-encode program code producing the digital-DNA, then storing it on the computer's non-transitory computer storage medium.
Figure 8A:
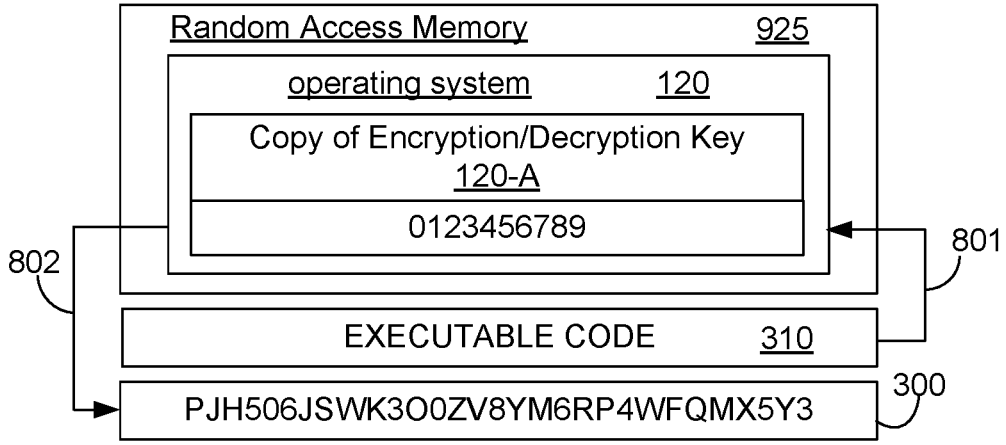
FIG. 8A illustrates the digital-DNA (also referred to as the encrypted software) saved in the computer.

FIG. 8A relates to FIG. 3, and illustrates an example of a preferred embodiment where the encrypted software file stored in the storage medium, the second-non-transitory computer storage medium (350) shown in FIG. 3, of the computer (130). The operating system (120) holds a copy of the encryption/decryption value of "0123456789" (in memory location (120-A)), which is used to encrypt the software program (330) which includes the optional-header-identification-code (320) and the non-encoded software (310). The executable program, i.e. the non-encoded software (310), may be referred to as the good executable software and the non-encoded software (310). Encryption of the software program (330) produces the digital-DNA (300), then saving the digital-DNA (300) into the second-non-transitory computer storage medium (350), shown in FIG. 3, of the computer (130).

If optional-header-identification-code (320) is used and it is not present or is not valid, at any moment the operating system (120) loads the non-encoded software (310) in the random access memory (925) of the computer (130), or, the operating system (120) loads the digital-DNA (300) in the random access memory (925) of the computer (130), the operating system (120) will halt the loading, and optionally, generate an error.

A second task is to require the computer (130) to use the device symmetric private key, namely the encryption/decryption key (103), upon each startup of the first-encrypted software program, namely the digital-DNA (300), to decrypt the digital-DNA (300) (i.e., the first-encrypted software program), to produce a first-decrypted software program, which is the same as non-encoded software (310) and the optional-header-identification-code (320) that is decrypted.

Figure 4:
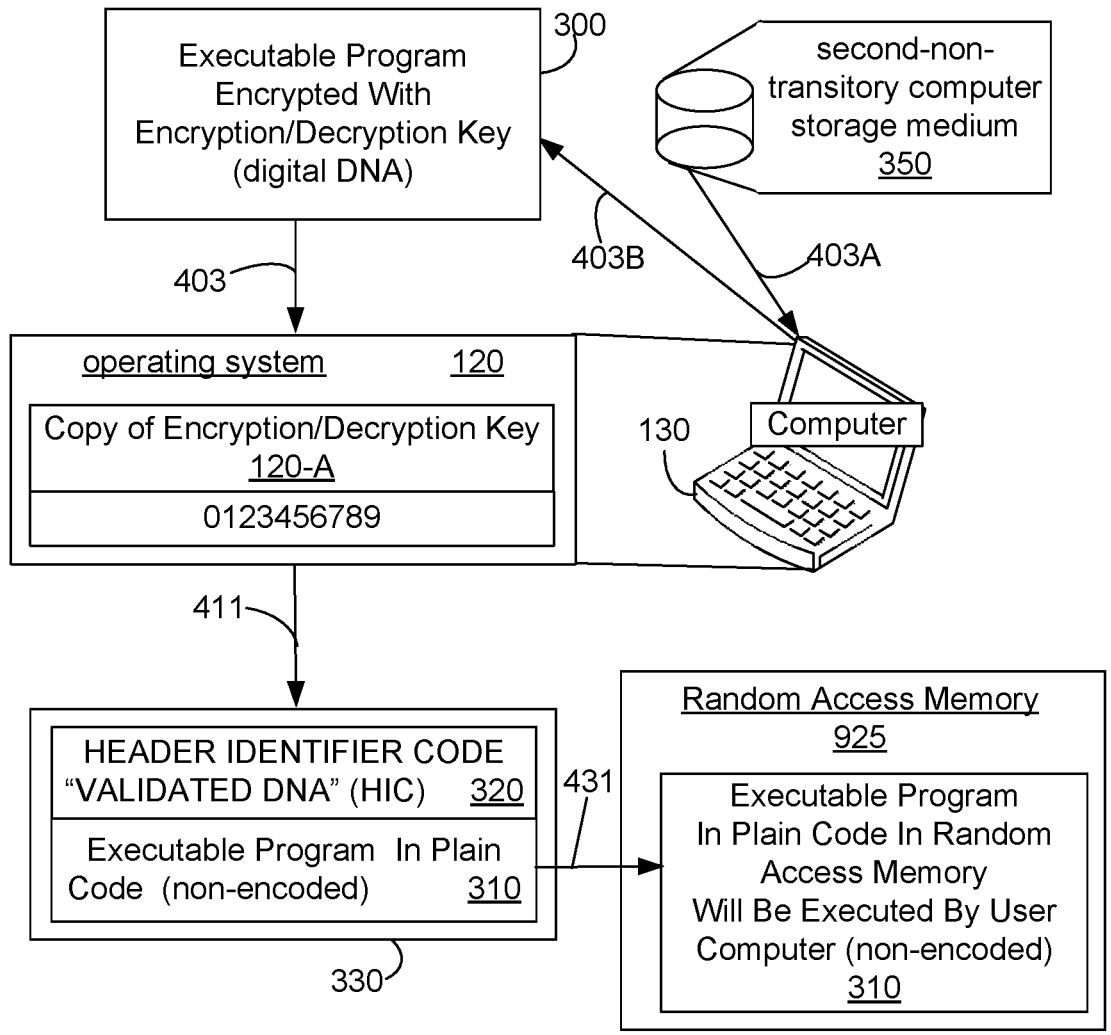
FIG. 4 illustrates the operating system using the encryption/decryption key to decrypt digital-DNA from FIG. 3.
Figure 8B:
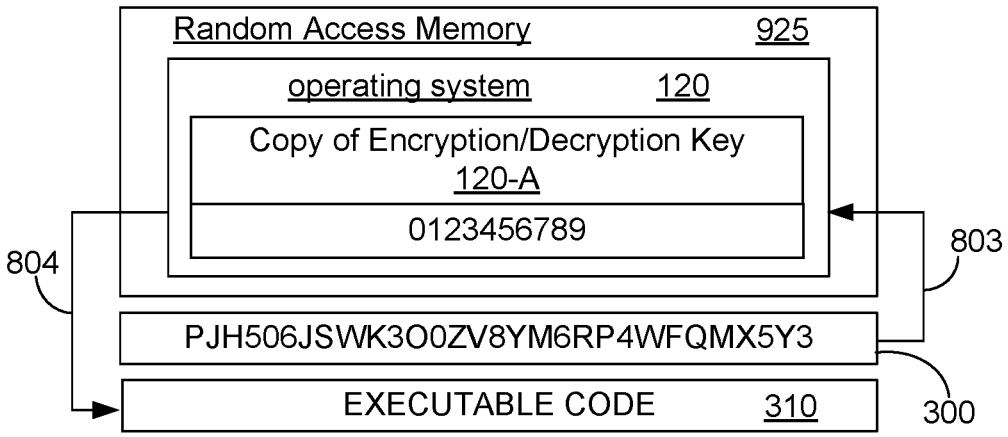
FIG. 8B illustrates the decryption of digital-DNA before it is executed by the central processing unit.

FIG. 8B relates to FIG. 4, and is an example of the second task, which is essentially the reversal of the first task shown in FIG. 8A. After the operating system (120) loads the digital-DNA (300), the operating system (120) decrypts the digital-DNA (300) using the value in memory location (120-A) of the encryption/decryption key (103) to derive the original software code, namely the non-encoded software (310). Then, the central processing unit (905) executes (also referred to as runs) the non-encoded software (310) in the random access memory (925) of the computer (130). And the central processing unit (905) of the computer (130), fetches the byte of the non-encoded software (310)), one at a time, for processing/execution.

A third task is to execute the first-decrypted software program on the computer (130).

The first three tasks can be summarized as the operating system (120) encrypting at installation time of a software program to produce the first-encrypted software program, i.e. the digital-DNA (300) or the encrypted software program. The operating system then saving the digital-DNA (300) (i.e., the first-encrypted software program, as shown in (see FIG. 8A)). Then, the operating system at runtime of the software program decrypts the digital-DNA (300) reproducing the non-encoded software (310) that the operating system/central processing unit understands, and then executes the non-encoded software (310) (see FIG. 8B).

A fourth task is to prevent access to the device symmetric private key (unless express authorization is first obtained) after the device symmetric private key is first accessed to produce the first-decrypted software program.

This fourth task prevents software of any kind having a direct access to the device-with-encryption-decryption-key (100). Access prevention eliminates the possibility that a hacker's code (1550) could be written with the specific purpose to read the encryption/decryption key (103) on the device-with-encryption-decryption-key (100), or to use the encryption/decryption key (103) to encrypt software code to run in the computer (130), i.e. hacker's code (1550).

A fifth task is to preclude running on the computer (130) any software program that has not been encrypted with the symmetric private key. This task assures that only encrypted application software is executable on the computer (130).

In some preferred embodiments, the first-non-transitory computer storage medium (104) incorporated into a component selected from the group consisting of an electronic chip, a computer board, a wireless communication device, i.e. the mobile device (1430), an encrypted encryption/decryption key stored in the computer (130) in the second-non-transitory computer storage medium (350), a central processor unit, a random access memory auxiliary (952), and a universal serial bus device. This component is also referred to as a dongle (2000).

In one preferred embodiment, the device-with-encryption-decryption-key (100), aka the security device, aka the DEDK, may be an electronic chip incorporating the unit. In this embodiment, it is also preferable to include timer/trigger (105A), which is itself electronic, in the electronic chip that is configured to activate the electronic tristate switch (105B) to prevent transfer of the device symmetric private key from the first-non-transitory computer storage medium (104) a second time to the latch memory (111) of the device-with-encryption-decryption-key (100) while the electronic chip is powered-up.

Latch memory, also called flip-flops, is a non-transitory electronic storage medium (also known as a memory device) which can store one bit of data for as long as the device is powered. A latch memory has a set/reset line which controls the setting of, or resetting of, the memory's content, a high or a low signal. While latch memory (111) is used as an example herein, it is intended that any type of non-transitory storage memory that will hold a value and enable the value to be cleared, is an acceptable substitute. Since each latch memory (111) stores one bit of data, eight of the latch memory (111) are required for each byte of the encryption/decryption key (103). For example, key_a (110A) requires eight of the latch memory (111) and the same applies to key_b (110B), key_c (110C), and key_z (110D).

An example of this is in FIG. 1A where gate control circuitry (105) comprises a timer/trigger (105A). An electronic tristate switch (105B) acts like any gate in a physical world where it will be closed or open. The electronic tristate switch (105B) acts like a light bulb switch which once closed, it lets electricity through the wires lighting the light bulb, and when opened, it turns off the light bulb. Similarly, the electronic tristate switch (105B) controls the flow of an electronic signal going in one direction when it is closed, and disables the flow of the electronic signal when it is open. The timer/trigger (105A) is an electronic circuitry used to fire a signal once something happens, in this particular example, a certain amount of time after the computer is turned on or reset—for instance, after a few milliseconds, or perhaps after a few seconds, or longer.

In an alternative embodiment, a security device, i.e. a device for storing a secure key which is used as input to a program running in the computer (130) which the device-with-encryption-decryption-key (100) is connected to. The term "secure key" means any value and includes as an example the encryption/decryption key (103).

The device-with-encryption-decryption-key (100) includes a first-non-transitory computer storage medium (104) installed within a unit that can be operationally connected to the computer (130). When used herein, "non-transitory computer storage medium" means and includes any computer readable medium that is formed of non-transitory tangible media and does not include transitory propagating signals. Operation of the computer (130) means being able to turn on the computer, being able to manipulate a mouse on a computer screen, and being able to make selections with the mouse or a keyboard. The unit being separate from components necessary for operation of the computer (130) means that the computer (130) will be able to start up without having to access the unit.

The unit is separate from components necessary for operation of the computer (130). In a preferred embodiment, the secure key usable as input data to computer code running on the computer (130) to which the security device is connected, the secure key stored on the first-non-transitory computer storage medium (104). In this embodiment, code for operation of the computer (130) is operable to: read a copy of secure key, that is the encryption/decryption key (103) from the latch memory (111) of the device-with-encryption-decryption-key (100) and; use the copied encryption/decryption key (110) as input data; and prevent access to the encryption/decryption key (103) a second time after the encryption/decryption key (103) is first accessed by the computer (130) to run any program.

Optionally, the non-transitory computer storage medium is incorporated into a component selected from the group consisting of an electronic chip, a computer (130) board, a central processing unit (905), a wireless communication device, i.e. the mobile device (1430), a random access memory auxiliary (952), and a universal serial bus device. This alternative embodiment may also optionally include an electronic chip incorporating the security device and an electronic tristate switch (105B) in the electronic chip that is configured to prevent access to the secure key a second time.

In another alternative embodiment, a security device is configured to decrypt software code stored in a random access memory (925) of the computer (130). The security device is further configured to prevent the hacker's code (1550) from being injected into a running process (1545) in a server (1510). The security device includes non-transitory computer storage medium, random access memory, a central processing unit, a data bus, and an address bus. The non-transitory computer storage medium includes a key usable for decrypting the encrypted program code stored in the random access memory. The central processing unit can be the same one needed for the operation of the server (1510) and not necessarily an independent unit only used by the security device. The key includes a plurality of bytes wherein each byte in the plurality of bytes has a byte value. The central processing unit is connected to random access memory through the data bus and the address bus. The central processing unit is programmed to: identify a designated location in the random access memory addressed by a value at the address bus; fetch an encrypted byte from the designated location stored in the random access memory of the computer; perform a modulus operand between the random access memory location value at the address bus and a length of the key to derive a remainder value; then adding the value of one to the derived remainder value, fetch the byte value of the byte in the plurality of bytes of the encryption/decryption key (103) key; use the byte value that is fetched to decrypt the encrypted byte fetched from the designated location at the read-access memory producing a decrypted byte; and, use the decrypted byte.

DETAILED DISCLOSURE

Throughout the examples of the methods and devices disclosed herein, a preferred common limitation is that only the operating system and/or a driver is able to access an encryption/decryption key, referred to hereinafter as encryption/decryption key (103) and use it. The term "operating system" is intended to have a broad scope and be interpreted to include the operating system and any authorized program like: a driver program, an installer program, login programs, etc. In this context, it is intended that reference to the "operating system" performing an action involving fetching and using of the encryption/decryption key (103) to mean and include action, by the authorized program operating within the operating system, to alone or in combination with the operating system do the fetching and using of the encryption/decryption key (103).

In preferred embodiments, the central processing unit (905) does the decryption. Use of the term "central processing unit" is intended to include any software like the operating system (120) and/or the software driver (935) and the macro operating system (955) and hardware like the random access memory auxiliary (952) or any hardware and/or software which will work in conjunction with the central processing unit (905) to realize the encryption/decryption of software in the computer (130) or the server (1510).

Figure 9:
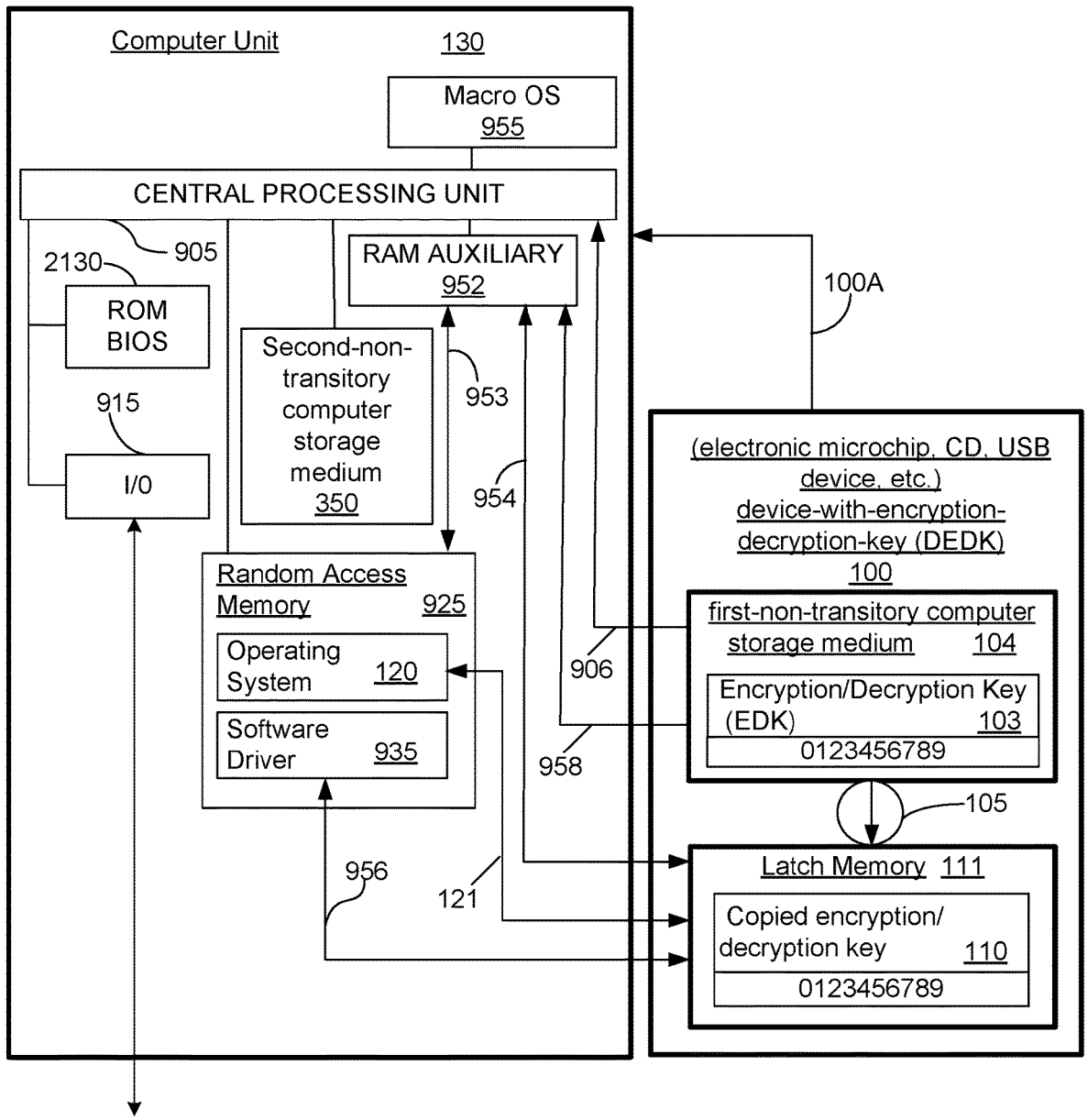
FIG. 9 illustrates a computer circuitry implementing the disclosed devices and methods.

Further, at times it will be mentioned the server (1510), and at other times the computer (130). But if the server (1510) is mentioned, it is to be broadly interpreted to include the computer (130). If the computer (130) is mentioned, it is to be broadly interpreted to include the server (1510). The teachings of FIG. 9 is to be broadly interpreted to include the server (1510), the computer (130), or any computing device having a central processing unit (905) executing any kind of program code. The use of the device-with-encryption-decryption-key (100) is to be broadly interpreted to be used in the server (1510), to be used in the computer (130), to be used in any computing device having a central processing unit executing any kind of program code.

If specified herein that a step of encryption or decryption is performed with the encryption/decryption key (103), then this step is intended to be broadly interpreted to include performance using the encryption/decryption key (103), or using the copy of encryption/decryption key (120-A). Also, if specified that the process of encryption or decryption is performed with the encryption/decryption key (110), then this process is intended to include its performance using the encryption/decryption key (103), or using the copy of the encryption/decryption key (120-A).

In preferred embodiments, each computer (130) has an encryption/decryption key (103) of its own. The encryption/decryption key (103) may only be accessed from the computer (130) with the device-with-encryption-decryption-key (100) by the operating system (120) of the computer (130) at the computer's power up or the reset of the computer (130). Once the operating system (120) accesses the encryption/decryption key (103), the operating system (120) clears the copy of the encryption/decryption key from the latch memory (111) of the device-with-encryption-decryption-key (100), so as to prevent any further program access to the device-with-encryption-decryption-key (100) and, thus, any second or subsequent reading of the encryption/decryption key (103).

Preferably, the electronic device-with-encryption-decryption-key (100) holding an encryption/decryption key (103) comprises a mechanism to enable it to make the encryption/decryption key (103) available to be read only once by the operating system and any other authorized program, including programs like: a driver or drivers and others that interface between the operating system and the device-with-encryption-decryption-key (100). Preferably, this will prevent any subsequent read performed by the operating system (120) of the computer (130), and a read by a combination of the operating system (120), driver(s), central processing unit (905), or basic input/output system (2130). The rules for subsequent reads of the encryption/decryption key (103), preferably apply relative to a driver's operation, to authorized program(s) and to the operating system. If the electronic device-with-encryption-decryption-key (100) holding an encryption/decryption key (103) is implemented within the central processing unit (905) or under a complete control of the central processing unit (905), then the disabling of the electronic device-with-encryption-decryption-key (100) is not necessary and the central processing unit (905) makes the encryption/decryption key (103) available to the operating system (120).

In some embodiments, a software driver (935) may gain access to the copied encryption/decryption key (110) instead of the operating system (120), or in addition to the operating system (120). And the software driver (935) may do all the encryption/decryption, passing the final end result to the operating system (120) for saving on the second-non-transitory computer storage medium (350) or to be executed by the central processing unit (905). The software driver (935) may fetch the copied encryption/decryption key (110) from the device-with-encryption-decryption-key (100) latch memory (111) and be responsible for clearing the copied encryption/decryption key (110) from the latch memory (111). Once the software driver (935) has read the copied encryption/decryption key (110), as requested by the operating system (120), then the software driver (935) can read the digital-DNA (300) from the second-non-transitory computer storage medium (350) of the computer (130). The software driver (935) can then decrypt the digital-DNA (300) and make the decrypted software program accessible to the operating system (120) as executable code (i.e. the non-encoded software (310))). Also, at installation time, the software driver (935) can use the copied encryption/decryption key (110) to encrypt software code producing an encrypted code (1710), namely, the digital-DNA (300), then passing the digital-DNA (300) to the operating system (120), then the operating system (120) stores the encrypted code (1710) and the software program (330) in a file in the second-non-transitory computer storage medium (350) in the computer (130), or in the computer (130) random access memory (925).

The operation of reading the copy of encryption/decryption key (103) from the latch memory (111) of the device-with-encryption-decryption-key (100) is preferably done only once by the computer (130) at the computer's power up, or at the computer's reset, or a program resetting the computer (130). After the first reading of the copied encryption/decryption key (110), whether by a program, or by the computer, the ability to transfer the encryption/decryption key (103) to the latch memory (111) for a second time is disabled. Such disabling precludes any other program from reading the copied encryption/decryption key (110) from the device-with-encryption-decryption-key (100), except at the computer's reset, or at the computer's power up, or a program's reset. After the copied encryption/decryption key (110) is read a first time from the latch memory (111), then the copied encryption/decryption key (110) is deleted from the latch memory (111). This deletion or clearing of the copied encryption/decryption key (110) from the latch memory (111) prevents a second copying from the device-with-encryption-decryption-key (100), thus preventing a hacker's code (1550) access to the copied encryption/decryption key (110). Such deletion and prevention may be accomplished automatically by the device-with-encryption-decryption-key (100) or by the component accessing the device-with-encryption-decryption-key (100). Preferably, such deletion and prevention is accomplished right after the software driver (935) and/or operating system (120) reads it from the latch memory (111). Upon reading of the copied encryption/decryption key (110) from the latch memory (111) by the operating system (120) or the software driver (935), the read encryption/decryption key value becomes the copied encryption/decryption key (120-A) under the control of the operating system (120) or the software driver (935), or both—once the term "operating system" is mentioned, it is to be broadly interpreted to include the software driver (935) or an authorized program as well. The term "software driver (935)" is intended to be broadly interpreted to include the operating system (120) or an authorized program when the context so permits.

After reading the copied encryption/decryption key (110) from the device-with-encryption-decryption-key (100), the process of encrypting and decrypting is preferably performed without any user intervention and without requiring a user to supply user's credentials like user's identification and password before the encryption/decryption initiation.

The operating system (120) preferably uses the copied encryption/decryption key (120-A) to encrypt a non-encoded software (310) so as to produce an encrypted program, namely the digital-DNA (300). The operating system (120) then stores the digital-DNA (300) in the second-non-transitory computer storage medium (350) of the computer (130). The operating system (120) then uses the copied encryption/decryption key (120-A) to decrypt the digital- DNA (300) to produce a non-encoded software (310). Then the central processing unit (905) fetches the non-encoded software (310) from the random access memory (925) of the computer and uses it.

In another embodiment, the operating system (120) fetches the digital-DNA (300) from the second-non-transitory computer storage medium (350) in the computer (130) and stores it in the random access memory (925) in the computer (130). And once the central processing unit (905) requests a byte of the Digital-DNA (300) from the random access memory (925) of the computer, the requested byte is decrypted and returned to the central processing unit (905) for use.

In an embodiment, once a user buys a device-with-encryption-decryption-key (100) that is detachable and it contains the encryption/decryption key (103). Then the user attaches the device-with-encryption-decryption-key (100) to the computer (130) operated by the user, and from the computer (130), the user registers the device-with-encryption-decryption-key (100) with the server computer (1000) of the manufacturer. At the registration time, the database table (1000A) of the server computer (1000) of the manufacturer already contains the optional software driver (1001); the serial-number (1002) of the device-with-encryption-decryption-key (100); the device-with-encryption-decryption-key-ID (1003) of the device-with-encryption-decryption-key (100), and the encryption/decryption key (103) which is a copy of the encryption/decryption key (103) of the device-with-encryption-decryption-key (100).

The user then provides to the operating system (120) of the computer (130) the user's identification, the user's password and the device-with-encryption-decryption-key-ID (1003) of the device-with-encryption-decryption-key (100).

Next: the operating system (120) sends through the first secure link (1010), the user provided information to the server computer (1000). Once the server computer (1000) matches the received device-with-encryption-decryption-key-ID of the device-with-encryption-decryption-key_ID with the device-with-encryption-decryption-key-ID (1003) stored in the server computer (1000) database table (1000A), the server computer (1000) adds to the already existing database table, the received user's ID (1005) and the user's password (1006) to the server computer (1000) database table (1000A), completing the registration. After registration, the server computer (1000) through the first secure link (1010), returns to the operating system (120) device-with-encryption-decryption-key-ID the optional software driver (1001) to be downloaded by the computer (130) which the device-with-encryption-decryption-key (100) is connected to, and the serial-number (1002).

The operating system (120) then fetches a copied encryption/decryption key (110) from the device-with-encryption-decryption-key (100) latch memory (111) and encrypts the optional software driver (1001) deriving an encrypted software driver (1065), the operating system (120) using the copy of the encryption/decryption key also encrypts the serial-number (1002) of the device, that was received, deriving the encrypted serial number (1045). Then the encrypted serial number (1045) is associated with the user provided device-with-encryption-decryption-key-ID (referred as copy-of-device-with-encryption-decryption-key-ID (1003A)) in a file (1040), then saved in second-non-transitory computer storage medium (350) of the computer (130) to which the device-with-encryption-decryption-key (100) is connect to. It is possible that the encrypted serial number (1045) and copy-of-device-with-encryption-decryption-key-ID (1003A) be saved in two files, instead of one.

If it happens that the user loses the original device-with-encryption-decryption-key (100) containing the encryption/decryption key (103), then the user can buy the new DEDK (1250) with the new DEDK non-transitory computer storage medium (1260). Then the new DEDK (1250) is placed (see the twenty-fifth arrow line (1200A)) into a cradle (1235) which may be attached (see the twenty-sixth arrow line (1200B)) to any universal serial bus port of the computer or any other port for attaching a peripheral to the computer (130).

Then, after the new DEDK (1250) is plugged into the cradle (1235) and the cradle connected to the computer (130), the user at the computer (130) initiates a connection through the second secure link (1200) with the server computer (1000) of the manufacturer processing the database table (1000A) and logs in with the server computer (1000) providing to the server computer (1000) the user's ID (1005), the user's password ((1006), and the device-with-encryption-decryption-key-ID (1003).

Then, after the server computer (1000) of the manufacturer matches the user provided login data, the server computer (1000) retrieves from the database table (1000A) the serial-number (1002) of the original device-with-encryption-decryption-key (100) and the encryption/decryption key (103) of the original device-with-encryption-decryption-key (100). Next, the server computer (1000) returns them through the second secure link (1200) to the operating system (120) of the computer (130). Next, the operating system (120) then matches the user's provided device-with-encryption-decryption-key-ID (1003) with the copy-of-the-device-with-encryption-decryption-key-ID (1003A) from the file (1040), if a match is produced, then the operating system (120) uses the received encryption/decryption key (103) and decrypts the encrypted serial number (1045) stored the file (1040).

If the decrypted serial number matches the received serial-number (1002) from the server computer (1000) of the manufacturer, then a program running on the computer (130) or on the cradle (1235) sends a command signal to the blank device-without-encryption-decryption-key, so as to transfer from the cradle (1235) the encryption/decryption key (103) received from the server computer (1000) of the manufacturer to be saved in the new DEDK non-transitory computer storage medium (1260) of the new DEDK (1250).

Exemplary Circuitry for the Device-with-Encryption-Decryption-Key

FIG. 1A is related to FIG. 2A, FIG. 2B, FIG. 10 and FIG. 11. FIG. 1A illustrates an example of preferred components of the device-with-encryption-decryption-key (100). The device-with-encryption-decryption-key (100) stores the encryption/decryption key (103). The storage means is preferably a non-transitory computer storage medium, a read only memory, a flash memory, and/or an electrical programmable read only memory.

The device-with-encryption-decryption-key (100) preferably includes a gate control circuitry (105), which controls signal flow between the first-non-transitory computer storage medium (104) and the latch memory (111). The first-non-transitory computer storage medium (104) of the device-with-encryption-decryption-key (100) preferably has non-transitory memory cells ((103A), (103B), (103C), and (103C)). The non-transitory memory cells hold values of the encryption/decryption key (103). The latch memory (111) preferably includes non-transitory latch memory cells (110A), (110B), (110C), and (110D) holding individual copies of bytes of the encryption/decryption key (103).

Preferably, the gate control circuitry (105) includes a timer/trigger (105A). The timer/trigger (105A) is an electronic circuitry used to fire a signal once something happens, in this particular case, a certain amount of time after the computer is turned on or reset—for instance, a few milliseconds, or a few seconds, or longer.

When the timer/trigger (105A) is present, the gate control circuitry (105) further includes an electronic tristate switch (105B) which operates like a wall switch to light bulb. When the wall switch is closed, electricity flows through the wires lighting the light bulb. When open, the wall switch stops the flow of electricity and turns off the light bulb. Thus, when closed, the electronic tristate switch (105B) permits the flow of an electronic signal. When open, the electronic tristate switch (105B) disables the flow of the electronic signal.

The timer/trigger (105A) is an example, but there are many other ways of designing the device-with-encryption-decryption-key (100) to achieve the same end result as in the explanation herein. Therefore, the explanation given is not intended to be limited as the only way, it is but one way for the device to be operating with the device-with-encryption-decryption-key (100).

After the computer is turned on or reset, the output line of the timer/trigger (105A), which is connected to the electronic tristate switch (105B), will be high, that is, having a value of "1". And with a high state signal, the electronic tristate switch (105B) automatically closes (see FIG. 2A gate control circuitry (105)). In a closed state, the values of the bytes of each of the non-transitory memory cells (103A), (103B), (103C), and (103D) holding the encryption/decryption key (103) will be transferred to the non-transitory latch memory cells (110A), (110B), (110C), and (110D) of the latch memory (111). Key_1 (103A) will be transferred to the memory location Key_a (110A). Key_2 (103B) will be transferred to the memory location Key_b (110B). Key_3 (103C) will be transferred to the memory location Key_b (110C). And, Key_n (103D) will be transferred to the memory location Key_z (110D).

After a specified time-threshold has elapsed, the timer/trigger (105A) changes from high "1" (i.e., a positive) to low "0". Once this happens, the output of the electronic tristate switch (105B) turns into high-impedance, which means that the device-with-encryption-decryption-key (100) is disconnected from the rest of the circuitry of the computer (130) as illustrated at FIG. 2B gate control circuitry (105).

The signal value from the encryption/decryption key (103) will only go through the electronic tristate switch (105B) at the high state (namely, the positive) of the timer/trigger (105A), before the timer/trigger (105A) activates by turning from positive state "1" to low "0". After it activates, the electronic tristate switch (105B) shuts off and no signal goes through it again, except if the computer ((130) FIG. 2A) goes through a power-down and power-up, or reset.

Only one gate control circuitry (105) is illustrated between Key_1 (103A) and Key_a (110A), but preferably, each key (103B), (103C), and (103D) will have one, linking each to its cell in the latch memory (111) holding a copy of the encryption/decryption key (103). Preferably, there is one gate between (103B) and (110B), one gate between (103C) and (110C), and one gate between (103D) and (110D).

For the purpose of simplicity and for the sake of clear and concise explanation of most embodiments, just the encryption/decryption key (103) is referred to. This should be understood to include a copy of the encryption/decryption key (103) and also the copy (120-A) stored in random access memory (925) under the control of the operating system (120), both are defined as the encryption/decryption key (103).

In the device-with-encryption-decryption-key (100), a tristate bank (136) may also be present for the computer's protection in case the basic input/output system (2130) stored in read only memory, namely the ROM BIOS shown in FIG. 9, needs to access the device-with-encryption-decryption-key (100) and inhibit a program from reading of the stored encryption/decryption key (103). If this becomes necessary, the ROM BIOS, to wit, the basic input/output system (2130), issues a signal to the timer/trigger (132). Once the timer/trigger (132) activates with a low signal "0", the tristate bank (136) is set to high-impedance state, thus disabling the signal flow (134) leaving the latch memory (111) from reaching the output (138). And the output of the stored encryption/decryption key (103) will not be read by any program in the computer (130). The timer/trigger (132) may also be designed to activate or fire after a lapse of time. If done this way, then the ROM BIOS, to wit, the basic input/output system (2130), may not be needed because the timer/trigger (132) can be designed to fire within a short time which will not enable programs, from a plugged device, enough time to read the output (138) from the device-with-encryption-decryption-key (100) via the tristate bank (136).

This may happen when a bootable compact disk or any bootable device is plugged to the computer (130). Such action would enable the basic input/output system (2130), also referred to as the ROM BIOS, to wit, the basic input/output system (2130), to read the operating system from the external device, instead of from the operating system (120) that is the actual authorized operating system on the computer (130). Were this to happen, then a program executed through an external operating system would be able to easily read the stored encryption/decryption key (103) and send it to hackers, who would then be able to write a virus and encrypt it using the stolen encryption/decryption key (103), producing the computer's digital-DNA, then injecting and storing virus on the computer (130). Should that happen, the operating system (120) of the computer (130) would not be able to distinguish the virus from validly encrypted programs, thus defeating the security implemented using the device-with-encryption-decryption-key (100).

Alternatively, the timer/trigger (132) may not be needed, if the basic input/output system (2130) connects directly (see the first dashed line (131)) to the tristate bank (136) or through another kind of electronic gate/circuitry, so as to enable the same functionality as is done with the use of the timer/trigger (132).

The circuitry for the device-with-encryption-decryption-key (100) may be much more complex than discussed above. The discussion above is presented for simplicity and not in any way trying to obscure preferred embodiments. This circuitry may be designed differently, such as for example, when gate control circuitry (105) is not present, then the means for gate mechanism for turning off the device-with-encryption-decryption-key (100) may be integrated elsewhere. No matter the location, some kind of gate, similar logic, or action is preferably present. If no gate or similar action is present, then the user could simply remove or disable the device-with-encryption-decryption-key (100) from the computer (130), such as for example, when it is installed via a computer port, such as a universal serial bus port. If the device-with-encryption-decryption-key (100) is part of a compact disk in a compact disk reader, then the compact disk could be ejected from the reader.

Cradle's Circuitry Operable to Save an Encryption/Decryption Key

Assuming that the device-with-encryption-decryption-key (100) is an external device plugged into a universal serial bus port and the user loses the device-with-encryption-decryption-key (100), then there would be a problem: The central processing unit (905) of the computer (130) would not be able to execute its digital-DNA because each computer has a unique digital-DNA.

The solution to a lost device-with-encryption-decryption-key (100) is to enable preparation of a replacement device, i.e., a new device, which when programmed, the encryption/decryption key (103) is then referred to as a new DEDK (1250). To permit preparation of the new DEDK (1250), programming would be needed to enable storage of the encryption/decryption key (103) in its original state in the replacement device. But here too, another problem arises that creates a security vulnerability in the device-with-encryption-decryption-key (100). If the replacement device could be accessed directly and programmed with a duplicate original of the encryption/decryption key (103), then any program could access the new DEDK (1250) and read its encryption/decryption key (103), or hack it and change the encryption/decryption key (103). The solution then is a cradle (1235), i.e. a deck, where the new DEDK (1250) could be plugged into and programmed with a duplicate original of encryption/decryption key (103).

Figure 1B:
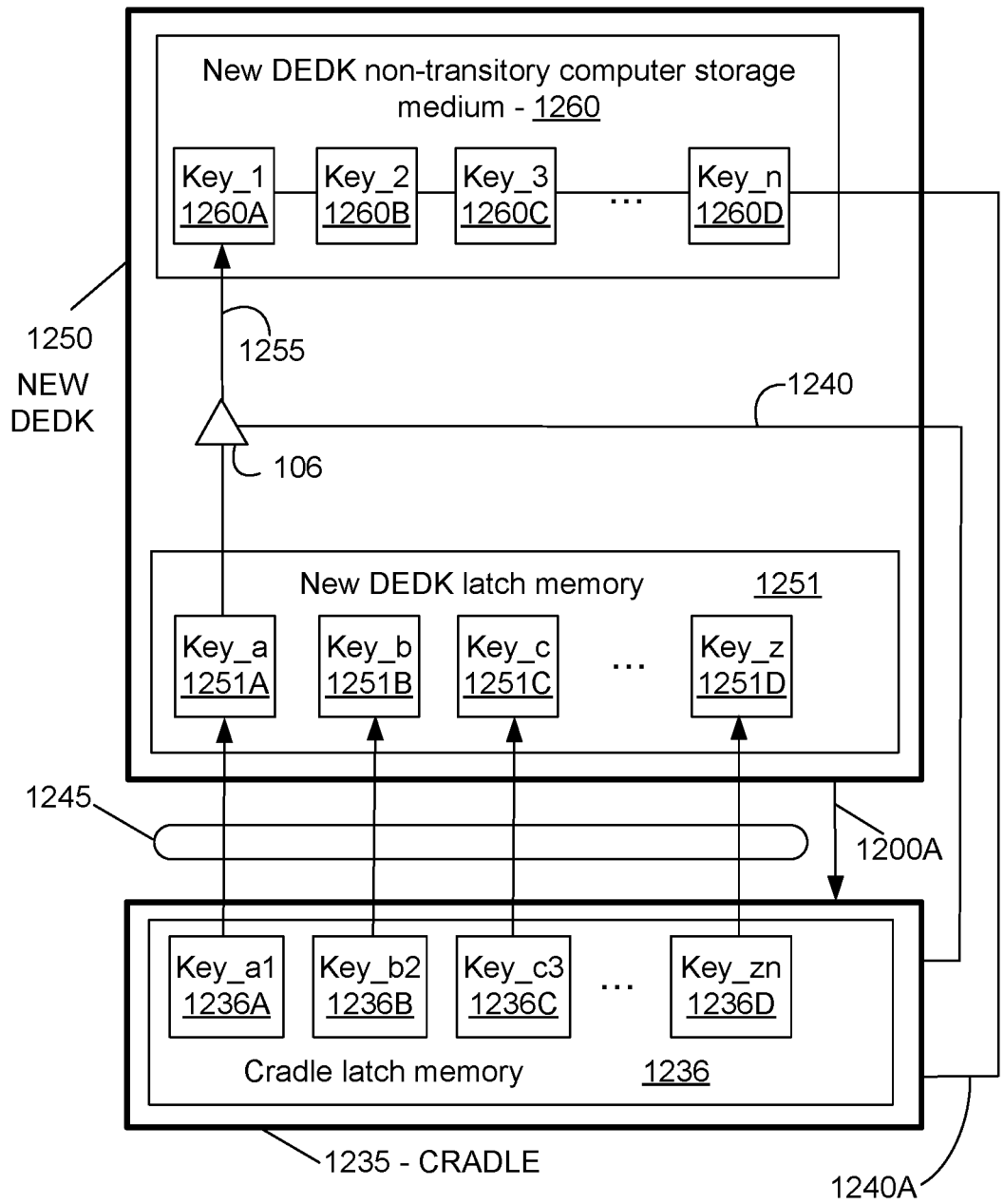
FIG. 1B illustrates the saving of a new encryption/decryption key into the device-with-encryption-decryption-key's circuitry.
Figure 12:
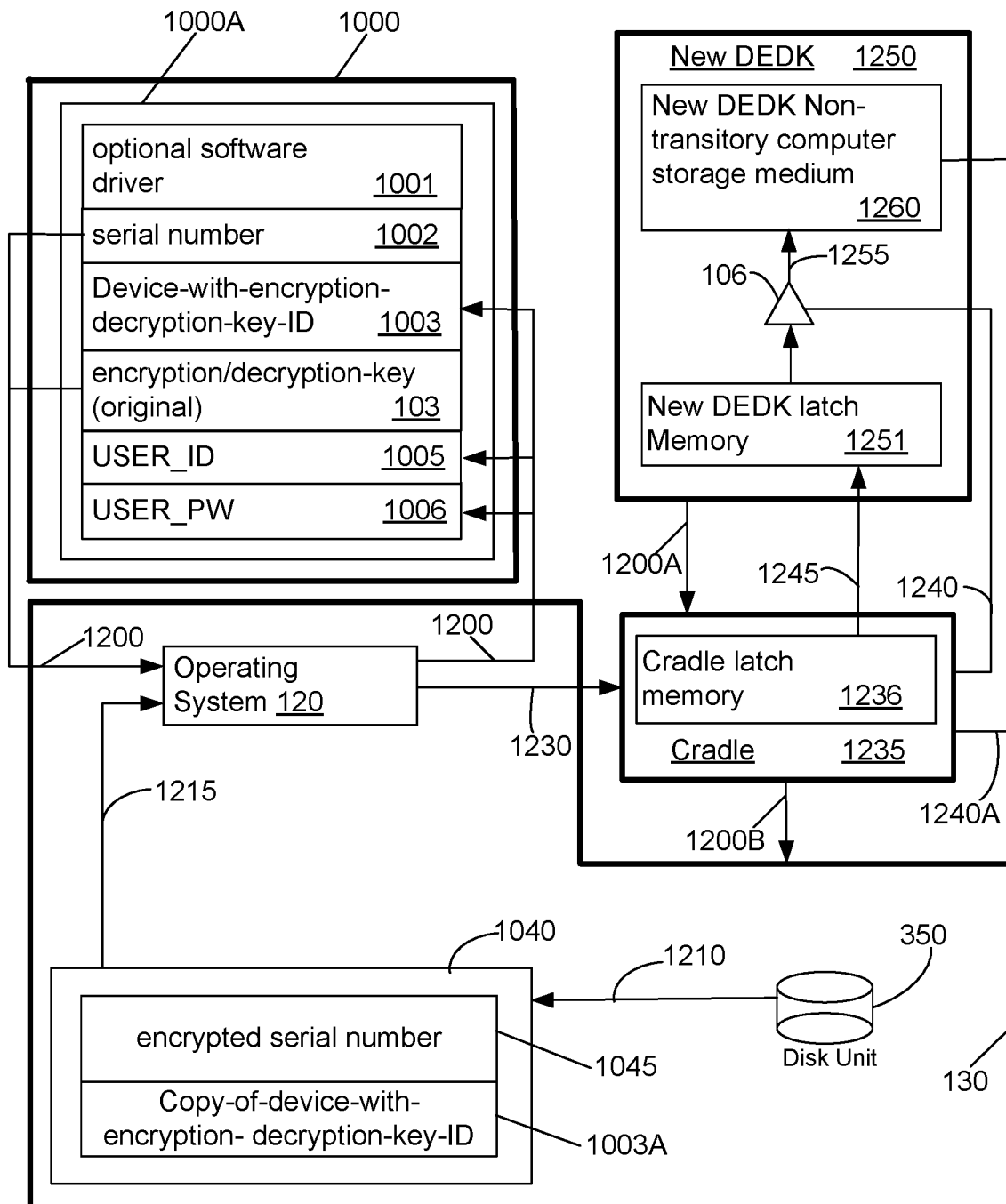
FIG. 12 illustrates a device for restoring the encryption/decryption key into a new device-with-encryption-decryption-key.

FIG. 1B is related to FIG. 12, and it illustrates a new DEDK (1250) plugged into the cradle (1235). The new DEDK (1250) will hold the duplicate original encryption/decryption key. The new DEDK (1250) includes a new DEDK latch memory (1251), a gate B, i.e. the tristate switch (106), and a new DEDK non-transitory computer storage medium (1260).

Also, when it is an external device, the cradle (1235) is a completely independent device, it is not part of the new DEDK (1250). The cradle (1235) may be a universal serial bus device plugged into a universal serial bus port. The cradle (1235) may be a computer board/blade in the computer, or a device attached to the computer in any form. The cradle (1235) has the cradle latch memory (1236) to hold a copy of the encryption/decryption key (103) to be saved in the new DEDK (1250).

The cradle latch memory (1236) has random access memory cells (1236A), (1236B), (1236C), and (1236D), shown in FIG. 1B. A program (the operating system (120) or the software driver (935)) running on the computer (130) transfers the encryption/decryption key (103) from the computer (130) to the cradle (1235) and the cradle (1235) stores the encryption/decryption key (103) into the random access memory cells ((1236A), (1236B), (1236C), and (1236D)) of the cradle latch memory (1236).

The new DEDK (1250) has the new DEDK latch memory (1251) and the new DEDK latch memory (1251) has latch memory cells (1251A), (1251B), (1251C), and (1251D), shown in FIG. 1B. The new DEDK (1250) also has the new DEDK non-transitory computer storage medium (1260), which has the non-transitory memory cells (1260A), (1260B), (1260C), and (1260D), shown in FIG. 1B.

Once a replacement device, i.e. the new DEDK (1250), is inserted into the cradle (1235) (see the twenty-fifth arrow line (1200A)) and the process for saving a duplicate original of the encryption/decryption key (103) is initiated, the cradle (1235) stores the duplicate original in the cradle latch memory (1236) of the cradle (1235). The duplicate original of the encryption/decryption key (103) is automatically transferred from the cradle (1235) via the fourth secure link (1245) to the replacement device, which then becomes the new DEDK (1250), with the device-with-encryption-decryption-key (100). Next, the cradle (1235) sends a high signal via fifth secure link (1240) to the tristate switch (106), which activates the tristate switch (106), transferring via the sixth secure link (1255) the encryption/decryption key's bytes of the encryption/decryption key (103) from the new DEDK latch memory (1251) to a flash memory group, namely the new DEDK non-transitory computer storage medium (1260). And finally, the cradle (1235) sends a signal via seventh secure link (1240A) to the new DEDK non-transitory computer storage medium (1260) writing the encryption/decryption key (103) that is new.

Preferably, tristate (106), is subdivided into one tristate switch for each byte in the new DEDK non-transitory computer storage medium (1260) of the new DEDK (1250) storing the encryption/decryption key (103), as shown in FIG. 1B. There will be one tristate switch between Key_b (1251B) and Key_2 (1260B). One tristate switch between Key_c (1251C) and Key_3 (1260C). And, one tristate switch between Key_z (1251D) and Key_n (1260D). Also, tristate switch B (106) may be integral part of the new DEDK non-transitory computer storage medium (1260).

Saving Sensitive Information on the Device-with-Encryption-Decryption-Key

FIG. 1A and FIG. 1B illustrate the device-with-encryption-decryption-key (100) able to save and retrieve a value (e.g. the encryption/decryption key (103)) but can also be used for other purposes as well. An example is, instead of having values stored in the operating system's registry, the most sensitive values may be stored into the device-with-encryption-decryption-key (100). For instance, the operating system might be authorized to save a checksum (a result from a computation of each byte's value in a file) of a file to certify that the file hasn't been changed by a virus.

Exemplary Computer Circuitry

FIG. 9 illustrates preferred hardware for the computer (130) and server computer (1000), which includes a central processing unit (905) responsible for operation of the computer (130). Once the computer (130) is powered up or reset, the central processing unit (905) initiates program code stored in the basic input/output system (2130), shown in FIG. 9 and FIGS. 21-22. The ROM BIOS, i.e. the basic input/output system, has the software code that once executed, instructs the central processing unit (905) to load the operating system (120) from a second-non-transitory computer storage medium (350) shown in FIGS. 3-4, FIG. 9, and FIGS. 21-22, into the random access memory (925).

After the operating system (120) is loaded into random access memory (925), the instruction code of the basic input/output system (2130) transfers control to the first byte of the operating system (120), and the operating system (120) takes over the operation of the computer (130). The operating system (120) then accesses the second-non-transitory computer storage medium (350) and loads the software driver (935) into the random access memory (925). The software driver (935) works in conjunction with the operating system (120). At the moment that the computer (130) powers up or resets, the device-with-encryption-decryption-key (100), which, preferably is a separate unit attached (see the first single-headed arrow line (100A)) to the computer (130) or soldered to the computer (130) mother board, initiates the transfer of its encryption/decryption key (103) to the latch memory (111) through the tristate switch, i.e. the gate control circuitry (105), if present. Thereafter, either, the operating system (120) or the software driver (935), or both, reads (see first double-headed arrow line (121) and second double-headed arrow line (956)) the copy of the encryption/decryption key (110). After the copy of the encryption/decryption key (103) is read, the tristate switch, which is the gate control circuitry (105), gets turned off, if it isn't already. After reading the copy of the encryption/decryption key (110), the operating system (120) clears the copy of the encryption/decryption key (110) from the latch memory (111). The read copy of the encryption/decryption key (110) becomes the copy of the encryption/decryption key (120-A) (see FIG. 2B) under the control of the operating system (120).

An embodiment may be implemented with the use of the random access memory auxiliary (952) working in conjunction with the central processing unit (905). Or, an embodiment may dispense with the use of the random access memory auxiliary (952) by employing the central processing unit (905) working in conjunction with the operating system (120), the software driver (935), the read only memory, to wit, the basic input/output system (2130) and an embedded macro operating system (955) (or any other form of program to perform encryption/decryption for the central processing unit (905)). If implemented this way, the encryption/decryption key (103) will be integral part of the central processing unit (905) and used by the embedded macro operating system (955) to perform encryption/decryption, alone, or in conjunction with the central processing unit (905). If implemented this way, the operating system (120) and/or the software driver (935) sends program executable code and/or data to be encrypted/decrypted to the central processing unit (905) and the central processing unit (905) passes the program executable code and/or data to the embedded macro operating system (955) for encryption of non-encoded software (310), or for decryption of digital-DNA (300). Or, for encryption of non-encoded software (310) before storing in the random access memory (925) of the computer (130), or for decryption of digital-DNA (300) stored in the random access memory (925) of the computer (130).

It is important to notice that the use of the macro operating system (955) is optional since the same functionality can be implemented by the operating system (120) and/or the software driver (935) working in conjunction with the central processing unit (905) and the random access memory auxiliary (952). The use of the embedded macro operating system (955), while optional, will free the central processing unit (905) increasing the encryption/decryption speed. If the embedded macro operating system (955) is used, then the operating system (120) and/or the software driver (935) can pass one or more byte (whether encrypted or not) to the embedded macro operating system (955) for encryption/decryption. The embedded macro operating system (955), if used, will perform the modulus operation the central processing unit (905), as will be explained in the teachings of FIG. 18.

To prevent code injection into the random access memory (925), the random access memory auxiliary (952), which is optional, works in conjunction (see the third double-headed arrow line (954)) with the device-with-encryption-decryption-key (100), to use the copy of encryption/decryption key (110) stored in the latch memory (111) of the device-with-encryption-decryption-key (100) to encrypt/decrypt software loaded in the random access memory (925) of the computer (130). Some embodiments can be implemented where the random access memory auxiliary (952), if present, through (see the second single-headed arrow line (958)) and/or the central processing unit (905) through (see the twenty-first single-headed arrow line (906)) connected to the device-with-encryption-decryption-key (100) access the encryption/decryption key (103) directly from the first-non-transitory computer storage medium (104) of the device-with-encryption-decryption-key (100). If implemented this way the device-with-encryption-decryption-key (100) will not have the tristate switch, i.e., the gate control circuitry (105), and also will not have the latch memory (111).

As the computer (130) proceeds with its operations, it may from time-to-time, request and or receive outside data through, for example, I/O port (915). Such outside data might be data from a wireless connection, e.g. the Bluetooth connection (1450), or from the server computer (1000). The hardware described herein do not describe a complete computer package of hardware. The basics disclosed are not intended to obscure the preferred embodiments, since it is well known to those skilled in the art that many other of the usual components are not discussed like: mouse, keyboard, screen, etc.

Also, the arrangement shown in FIG. 9 may be a computer board installed inside another computer capable of all the specified functionalities, like: encryption and decryption, instead of the operating system (120). If the arrangement is implemented as computer board, then the device-with-encryption-decryption-key (100) may be integral part of the computer board.

Device for Stopping Virus Infection in a Computer

Figure 2A:
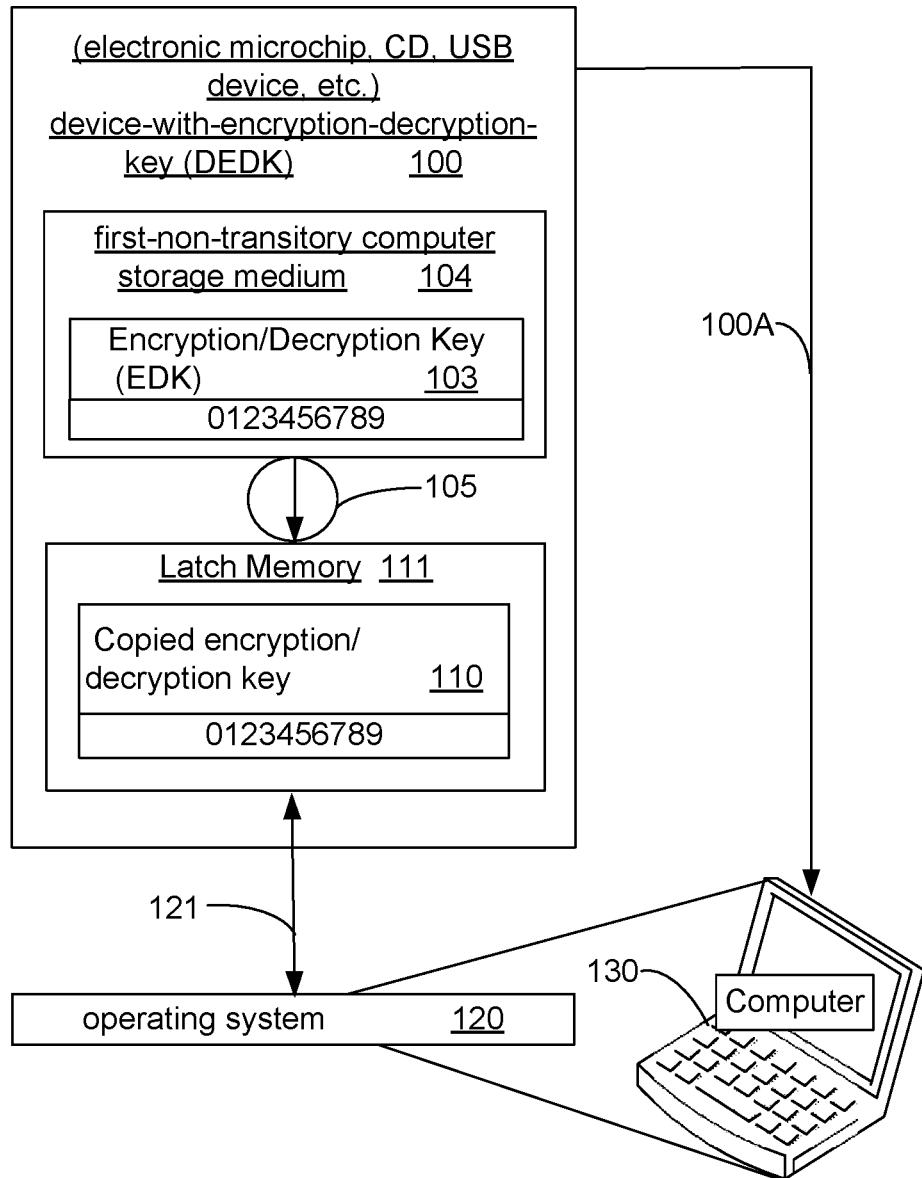
FIG. 2A illustrates a computer's operating system using the encryption/decryption key device.
Figure 2B:
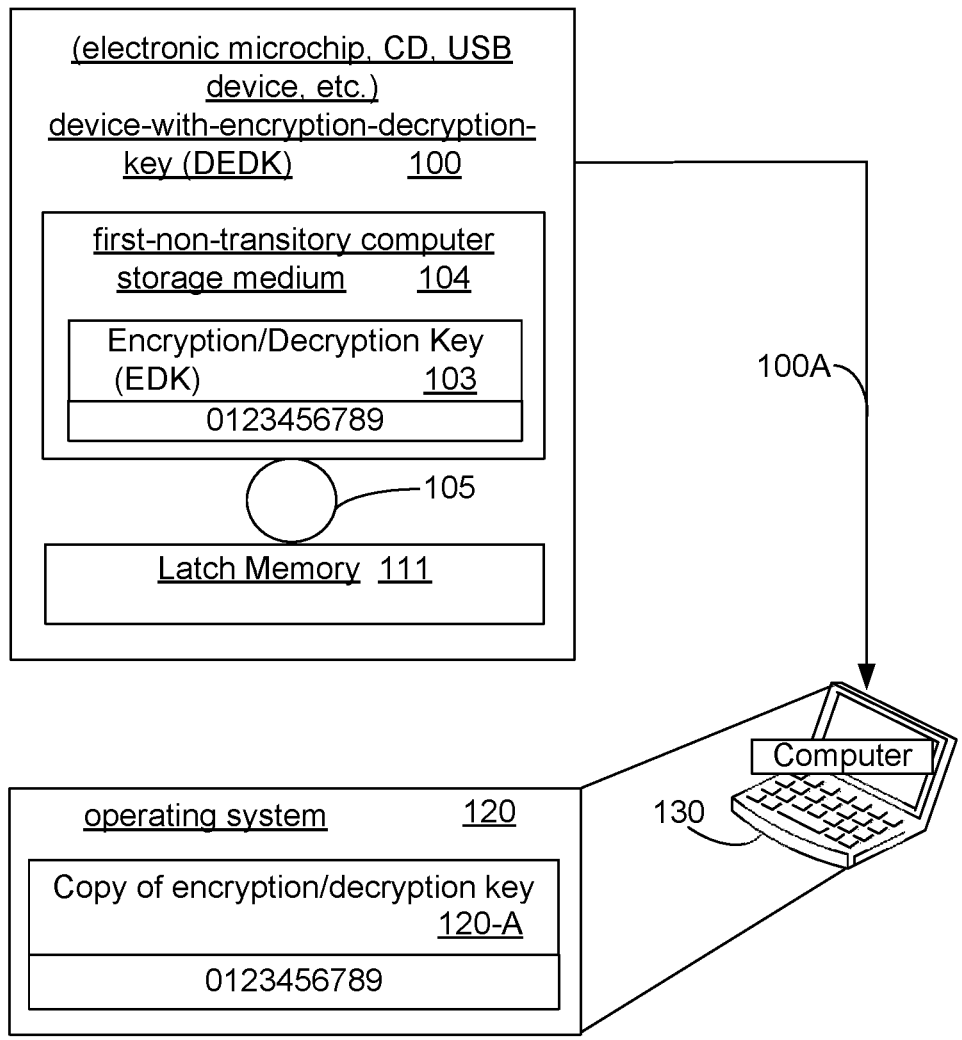
FIG. 2B illustrates a further embodiment of FIG. 2A after operating system has read the encryption/decryption key from the device-with-encryption-decryption-key at power up then disabling the device-with-encryption-decryption-key so as not to allow it to read by any other program.

FIG. 2A supplements FIG. 1A, and it illustrates a preferred embodiment. FIG. 2A depicts a device-with-encryption-decryption-key (100) connected (see the first single-headed arrow line (100A)) to the computer (130). The device-with-encryption-decryption-key (100) has the first-non-transitory computer storage medium (104) holding a permanent copy of the encryption/decryption key (103) and latch memory (111) that holds a copy of the encryption/decryption key (103). The latch memory (111) may be integral part of the device-with-encryption-decryption-key (100) or it may be somewhere else—not part of the device-with-encryption-decryption-key (100).

The device-with-encryption-decryption-key (100) may be an electronic device (e.g., a microchip), a compact disk in a compact disk reader, a universal serial bus device, a pluggable computer card/blade, a mobile device (1430), a computer (e.g., a server or any other computer) in communication with the computer (130), or any device which will allow the encryption/decryption key (103) to be transferred to the latch memory (111), and from latch memory (111) to the random access memory (925) of the computer (130) and used at the computer (130) for the purpose of producing the digital-DNA of the computer (130). The term microchip is to be interpreted broadly to include the device-with-encryption-decryption-key (100) implemented inside a central processing unit (905), part of the basic input/output system (2130) or stored, or programmed in an electronic microchip, or be part of the random access memory auxiliary (952).

The device-with-encryption-decryption-key (100) preferably includes computer readable memory, i.e. a physical component that stores the encryption/decryption key (103), and it may be a read only memory which is written only once, or it may the flash memory which can be written multiple times, or any kind of non-transitory computer storage medium.

The gate control circuitry (105) is optional since other means can be used to provide the same functionality, like a flag which may be set by the operating system (120), or by the device-with-encryption-decryption-key (100) to indicate that the encryption/decryption key (103) has been provided.

At power up of the computer (130), the device-with-encryption-decryption-key (100) activates, and if the gate control circuitry (105), while optional, is in use, it will enable transfer of the encryption/decryption key (103) of the device-with-encryption-decryption-key (100) from the first-non-transitory computer storage medium (104) to the latch memory (111). Next, the ROM BIOS, to wit, the basic input/output system (2130), is activated and it in turn loads the operating system (120) into random access memory (925). Once the operating system (120) becomes operational, it will read the encryption/decryption key (103) which is stored in the latch memory (111) of the device-with-encryption-decryption-key (100). The operating system (120) then stores (see the first double-headed arrow line (121)) the encryption/decryption key (103) in the random access memory (925) of the computer (130). Thereafter, the operating system (120) proceeds and clears from the latch memory (111) the copy of encryption/decryption key (103), as illustrated at FIG. 2B.

The device-with-encryption-decryption-key (100) may be configured to preclude a second transfer of the encryption/decryption key (103). Once the device-with-encryption-decryption-key (100) transfers the encryption/decryption key (103) to the latch memory (111) of the device-with-encryption-decryption-key (100) through gate control circuitry (105), then the device-with-encryption-decryption-key (100) raises a flag or turns off the gate control circuitry (105) as to indicate that the encryption/decryption key (103) has been transferred for a first time, therefore preventing a second transfer. For instance, at the computer (130) power up, a register of the device-with-encryption-decryption-key (100) may have a flag-value of "0" to indicate that the encryption/decryption key (103) has not been transferred yet. Then, after the encryption/decryption key (103) has been transferred to the latch memory (111), it will set the flag-value in the register to "1". Thereafter, any subsequent requests will be ignored because the flag-value is set to "1". And, if flag schema is used, the gate control circuitry (105) would not be needed.

The hardware may be controlled by a step wherein the encryption/decryption key (103) is read from the device-with-encryption-decryption-key (100) by the operating system (120) or any authorized program, only once. Alternatively, it may be controlled by a step wherein the encryption/decryption key (103) is read multiple times as long as in reading it more than once, this will not cause the security of the computer (130) to be compromised.

The device-with-encryption-decryption-key (100) may be a smart cell phone or another computer with software that communicates with the computer through its wireless (also known as Wi-Fi) or Bluetooth connection or a network connection. This method is more fully explained in the disclosure relating to FIG. 14.

FIG. 2B illustrates a further overview of FIG. 2A. After the encryption/decryption key (103) is transferred to the latch memory (111) of the device-with-encryption-decryption-key (100), the gate control circuitry (105) is opened, illustrated as lacking the arrow in the circle (see the gate control circuitry (105)). After the operating system (120) or the software driver (935) or both (which from now on is referred as the operating system (120)), reads the copy of the encryption/decryption key (103) from the latch memory (111), then the operating system (120) proceeds and clears the latch memory (111) so as not be available to the operating system (120) for a second time. When so cleared, this denotes that the operating system (120) no longer has any connection with the device-with-encryption-decryption-key (100)—the first double-headed arrow line (121) is missing, the gate control circuitry (105) is open and the latch memory (111) is lacking the value "0123456789". The operating system (120) has available the copied encryption/decryption key (120-A). And as illustrated, the device-with-encryption-decryption-key (100) is still connected/plugged (see FIG. 2B and the first single-headed arrow line (100A)) into the computer (130), but for all effects, it is technically disconnected from the electronic circuitry of the computer (130).

FIG. 3, which is a further embodiment of FIG. 2A and FIG. 2B, depicts the process of installing a software program (330) on the computer (130). The software program is a software program without any encoding (also called the non-encoded software (310))), the same kind of software which is commonly used in today's prior art, and which can be installed in any computer running the operating system for which the program was designed. Examples include an accounting software or word processor, or a spreadsheet software, website code file, JavaScript code file, a driver, batch code file, script code file, etc.

Proceeding with FIG. 3. It depicts an embodiment being used in the process of installing a non-encoded software (310) on the computer (130). Reminding again, the non-encoded software (310) is a regular software without any encoding, it is the exactly the same software of the prior art which is currently available and that can run (i.e., can be executed) in any computer having the Operating System for which the non-encoded software (310) was programmed to be executed thereon.

The storage medium holding software (340) may be in the form of compact disk or downloaded (indicated by the seventh single-headed arrow line (341)) from an online trusted source. The storage medium holding software (340) holds the non-encoded software (310)) which will be executed by central processing unit (905) in the computer (130). Also taking part in the installation process of the non-encoded software (310) is an optional-header-identification-code (320). The operating system (120) generates the optional-header-identification-code (320). The optional-header-identification-code (320) may have any string's value e.g. "VALIDATED DNA" or any kind of value inserted by the operating system (120), and which the operating system (120) will use later to identify if the software has been tampered with after it was converted into its digital-DNA format. If mentioned that operating system (120) is executing the software code, but it is to be broadly interpreted that the central processing unit (905) is the one doing the execution of the software code and the operating system (120) is doing the managing of the hardware and software and working in conjunction with the central processing unit (905).

FIG. 3 illustrates receiving the non-encoded software (310) through a network connection (indicated by the seventh single-headed arrow line (341)). Then the software program (330) becomes the non-encoded software (310) which is made available through a computer connection (see the sixth single-headed arrow line (321)) to the operating system (120). The operating system (120) may add the optional-header-identification-code (320) to the non-encoded software (310) forming a software program (330) before its conversion to the computer (130) digital-DNA (300) using the copied encryption/decryption key (120-A) which is under the control of the operating system (120).

Then the operating system (120) uses the copied encryption/decryption key (120-A) and encrypts the software program (330), producing (see the third single-headed arrow line (301)) the first-encrypted software program, the Digital-DNA (300) which is unique to computer (130). Then the operating system (120) sends (see the fourth single-headed arrow line (301A)) the digital-DNA (300) to the computer (130) and the computer (130) saves (see the fifth single-headed arrow line (310B)) the digital-DNA (300) in the second-non-transitory computer storage medium (350), shown in FIG. 3.

The digital-DNA (300) is now encoded/encrypted and cannot be executed as is without first being decrypted, since the central processing unit (905) of the computer (130) can only execute/use the non-encoded software (310)). But the digital-DNA (300) is encoded, and if the central processing unit (905) tries to execute it as is, the digital-DNA (300) will not be in a format which is understood by the central processing unit (905).

The optional-header-identification-code (320) may be separated from the non-encoded software (310). Both may reside in two distinct files with the same name and a distinct file extension, both may be in a single file or the optional-header-identification-code (320). Both, the optional-header-identification-code (320) and the non-encoded software (310) would be encrypted with the encryption/decryption key (103). It may be implemented where the optional-header-identification-code (320) is not encrypted.

FIG. 4 illustrates the opposite process of FIG. 3, which involves the decryption of the digital-DNA (300). FIG. 4 illustrates converting the digital-DNA (300) back to the non-encoded software (310). Once the execution of the digital-DNA (300) is requested by a user, or by the operating system (120), or by another program in the computer (130), the operating system (120) communicates with the computer (130) and requests from computer (130) the digital-DNA (300) stored in the second-non-transitory computer storage medium (350). Next, the computer (130) accesses the second-non-transitory computer storage medium (350) via connection (see the eighth single-headed arrow line (403A)) and makes available (via link A (see the ninth single-headed arrow line (403B)) and link B (see the tenth single-headed arrow line (403))) the digital-DNA (300) to the requesting operating system (120).

The operating system (120) uses the copied encryption/decryption key (120-A) and decrypts the digital-DNA (300) producing the non-encoded software (310) and the optional-header-identification-code (320), which is the software program (330) as originally encrypted. Next, the operating system (120) verifies (see eleventh arrow line (411)) the optional-header-identification-code (320), and if contains the phrase "VALIDATED DNA", then the operating system (120) knows that the digital-DNA (300) has not been tampered with. Finally, the operating system (120) loads (see the twelfth single-headed arrow line (431)) the non-encoded software (310)) in the random access memory (925) of the computer (130) passing the starting location of the non-encoded software (310)) to the central processing unit (905) and the central processing unit (905) executes the non-encoded software (310) fetching instructions of the non-encoded software (310) from random access memory (925), as needed. If the optional-header-identification-code (320) is not present or if it doesn't contain the phrase "VALIDATED DNA", the operating system (120) may disable the loading of the executable program, i.e., the non-encoded software (310), by not loading it into the random access memory (925), thus disabling it before execution.

The optional-header-identification-code (320) may also include a validation code, such as the number of bytes (i.e., the length) of the non-encoded software (310) or any other means to validate the file, like a checksum (a checksum is a small-sized datum derived from a block of digital data for the purpose of detecting errors which may have been introduced during its transmission or storage) of the non-encoded software (310) content before its encryption. If a validation code is included, then the operating system (120) performs a check sum of the non-encoded software (310) and check with the checksum of the optional-header-identification-code (320) to verify if the file is still the software program (330) as originally encrypted. The optional-header-identification-code (320) may also include other information like the maker of the software, the software serial number, the software version, etc.

Basic Encryption Example

Explaining a basic encryption process to derive the digital-DNA (300). Assuming that the schema for encrypting is a multiplication of the encryption key value by the value to be encrypted, and the decryption is the division of the value to be decrypted by the encryption key value. If it is assumed that the non-encoded software (310) is the code value "9" that can be executed by the central processing unit (905). But once the non-encoded software (310) is encrypted with the encryption/decryption key (103), and assuming that the value of the encryption/decryption key (103) is "7". Then, after this value of "7" is multiplied by the non-encoded software (310) which is the value of "9", then the end-result will become "63" (which is the digital-DNA (300)). Once the central processing unit (905) reads the digital-DNA (300) (the value of ("63")) it will not understand it because it has been encrypted, and therefore, it will not be able to process and execute it.

However, since the operating system (120) has the copied encryption/decryption key (120-A) with the value of "7", all of what the operating system (120) will have do is use the value of "7" do perform the decryption, which is just the opposite of the encryption, and since the encryption involved the multiplication of "7" with "9" to obtain the value "63", the operating system (120) or the central processing unit (905) will take the value "63" and divide it by the value of "7" (which is the encryption/decryption key (103)) and retrieves the actual value of "9" (which is the non-encoded software). Once the value of "9" is obtained, which the central processing unit understands, the value of "9" is loaded it into the random access memory (925) and the central process unit (905) executes it.

When a request to run software is made on computer (130) where the digital-DNA software is installed, the operating system (120) first unencrypts the digital-DNA software, then the central processing unit executes it.

A computer infection with a virus typically occurs without user's knowledge and without any indication to the operating system. However, the virus present in the computer employing the device or method disclosed herein would be un-encoded and if a request to execute the un-encoded virus is performed on the computer (130), two things will happen: 1) since the operating system (120) decrypts a digital-DNA code before its execution, and, 2) since a decryption is the opposite of an encryption. Therefore, once a request for execution of the un-encoded virus code is initiated, the operating system (120) or the central processing unit (905) will first decrypt it before its execution, but once the un-encoded code is decrypted, it will become encoded, that is, it will become encrypted and transformed into the computer (130) digital-DNA then stored into the computer (130) random access memory (925) prior to its execution. But the central processing unit (905) only executes non-encoded software program code, once the central processing unit (905) tries to execute the virus-digital-DNA, the central processing unit (905) will not understand it, halting the operation of the virus-digital-DNA. Once the term the operating system (120) is mentioned doing the encryption/decryption, it is to be broadly interpreted to include the central processing unit (905) and/or the macro operating system (955) as well. Also, once the term the central processing unit (905) is mentioned doing the encryption/decryption, it is to be broadly interpreted to include the operating system (120) and/or the macro operating system (955) as well.

Virus Invalidation Example

Assuming the un-encoded virus installed on the computer (130) has a value of "70", also, as explained before, assuming that the encryption involves a multiplication of the value to encrypt and the encryption/decryption key value and the decryption involves the division of the encrypted value by the encryption/decryption key value. Once the operating system (120) is commanded to initiate the execution of an un-encoded virus, since the central processing unit (905)—FIG. 9, will only execute instructions which is decrypted, then the operating system (120) decrypts the un-encoded virus using the copied encryption/decryption key (120-A), which in this example has a value of "7". The operating system (120) divides the value "70" of the virus code by "7", which produces the value of "10" (which is the virus digital-DNA) then loading the virus digital-DNA into the random access memory (925). Once the central processing unit (905) tries to execute the value of "10", execution fails because the central processing unit (905) only understands un-encoded instruction values.

Encryption/Description Computer Logic Algorithm

The virus invalidation example above is a very basic encryption/decryption algorithm. A preferable computer algorithm would use a more sophisticated mathematical formula with very large values in the hundreds of numbers in length, or computer logic with very large encryption key. Preferably, encryption would produce a value using the computer logic XOR (eXclusive OR).

Computers only understand electronic signals and they are represented in the form of low-signal which is a zero "0" and high-signal which is a one "1". Therefore, anything which an English speaking human readily understands is meaningless to a computer. For instance, before the letter "a" can be understood by a computer, two steps need to be applied to it: first, be converted into a numeric table which represents the letter "a"; then the numeric value is converted into a value represented by zeros and ones, which is a value the computer understands. The "a" is first converted into its numerical value of "97". Then, in the following step, the value of "97" is converted into the binary value of "01100001", which the computer understands.

The binary value of "01100001" (each "0" or "1" is called a bit) represents the value of "97". The very first value starting from the right represents the value of "1" and each subsequent value going to the left of the byte, represents the prior value times "2" (which is the binary value representation, since computers only understands "0" and "1" (which are binary)). Finally, all the values which is under the binary value representation with a value of "1", is added together. Let's see how it works.

| 128 | 64 | 32 | 16 | 8 | 4 | 2 | 1 | binary value representation |
|---|---|---|---|---|---|---|---|---|
| 0 | 1 | 1 | 0 | 0 | 0 | 0 | 1 | the byte value for the letter "a" |

| 128 | 64 | 32 | 16 | 8 | 4 | 2 | 1 | binary value representation |
|---|---|---|---|---|---|---|---|---|
| 0 | 64 | 32 | 0 | 0 | 0 | 0 | 1 | the resulting conversion values |

64 + 32 + 1 = 97 - once converted back it represents the letter "a"

Since, if a binary value of "0" doesn't get added in the final conversion, then if a number is of low value it may be represented just by the first half of the byte value (i.e., the four rightmost bits), and this is what is shown in the next example: The use of only half of a byte for simplicity.

Figures 5, 6:
FIG. 5-6 illustrates the XORing of two values.

FIG. 5 illustrates two half-byte values being XOR-ed by the computer's electronic circuitry. The second row from top (510), far right value of "9" is XOR-ed with the third row from top (520), far right value of "7". The XOR operation uses the binary representation of the values that it will process, that is, XOR. In an XOR operation once two binary values are XOR-ed, bit-by-bit, if two bits are the same, that is, if both bits are "0" or both bits are "1" then the resulting value is "1", on the other hand, if any of the two values are different, that is, if one is "0" and the other is "1", then the resulting value is "0".

For instance, the value of "9", shown at in the second row from top (510) at the right end, is represented by the byte value of "00001001" and the value of "7" is "00000111". For these examples, the four leftmost bit values are ignored since our examples uses small values, we're using half-byte value. XOR is the most used method in encryption/decryption since the resultant value has the same length of the two values being XOR-ed and computers easily complete XOR operations because it involves comparisons, something computers are very fast at.

Once two values are XOR-ed and the XOR result is applied to either of the original values in a second XOR operation, the operation result will produce the missing value—the value not taking part of the XOR operation.

Top row (500) of FIG. 5 illustrates the reference value for each bit under it. For instance, the value is "9", shown at in the second row from top (510) at the right end, has four bits. And, if we analyze the top row (500) and the second row from top (510) has a bit value of "1" under "1" and "1" under "8", and it represents the value of "9" (8+1=9). The value of "9" (510) represents the program page (see FIG. 3 non-encoded software (310)) and the next value is "7" in the third row from top (520) is derived from the sum (4+2+1=7), which represents the encryption/decryption key (103)). Once the value of "9" is XOR-ed with the value of "7", the result is "14" in the fourth row from top (530). The value of "14" is derived from the sum (8+4+2=14). The value of "14" is the digital-DNA (300)). This process illustrates how a computer encrypts two values using its electronic logic.

FIG. 6 has the first row (600), which is the same as the top row (500) of FIG. 5. The result "14" at the far right in the second row (610) represents the digital-DNA (300). The result "14" is XOR-ed with the value of "7" at the far right in the third row (620), which is the encryption/decryption key (103). The result of XORing the value "14" with the value "7" derives the value of '9' in the fourth row (630), which represents the non-encoded software (310), in a format which the central processing unit (905) understands.

If a computer virus has a value of "70", it would be converted to a binary format, as follows:

| 128 | 64 | 32 | 16 | 8 | 4 | 2 | 1 | binary value representation |
|---|---|---|---|---|---|---|---|---|
| 0 | 1 | 0 | 0 | 0 | 1 | 1 | 0 | the virus binary representing the value of "70" |
| 0 | 64 | 0 | 0 | 0 | 4 | 2 | 0 | the resulting conversion values |

64 + 4 + 2 = 70 - virus code

If the virus "01000110" is present in the computer (130), it may only be executed if the operating system (120) or the central processing unit (905) first decrypts the virus with the value of encryption/decryption key (103), which is "7", binary "00000111". This operation is—

| 128 | 64 | 32 | 16 | 8 | 4 | 2 | 1 | binary value representation |
|---|---|---|---|---|---|---|---|---|
| 0 | 1 | 0 | 0 | 0 | 1 | 1 | 0 | the virus binary representing the value of "70" |
| 0 | 0 | 0 | 0 | 0 | 1 | 1 | 1 | the encryption/decryption key (103) representing the value of "7" |
| 1 | 0 | 1 | 1 | 1 | 1 | 1 | 0 | the XOR of resulting conversion values between "70" and "7" |
| 128 | 0 | 32 | 16 | 8 | 4 | 2 | 0 | Resulting decimal value of the XOR operation |

128 + 32 + 16 + 8 + 4 + 2 = 190 - virus digital-DNA

Once the virus is converted to the digital-DNA value of "190", the central processing unit (905) will not be able to execute it because the central processing unit (905) only understands the virus original value of "70", not its digital-DNA value of "190", therefore the virus has been disabled without having caused any harm to the computer (130). Decryption is also an encryption, more like, an encryption in reverse.

Computer Virus Basics

For a computer virus to succeed and proliferate, it needs to have two abilities: first, it needs to be able to execute itself in any computer running the operating system for which it was programmed; and second, it needs to be able to infect a software program, and/or replicate itself on other computers. Once the prior art computer is running a prior art software program that contains the computer virus, the prior art computer will also run the virus. This is because the virus is part of the prior art software program, i.e. the good code—this process is called "infection." If the virus is able to replicate itself, then it will wait for the appropriate time to deliver its payload, and most of the time, it is malicious.

If the intended good code is "9" and the virus code is "70", the computer virus will insert itself into the good code "9" like "709"—usually in the beginning of the software file (the computer virus "70" is located prior to the good software code "9"). Once the operating system of the prior art comes to the infected file, it proceeds to process the complete file containing the computer virus "70" and the good software code "9". It will first read "70", loading the virus code into random access memory, then the central processing unit executing it, then, it will load and execute the actual good code "9". The operating system and central processing unit of the prior art will not differentiate the computer virus "70" from the actual good computer software code "9" because both: the good code "9" and the bad virus code "70" are in the same kind of code-format for the operating system. The just described process may happen in a file, or in a process running in the computer's random access memory.

The above examples illustrate the process using a short value to represent a segment of good code and a short value to designate the bad virus code, but usually both programs, the good software code and the virus code, will be many bytes long, sometimes in the thousands or millions of bytes.

Computer Virus of the Prior Art

FIG. 7 illustrates in the operation of the prior art computer system that is infected with a computer virus. In FIG. 7, the computer virus (710) is positioned at the beginning of the infected computer software file (700) before the good software code (720). Once the infected computer software file (700) is loaded by the operating system of the prior art, the central processing unit will first execute the computer virus (710), and as the prior art central processing unit proceeds, it will execute the good software code (720). Once the infected computer software file (700) execution is requested, the operating system of the prior art would read both: the bad software code, the code for the computer virus (710), and the good software code (720). Then the prior art operating system will load both into the computer's random access memory; then finally, the central processing unit would execute both, and each would perform the activities that each was programmed to perform. The good software code (720) doing its intended good actions, and the computer virus (710) doing its intended evil actions. This only happens because both: the executable code for the computer virus (710) and the executable code, the good software code (720), is in the same understandable compiled code, which the prior art's central processing unit understands.

Installation of Software Code

FIG. 8A relates to FIG. 3, and illustrates the process wherein the operating system (120) of the computer (130) saves the digital-DNA (300) for a software program (i.e., the non-encoded software (310))) in the second-non-transitory computer storage medium (350) of the computer (130). The device-with-encryption-decryption-key (100) holds at its first-non-transitory computer storage medium an encryption/decryption key (103) having a value of "0123456789". A copy of the value "0123456789" is held in the memory location (120-A) in the random access memory (925) of the computer (130) under the control of and used by the operating system (120). The operating system (120) reads (see the fourteenth single-headed arrow line (801)) the non-encoded software (310)) from the second-non-transitory computer storage medium (350) and using the copied encryption/decryption key (120-A) encrypts the non-encoded software (310)) producing the digital-DNA (300) (i.e., the good executable software). Then saving (see the thirteenth single-headed arrow line (802)) the digital-DNA (300) in the second-non-transitory computer storage medium (350) of the computer (130).

Execution of Software Code Using Disclosed Methods and Devices

FIG. 8B relates to FIG. 4, and illustrates the decryption process reversing the encryption process of FIG. 8A. In this example, at the moment that the operating system (120) loads the digital-DNA (300) for execution (see the sixteenth single-headed arrow line (803)). The operating system (120), using a copy of the encryption/decryption key (103) which is stored in the memory location (120-A), decrypts the digital-DNA (300) deriving the executable code (see the fifteenth single-headed arrow line (804)) of the non-encoded software (310)). Then, the central processing unit (905) executes the non-encoded software (310) which is stored in the random access memory (925) of the computer (130).

Two primary encryption/decryption steps of the process used by the operating system (120) or the central processing unit (905) preferably include: 1) at installation time, the operating system (120) encrypts the non-encoded software (310) producing the Digital-DNA (300), then saves it (see FIG. 8A); and 2) at runtime, the operating system (120) decrypts the digital-DNA (300) producing the non-encoded software (310)) that the operating system/central processing unit understands, then executes it (see FIG. 8B).

Stopping Computer Virus

Figure 8C:
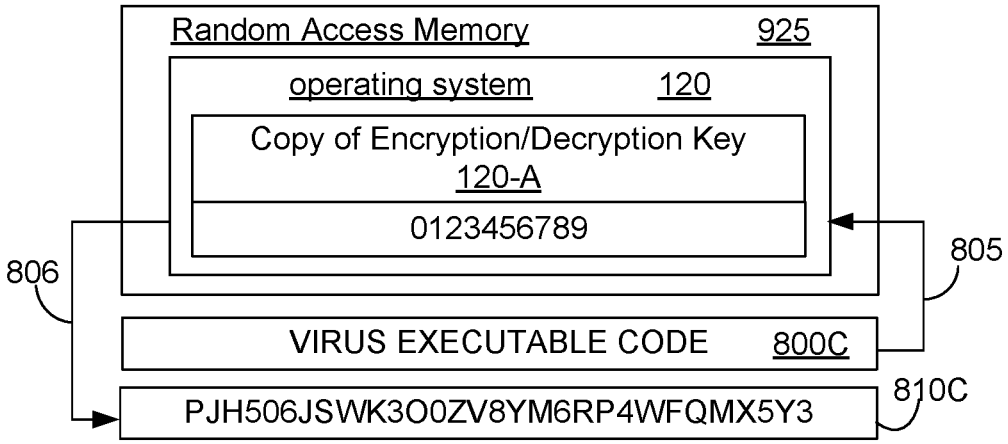
FIG. 8C illustrates stopping the computer virus using the disclosed devices and methods.

FIG. 8C illustrates the introduction of a virus or worm (800C) into the computer (130). Once the operating system (120) receives a request to execute the code of the virus or worm (800C) the operating system (120) loads (see the eighteenth single-headed arrow line (805)) the executable code of the virus or worm (800C) and then proceed to decrypt virus or worm (800C) (see the seventeenth single-headed arrow line (806)). And once decrypted, the decrypted virus code (810C) becomes unusable, and once the central processing unit (905) tries to execute it, the central processing unit (905) recognizes that the code is not in an understandable format, and therefore proceeds to ignore the encrypted code, or kill the process, since it is not in the proper format for the operating system (120) or for the central processing unit (905). The virus is, thus, destroyed.

Assuming that a virus is a worm. A worm is virus that after infecting one computer in a network then it migrates to other computers infecting them all. Also, assuming that it was introduced in one connected computer in the network while installing an infected software in the computer of the prior art, or after the computer of the prior art was hacked. After the virus worm is executed by the computer of the prior art, it will migrate to other connected computer in the network, but once it arrives in another computer hosting the digital-DNA, it will have a problem, before the worm is executed in the new computer hosting the digital-DNA, the operating system (120) of the new computer will first decrypt the worm with its own device with the value of the encryption decryption key—which is another form of encryption—, and the worm will have its code changed (see FIG. 8C decrypted virus code (810C)), and once the central processing unit (905) tries to execute the new encrypted worm's code, it will not work and an error will ensure.

If a virus or worm (800C) is sent to an unsuspected user in an e-mail in the form of a link which once clicked will redirect the user to a malicious website, or, in the form of an infected e-mail attachment. After the user clicks on the link or on the infected attachment launching the worm, again, before the worm is executed, the operating system (120) of the computer (130) will first decrypt the virus worm with the encryption/decryption key (103) and in turn, the virus worm has its code changed to gibberish (see FIG. 8C decrypted virus code (810C)) and once the central processing unit (905) tries to execute it, the central processing unit will know that it is an un-authorized code and produces an error, or simply destroy it. Just as in a network, the virus worm will be killed before it can be executed/processed in the computer, therefore preventing infection and/or damage.

The encryption/decryption processes disclosed in FIG. 8A and FIG. 8B are for explanatory purposes only and not an actual result of an encryption/decryption. For instance, the digital-DNA (300) is not an actual XOR (or encryption of any form) between executable code, namely non-encoded software (310) and the value in memory location (120-A). Similarly, in FIG. 8C, there is no actual encryption between the virus or worm (800C) and the encryption/decryption key (103) value in memory location (120-A). Since, there are many encryption algorithms available and many ways to perform an encryption that, even if an actual encryption had been performed, the results would have varied.

Furthermore, the art of encryption is well established and since there are many state of the art encryption/decryption methods that may be used for purposes of carrying out the methods disclosed herein.

Overview of a Preferred Embodiment

In some preferred embodiments, three sequences are present:

1) The operating system (120) used at the installation time of non-encoded software (310) encrypts the executable code, i.e. encrypts the non-encoded software (310), producing the digital-DNA (300), shown in FIG. 8A. The operating system (120) then saves the digital-DNA (300) on the second-non-transitory computer storage medium (350) of the computer (130). And, 2) Before the central processing unit (905) executes the digital-DNA (300), the central processing unit (905) or the operating system (120) decrypts the digital-DNA (300) producing an unencrypted executable code (the non-encoded software (310)), which the central processing unit (905) understands, then the central processing unit (905) executes it (the executable code also referred to as the non-encoded software (310) of FIG. 8B).

3) If the operating system (120) is requested to load a virus executable code which is unencrypted (800C), the operating system (120) decrypts it (the operating system's behavior as controlled and described herein is to first decrypt an encrypted executable code before the central processing unit executes it) converting the virus code into the computer's digital-DNA (see FIG. 8C decrypted virus code (810C)), and once the central processing unit (905) tries to execute the FIG. 8C decrypted virus code (810C), the virus becomes gobbledygook that is un-executable because the central processing unit (905) only executes unencrypted code.

In other preferred embodiments, three sequences are also present:

1) The operating system (120) at the installation time of executable code (i.e. the non-encoded software (310)) encrypts the executable code producing the digital-DNA (300), shown in FIG. 8A. The operating system (120) then saves the digital-DNA (300) in the second-non-transitory computer storage medium (350) of the computer.

2) Before the central processing unit executes the digital-DNA (300), the operating system (120) stores the encrypted version in random access memory (925), and decrypts the encrypted version from random access memory (925), as requested by the central processing unit (905). Then, the central processing unit (905) executes the digital-DNA (300) as decrypted executable code. This digital-DNA (300) is also referred to as the non-encoded software (310) of FIG. 8B.

3) If the central processing unit (905) is requested to execute an executable code of a virus or worm (800C) stored in the random access memory (925), which would be unencrypted because it had to have been downloaded after startup, the operating system (120) will first decrypt the virus or worm (800C). The operating system's behavior using preferred methods disclosed herein is to first decrypt an encrypted executable code before it is executed. This decryption action converts the code of the virus or worm (800C) into gobbledygook, namely the decrypted virus code (810C), as illustrated in FIG. 8C. Once the central processing unit (905) execute the digital-DNA (300) that is infected with the decrypted virus code (810C), the virus gets disabled because the central processing unit (905) unit only executes code that it first decrypts. While the operating system (120) is described as performing the decryption of the digital- DNA (300), this is intended to include a decryption performed by central processing unit (905), or a combination of the macro operating system (955) and the central processing unit (905).

If an optional-header-identification-code (320) of FIG. 3 and FIG. 4 is present and valid, then once a file execution is requested, the operating system (120) proceeds as follows: Once the operating system (120) decrypts the Digital-DNA (300), the operating system (120) will retrieve the optional-header-identification-code (320) from the non-encoded software (310) and verify that it is present and valid. If it is present and valid, the operating system places the encrypted version of the non-encoded software (310)) in the random access memory (925) of the computer (130) for execution by the central processing unit (905) of the computer (130). If the header identification code is not there or not valid, the request to execute the software file is disregarded and an error generated. If the software happens to be a virus, then once the virus is decrypted (810C), the operating system (120) will not be able to locate the optional-header-identification-code (320) and the virus is disabled.

The device-with-encryption-decryption-key (100) may be used by the operating system (120) of the computer (130) for other purposes, such as for saving sensitive information that has to be available to the operating system (120) of the computer (130).

Also, the device-with-encryption-decryption-key (100) may be used by the operating system (120) to encrypt any kind of file and not limited to a software file. For instance, the encryption/decryption key (103) may be used by the operating system to encrypt a database file containing sensitive data like user's e-mail and other personal data.

Further, if the device-with-encryption-decryption-key (100) is implemented as an independent computer board, it may be a complete computer (see FIG. 9) on the board (the computer (130) and the device-with-encryption-decryption-key (100)), and the board installed into a computer.

If the device-with-encryption-decryption-key (100) is used to encrypt data, then a software library may be developed at the operating system level and integrated with developed software, thus enabling a software to call a function code in the library passing the data to be encrypted, and the operating system (120) using the encryption/decryption key (103) to encrypt the received data producing an encrypted data, then passing the encrypted data back to the software, and the software saving it into the database or file. The same will work for decrypting, the software passes an encrypted data to the operating system (120), and the operating system (120) returns decrypted data to the software.

By software it is meant to be interpreted broadly and not to apply to compiled code only, it may be batch files, script files, system files, interpreted code files, compiled code files, etc. It is any kind of file that the operating system, or the central processing unit, or an interpreter program will interpret or execute in terms to be able to perform their functions.

Installation of a Device-with-Encryption-Decryption-Key

Figure 10:
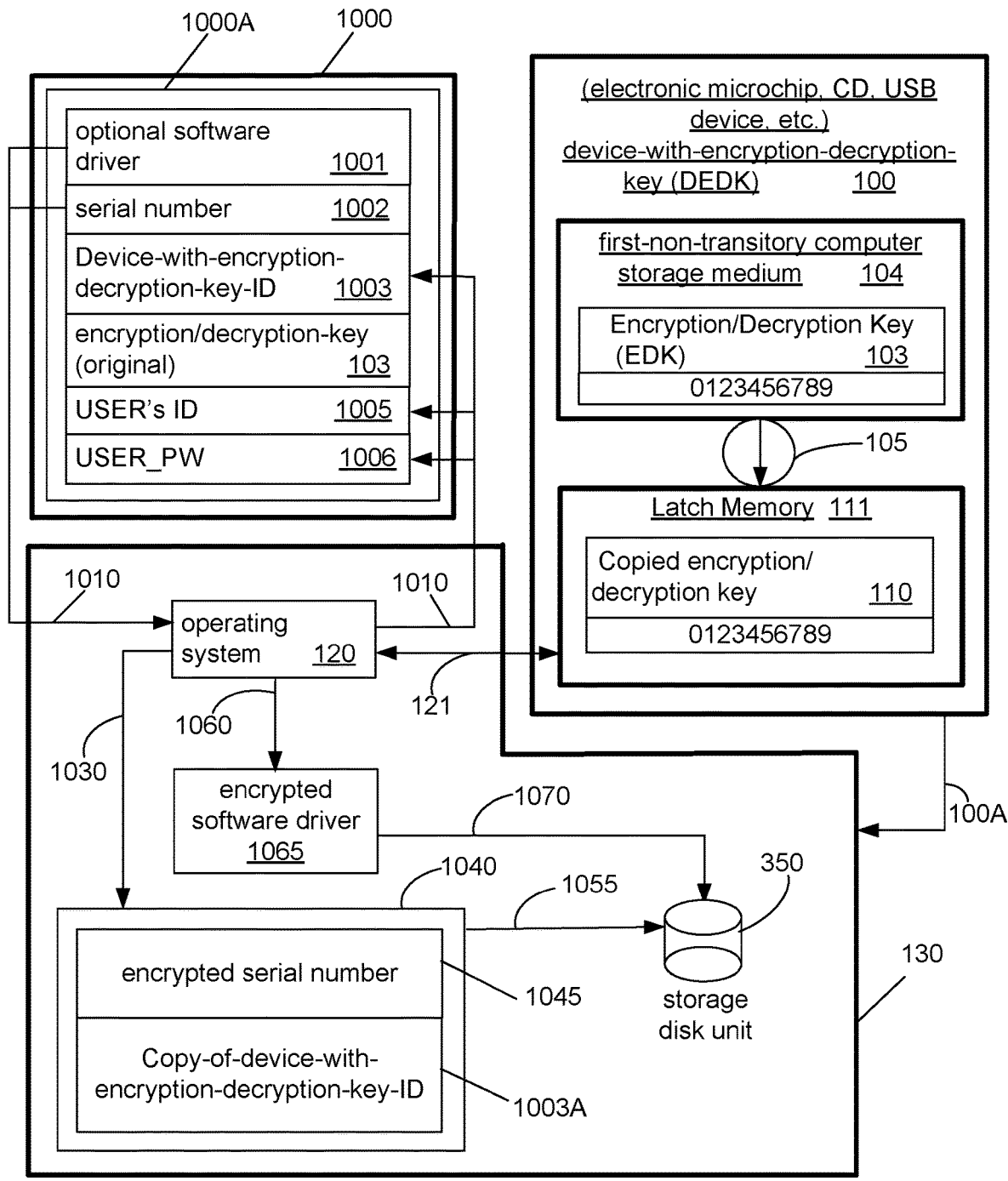
FIG. 10 illustrates the installation process of a new device-with-encryption-decryption-key.

FIG. 10 illustrates the installation process using a device-with-encryption-decryption-key (100) for the first time in the computer (130). The server computer (1000) has a database table (1000A) for every device-with-encryption-decryption-key (100) that is manufactured. The table containing the serial-number (1002) of the sold device-with-encryption-decryption-key (100) which is associated with the device-with-encryption-decryption-key-ID (1003) and with the encryption/decryption key (103), plus at least the optional software driver (1001). The optional software driver (1001) is not required since the encryption/decryption of software is done at the computer (130) and may be done exclusively by the operating system (120). Also, if the optional software driver (1001) is used, it is preferably available on a compact disk, or it may be downloaded from server computer (1000) or provided on another peripheral device.

The user begins by plugging in (see the first single-headed arrow line (100A)) in the device-with-encryption-decryption-key (100) into the computer (130) (if the computer doesn't have one part of its circuitry). This initiates a registration process. The user signs up on the server computer (1000) and provides through the operating system (120) or an installation driver, the user's ID (1005), the user's password (1006) and the device-with-encryption-decryption-key-ID (1003). The operating system (120) then sends the entered information through a first secure link (1010) to the server computer (1000).

The server computer (1000) then uses the device-with-encryption-decryption-key-ID (1003) that is received as a key to enable it to fetch the database table (1000A). The entered information (e.g., the user's ID (1005) and user's password (1006)) is saved in the database table (1000A) of the server computer (1000). Next, the server computer (1000) fetches the optional software driver (1001), then returns both via the first secure link (1010) to the operating system (120) of the computer (130).

Once the operating system (120) receives the transmission from the server computer (1000), then the operating system (120) retrieves (see the first double-headed arrow line (121)) from the latch memory (111), the encryption/decryption key (110) which becomes the copied encryption/decryption key (120-A) stored in the random access memory (925) of the computer (130) and under the control of the operating system (120)—FIG. 2B, FIGS. 3-4, FIG. 8A, FIG. 8B, and FIG. 8C. The operating system (120) then clears the encryption/decryption key from the latch memory (111) thereafter. The operating system (120) then uses the copied encryption/decryption key (120-A) to encrypt the received optional software driver (1001), producing (indicated by the twentieth arrow line (1060)) an encrypted software driver (1065). The operating system (120) then saves (see the twenty-third arrow line (1070)) the encrypted software driver (1065) in the second-non-transitory computer storage medium (350). Also, the operating system (120) encrypts the received serial-number (1002) to produce (see the nineteenth arrow line (1030)) an encrypted serial number (1045) of the device-with-encryption-decryption-key (100). The operating system (120) then associates the encrypted serial number (1045) with the unencrypted copy-of-device-with-encryption-decryption-key-ID (1003A) in the file (1040), and finally saves (see the twenty-second arrow line (1055)) both to the second-non-transitory computer storage medium (350).

The optional software driver (1001) that is received may or may not be encrypted, but for security reasons, it is preferred that it be encrypted. At the power up or reset of the computer (130), the operating system (120) would then decrypt the encrypted software driver (1065), deriving the decrypted software driver (935).

The purpose of saving the encrypted serial number (1045) and the unencrypted copy-of-device-with-encryption-decryption-key-ID (1003A) in a file (1040) is to enable making a replacement for the device-with-encryption-decryption-key (100) at a later time, in case the user loses the installed/original one.

Figure 11:
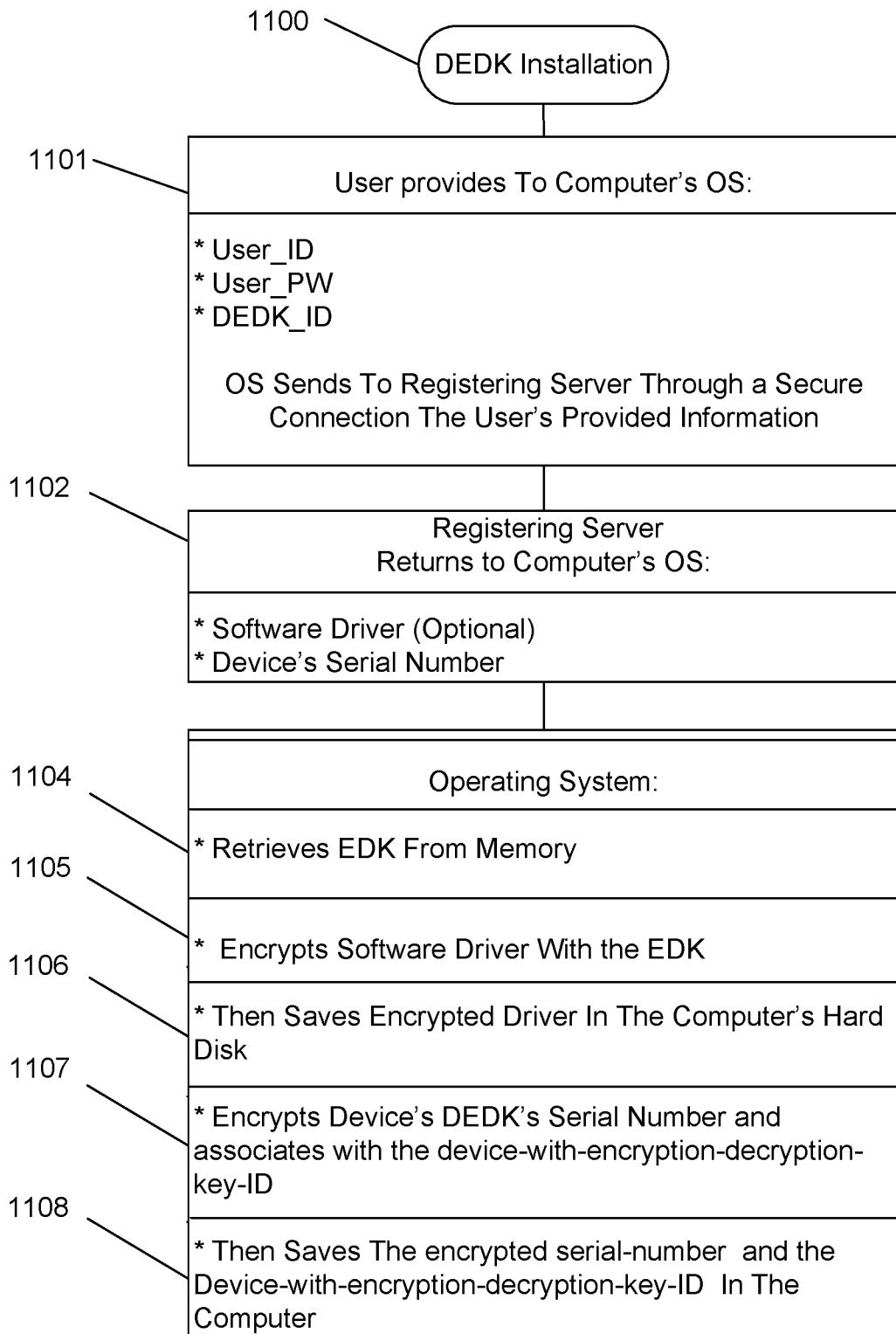
FIG. 11 illustrates a flowchart for the device of FIG. 10.

FIG. 11 provides a flowchart describing the steps consistent with FIG. 10. At step (1100), the user first plugs in the device-with-encryption-decryption-key (100) into the computer (130) and the registration process begins. At step (1101), the user provides to the operating system (120) the User's ID (1005), the user's password (1006), shown as User_PW, and the device-with-encryption-decryption-key-ID (1003), shown as DEDK_ID. Next, the operating system (120) sends the provided information to the server computer (1000) for registration through the first secure link (1010).

At step (1102), after the server computer (1000) validates the user provided device-with-encryption-decryption-key-ID (1003), the server computer (1000) sends through the same first secure connection via first secure link (1010) to the operating system (120), the optional software driver (1001), if any because it is optional, and the serial-number (1002) of the device-with-encryption-decryption-key (100).

At step (1104), after the operating system (120) receives the information from the server computer (1000), the operating system (120) retrieves a copy of the encryption/decryption key (103), which is then termed the copied encryption/decryption key (110). The retrieval is from latch memory (111) of the device-with-encryption-decryption-key (100) and the retrieved copy becomes the copied encryption/decryption key (120-A) under the control of the operating system (120)—FIG. 2B, FIGS. 3-4, FIG. 8A, FIG. 8B, and FIG. 8C.

At step (1105), the operating system (120) encrypts the optional software driver (1001) with the copied encryption/decryption key (120-A) producing an encrypted software driver (1065).

At step (1106), the operating system (120) saves the encrypted software driver (1065) to the second-non-transitory computer storage medium (350).

At step (1107), the operating system (120) using the copied encryption/decryption key (120-A) encrypts the received serial-number (1002) of the device-with-encryption-decryption-key (100) producing an encrypted serial number (1045) then associating the encrypted serial number (1045) with the unencrypted copy-of-device-with-encryption-decryption-key-ID (1003A).

At step (1108), the operating system (120) saves the encrypted serial number (1045) and the unencrypted copy-of-device-with-encryption-decryption-key-ID (1003A) to a file (1040) in the second-non-transitory computer storage medium (350).

Cradle Encodes a Replacement Device-with-Encryption-Decryption-Key

FIG. 12 illustrates a mechanism to solve the problem of a misplaced or lost universal serial bus device that is the device-with-encryption-decryption-key (100). The device-with-encryption-decryption-key (100) is only to be used once at the computer's power up and reset. Basically, it is an option for a user to insert the device-with-encryption-decryption-key (100) into a universal serial bus port and then after the computer's power up or reset, then the user removes it. Preferably, the device-with-encryption-decryption-key (100) is programmed to automatically isolate itself without the user's intervention.

If the user were to lose the device-with-encryption-decryption-key (100), the user would need to have the encryption/decryption key (103) in its original state replicated in a replacement device-with-encryption-decryption-key in order to gain access the user's computer. Providing a replacement device-with-encryption-decryption-key is not a simple matter since security would be compromised if any software could gain access to the encryption/decryption key (103).

The company manufacturing the device-with-encryption-decryption-key (100) preferably safely retains the encryption/decryption key (103) for each device-with-encryption-decryption-key (100) as the encryption/decryption key (103). The manufacturer may, for example, match the serial-number (1002) of the device-with-encryption-decryption-key (100) to the encryption/decryption key (103). Any other kind of an identifier for matching may be used. Once the buyer registers the replacement device-with-encryption-decryption-key (100) as explained in FIGS. 10-11, the manufacturer associates the user with the replacement device-with-encryption-decryption-key (100) and its serial-number (1002).

Alternatively, a cradle (1235) is made available to enable the replacement device-with-encryption-decryption-key to be inserted into it. The cradle (1235) is preferably inserted into a computer's universal serial bus or any kind of port (see the twenty-sixth arrow line (1200B) in FIG. 12). Preferably, the cradle (1235) is the only device having direct contact with the device-with-encryption-decryption-key (100). The cradle (1235) being this only device would prevent unwanted access to the device-with-encryption-decryption-key (100).

The cradle (1235) receives the encryption/decryption key (103) in its original state from the server computer (1000) along with additional information required for the operating system (120) to initiate the saving of the encryption/decryption key (103) in its original state into a new DEDK (1250). The operating system (120) preferably sends a signal or a code to the cradle (1235) connected to the computer (130). The cradle (1235) in turn sends a signal to the new DEDK (1250) indicating that the new DEDK (1250) received the replacement for the encryption/decryption key (103). Then the new DEDK (1250) saves the encryption/decryption key (103) in its original state which would enable the computer (130) to function with the replacement of the encryption/decryption key (103), and the new DEDK (1250) becomes the new device-with-encryption-decryption-key (100). The method of saving the encryption/decryption key in its original state into the new DEDK (1250) may be done by the cradle (1235), or by the new DEDK (1250).

The guiding precept is that: no software of any kind, other than the operating system (120), should have direct access to the device-with-encryption-decryption-key (100). If it were otherwise, then a hacker code could be written with a specific purpose of reading the encryption/decryption key (103) from the device-with-encryption-decryption-key (100), or of saving a fake encryption/decryption key therein for the purpose of defeating the security of the device-with-encryption-decryption-key (100).

FIG. 12 illustrates the saved record in the server computer (1000) described in the teachings of FIG. 10. Once a user provides her/his credentials: The user's ID (1005), the user's password (1006) and the device-with-encryption-decryption-key-ID (1003) to the operating system (120), then the operating system (120) sends them through a second secure link (1200) to the server computer (1000).

After the server computer (1000) has verified the user's credentials. The server computer (1000) uses the device-with-encryption-decryption-key-ID (1003) as a record identifier and retrieves from the database table (1000A) the serial-number (1002) of the original device-with-encryption-decryption-key (100) and the encryption/decryption key (103) of the original device-with-encryption-decryption-key (100), then the server computer (1000) returns the serial-number (1002) and the encryption/decryption key (103) via the second secure link (1200) to the operating system (120).

There are two ways for the operating system (120) to supply the device-with-encryption-decryption-key-ID (1003) to the server computer (1000). The user may supply it, or the operating system (120) may provide it. If the operating system (120) is to provide the device-with-encryption-decryption-key-ID (1003), then the operating system (120) would fetch the unencrypted copy-of-device-with-encryption-decryption-key-ID (1003A) from the file (1040) stored in the second-non-transitory computer storage medium (350) of the computer (130) shown in FIG. 3, then send device-with-encryption-decryption-key-ID (1003A) to the server computer (1000) along with the user's supplied credentials: user identification, namely the user's ID (1005) and the user's password (1006), namely User-PW.

Once the operating system (120) receives through the second secure link (1200) the necessary information from the server computer (1000), the operating system (120) proceeds to retrieve (see the twenty-seventh arrow (1210)) from the second-non-transitory computer storage medium (350), shown in FIG. 3, of the computer (130), the record, namely the file (1040). The file (1040) contains the encrypted serial number (1045) of the device-with-encryption-decryption-key (100) and the unencrypted copy-of-device-with-encryption-decryption-key-ID (1003A). Then the operating system (120) uses the encryption/decryption key (103) that was received and decrypts (see the twenty-fourth arrow line (1215)) the encrypted serial number (1045), producing the decrypted serial-number.

If the decrypted serial number matches with the received serial-number (1002), then the operating system (120) proceeds saving the encryption/decryption key (103) into the replacement for the new DEDK (1250) attached (see the twenty-fifth arrow line (1200A)) to the cradle (1235). If there is no match, then the process ends and the operating system (120) issues and error to the user.

After the operating system (120) finds a match, then the operating system (120) proceeds and makes the encryption/decryption key (103) available via third secure link (1230) to the cradle (1235). The process of making the encryption/decryption key (103) available to the cradle (1235) may be performed by the operating system (120) or by any other specialized program, like a software driver (935), working in conjunction with the operating system (120). After the encryption/decryption key (103) is received by the cradle (1235), the cradle (1235) stores the encryption/decryption key (103) that was received in cradle latch memory (1236).

Preferably, the cradle (1235) sends a signal through a fifth secure link (1240) to the attached new DEDK (1250) which is the tristate switch (106) of FIG. 1B. The cradle (1235) preferably, also sends a signal through a seventh secure link (1240A) to the new DEDK non-transitory computer storage medium (1260) of the attached new DEDK (1250), and thereafter the cradle (1235) transmits through the fourth secure link (1245) the received encryption/decryption key (103), which is stored in the cradle latch memory (1236), to the latch memory, i.e. the new DEDK latch memory (1251). Once the new DEDK (1250) receives the encryption/decryption key (103) through sixth secure link (1255), the new DEDK (1250) stores the bytes of the received encryption/decryption key (103) in the new DEDK non-transitory computer storage medium (1260), which may be flash memory or other physical security device. And the new DEDK (1250) becomes the new device-with-the-encryption-decryption-key (100).

Alternatively, the cradle (1235) writes the encryption/decryption key (103) received from the operating system (120) directly into the memory location in the new DEDK non-transitory computer storage medium (1260) of the new DEDK (1250). For instance, if the cradle (1235) writes the encryption/decryption key (103) in its original state directly into a memory location in the new DEDK non-transitory computer storage medium (1260), then the signal, sent through the fifth secure link (1240), may not be used and the tristate switch (106) may not be present.

Figure 13:
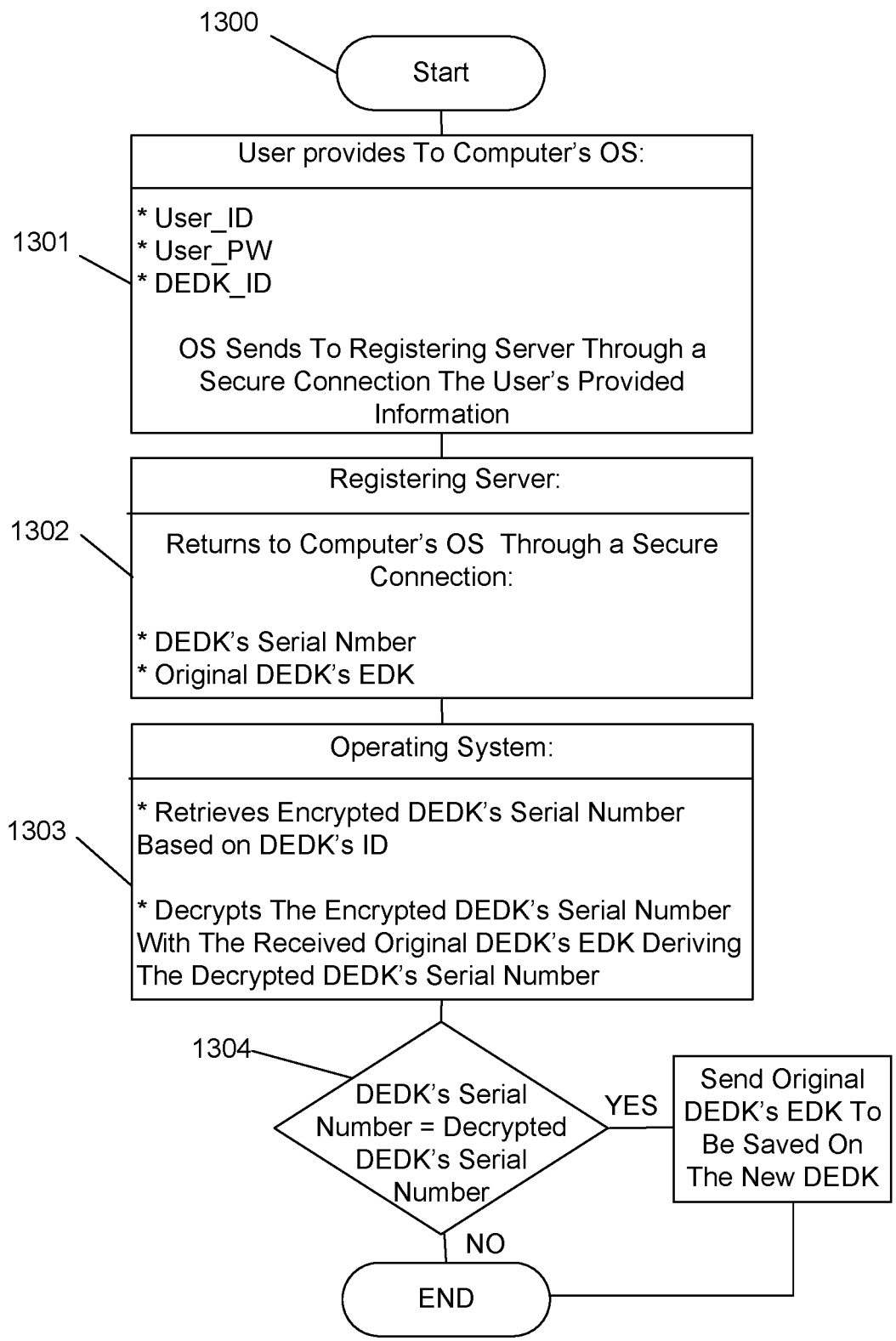
FIG. 13 illustrates a flowchart for the device of FIG. 12.

FIG. 13 illustrates the flowchart describing the steps taken consistent with FIG. 12. It is assumed that the new DEDK (1250) with encryption decryption key is plugged into the cradle (1235).

At step 1300, the initiation of the process to retrieve the encryption/decryption key (103) from the server computer (1000) begins.

At step (1301), the user at the computer (130) provides the user's ID (1005), user's password (1006) and the device-with-encryption-decryption-key_ID (1003) to the operating system (120) of the computer (130). Then, the operating system (120) sends the user's provided information to the server computer (1000) via second secure link (1200).

At step 1302, the server computer (1000) returns, via the second secure link (1200) to the operating system (120) of the computer (130), the serial-number (1002) of the device-with-encryption-decryption-key (100) and the encryption/decryption key (103).

At step 1303, the operating system (120) retrieves the encrypted serial number (1045) of the device-with-encryption-decryption-key (100) and decrypts it with the received encryption/decryption key (103) deriving a decrypted serial number.

At step (1304), the operating system (120) determines if the serial-number that was decrypted matches the received serial-number (1002) of the device-with-encryption-decryption-key (100). If yes, then the operating system (120) sends the received encryption/decryption key (103) to be saved in the new DEDK non-transitory computer storage medium (1260) of the new DEDK (1250) and the process ends. If a match is not found, the operating system (120) will alert the user and end the process.

Software Only Implementation of the Invention

In an alternative embodiment, the method to achieve the same virus protection is implemented with the use of software only, instead of a combination of software and hardware. In this arrangement, either a mobile computer or a non-mobile computer holds a software application and the computer to be protected (to wit, the client computer) also holds a software application. The software application in the computer (130) preferably performs encryption of executable codes therein, and therefore functions as the software driver (935).

The software arrangement is a good fit for protecting laptop computers or any kind of transportable mobile device without requiring the purchasing of a physical device with an encryption/decryption key. In this arrangement, the device-with-encryption-decryption-key is replaced by software implemented in the mobile device or the non-mobile computer. For simplicity of the discussion, applicant refers to the mobile device and intends that the discussion should be interpreted to apply also to the non-mobile device, as may be appropriate.

Figure 14:
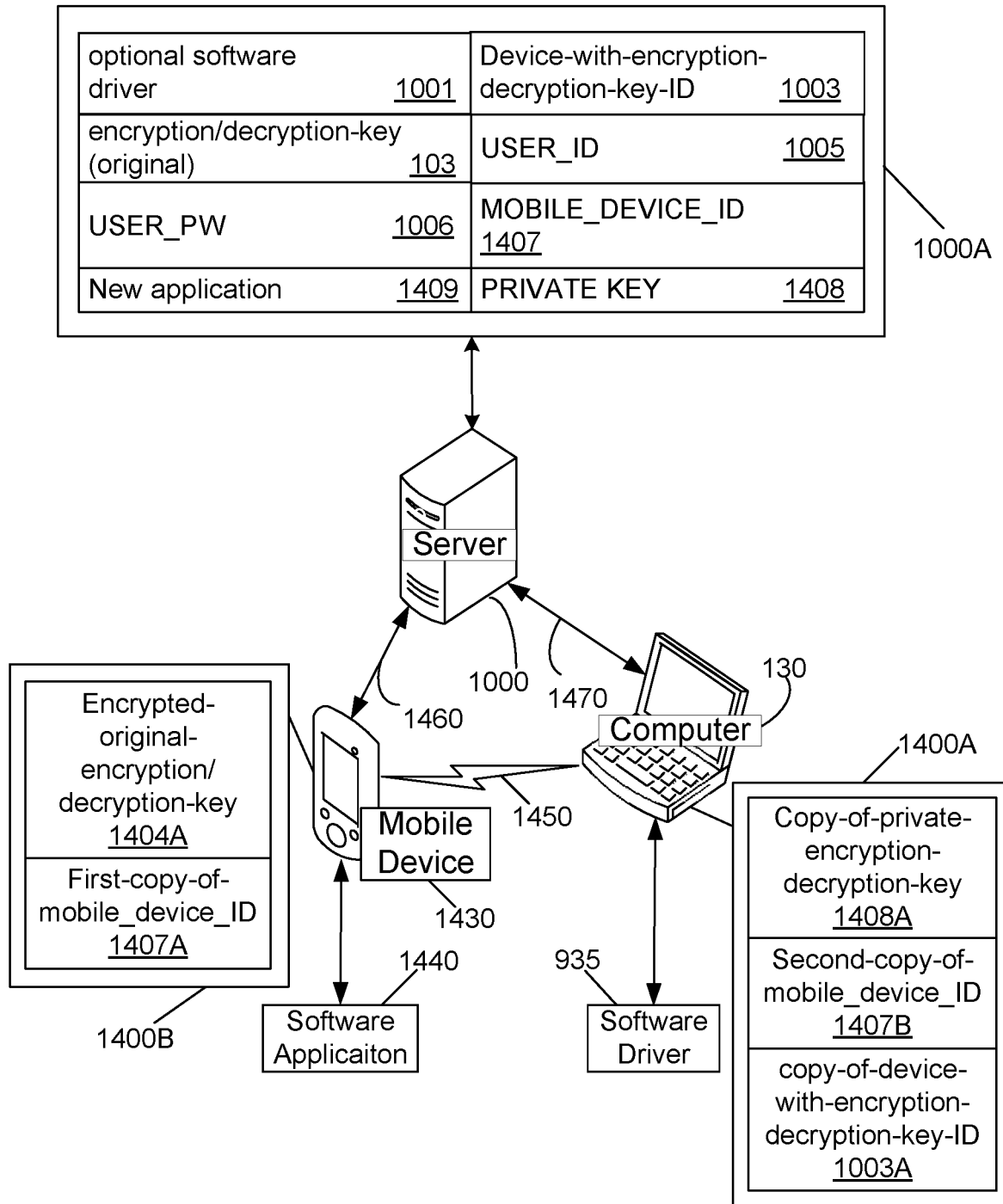
FIG. 14 illustrates the invention's implementation with software alone.

FIG. 14 is consistent with FIG. 2A, FIG. 9, and FIG. 10. FIG. 14 illustrates another embodiment that enables the same virus protection to be implemented with the use of software only, that is, without the use of a physical hardware device (e.g., the device-with-encryption-decryption-key (100)). The mobile device (1430) of the user becomes the device-with-encryption-decryption-key (100). A server computer (1000) through eight secure connection, communicates (1460) with a mobile device (1430). The server computer (1000) also communicates through ninth secure connection (1470) with the computer (130) of the user. The mobile device (1430) communicates with the computer (130) through a wireless connection, such as a Bluetooth connection (1450).

A user accesses the server computer (1000) and obtains through eighth secure connection (1460) a new application (1409) from the database table (1000A) of the server computer (1000), which becomes a software application (1440) in the mobile device (1430). The user also downloads an optional software driver (1001) from the database table (1000A) on the server computer (1000) into the computer (130) and it becomes software driver (935) at the computer (130). The database table (1000A) is the same to the database table (1000A) in the server computer (1000) of the manufacturer while discussing FIG. 10 and FIG. 12, with some new items/fields added to it. The serial-number (1002) is missing since there is not a physical device in the software only implementation of this embodiment. Instead of the serial-number (1002), the mobile device's ID, e.g. mobile_device_ID (1407) is present and it is used for the same purpose to identify the device acting as the device-with-encryption-decryption-key (100), in this embodiment, the mobile device (1430).

The user registers the software application (1440) with the server computer (1000), providing to the server computer (1000) a user's ID (1005) and user's password (1006). The server computer (1000) saves the user's ID (1005) and user's password (1006) to its database table (1000A).

Then the server computer (1000) creates a mobile_device_ID (1407), the encryption/decryption key (103), and a private key (1408), which is symmetric and used for encryption and decryption, then saving them in the database table (1000A) of the server computer (1000). The mobile_device_ID (1407) is used to identify the device acting as the device-with-encryption-decryption-key (100). The mobile_device_ID (1407) has the same purpose as of the serial-number (1002) used to identify the physical device, i.e. the device-with-encryption-decryption-key (100).

The term "symmetric" in "symmetric key," or in variations of it, such as in "symmetrical private key schema," is well-known term in the art and is used to signify that a single encryption key is used to encrypt and decrypt.

In contrast, in an asymmetric encryption schema, also called public key encryption, two keys are needed: a private key and a public key. The private key is used by the message sender to encrypt a message; the public key is available to anyone who wishes to decrypt the message encrypted with the private key.

In preferred embodiments of the devices and methods disclosed herein, the device symmetrical private key schema is used. This means that preferably the same key is used for encryption of an original software program producing an encrypted software program, and for decryption of the encrypted software program to reproduce the original software program.

In FIG. 14, the server computer (1000), using the private key (1408), encrypts the encryption/decryption key (103), producing an encrypted-original-encryption/decryption-key.

Then the server computer (1000) transmits, via the eighth secure connection (1460) the mobile_device_ID (1407) and the encryption/decryption key (103) that is encrypted, to the mobile device (1430). After receiving, the mobile device (1430) saves the received encryption/decryption-key as an encrypted-original-encryption/decryption-key (1404A) and the received mobile_device_ID (1407) as first-copy-of-mobile_device_ID (1407A) in a file (1400B) in the mobile device (1430) non-transitory medium (not shown).

The user uses the computer (130) through the software driver (935) (the software driver can be a separate software application downloaded from server computer (1000) as well, like new application (1409) or something similar. But for sake of simplicity, the software driver will be used) provides the user's ID (1005), the user's password (1006), and the first-copy-of-mobile_device_ID (1407A), and the computer (130) logs into the server computer (1000) via the ninth secure connection (1470). The server computer (1000) after receiving information sent from the computer (130), creates a device-with-encryption-decryption-key-ID (1003) and after associating it with the mobile_device_ID (1407), saves the device-with-encryption-decryption-key-ID (1003) in the database table (1000A).

Then the server computer (1000) transmits to the computer (130) via the ninth secure connection (1470) the device-with-encryption-decryption-key-ID (1003) and the private key (1408). The private key (1408) is used at a later step for decryption of the encrypted-original-encryption/decryption-key (1404A).

And once the computer (130) receives them from the server computer (1000), the computer (130) saves in the file or database table (1400A) in the second-non-transitory computer storage medium (350) of the computer (130): the received first-copy-of-mobile_device_ID (1407A) as second-copy-of-mobile_device_ID (1407B); the received private key (1408) as copy-of-private-encryption-decryption-key (1408A); and the received device-with-encryption-decryption-key-ID (1003) as copy-of-device-with-encryption-decryption-key-ID (1003A).

After both, the computer (130) and the mobile device (1430) communicate with the server computer (1000) and registers with it, then the mobile device (1430) and the computer (130) are ready to communicate through the communication link, e.g. the Bluetooth connection (1450) with each other. The user at the mobile device (1430) initiates the software application (1440) and the software driver (935) on the computer (130). Then the computer (130) and the mobile device (1430) communicate through the software application (1440) and the software driver (935) using the communication link, e.g. the Bluetooth connection (1450). The communication link, e.g. the Bluetooth connection (1450), can be any kind of link: wired or wireless.

As a next step, the user types the first-copy-of-mobile_device_ID (1407A) into the mobile device (1430) or the software application (1440) may present it for the user selection, instead. And the mobile device (1430) transmits first-copy-of-mobile_device_ID (1407A) and the encrypted-original-encryption/decryption-key (1404A) to the computer (130) through the Bluetooth connection (1450).

Once the computer (130) receives from the mobile device (1430) the first-copy-of-mobile_device_ID (1407A) and the encrypted-original-encryption/decryption-key (1404A), the computer (130) compares the first-copy-of-mobile_device_ID (1407A) that was received with the second-copy-ofmobile_device_ID (1407B) that is stored in the second-non-transitory computer storage medium (350) of the computer (130), and if there is a match, the computer (130) does the following:

1) sends an acknowledgement back to the client device, i.e. the mobile device (1430), and once the mobile device (1430) receives the acknowledgement, it ends the communication with the computer (130).

2) decrypts the received encrypted-original-encryption/decryption-key (1404A) with the copy-of-private-encryption-decryption-key (1408A) deriving a decrypted encryption/decryption key (103);

3) uses the decrypted encryption/decryption key (103) to encrypt any new software before installing it producing the digital-DNA (300) then saving the digital-DNA (300) in the second-non-transitory computer storage medium (350) of the computer (130) as the only installed software copy, decrypting the digital-DNA (300) of the computer (130) prior to its execution.

If anything happens to the mobile device (1430) such that the encrypted-original-encryption/decryption-key (1404A) is not available, or if the encrypted-original-encryption/decryption-key (1404A) is needed in another mobile device, then preferably the following sequence of events may be implemented:

1) The user logs in with the computer (130) providing the user's ID (1005) and user's password (1006).

2) The computer (130) provides to the user the second-copy-of-mobile_device_ID (1407B);

3) The user installs a new application in the new mobile device, connects the new mobile device to the server computer (1000) through the new application, and provides via eighth secure connection (1460) to the server computer (1000) the user's ID (1005), the user's password (1006) and the mobile_device_ID (1407) which is the received copy of the second-copy-of-mobile_device_ID (1407B) from the computer (130).

4) The server computer (1000) encrypts the encryption/decryption key (103) with the private key (1408) deriving an encrypted encryption/decryption key.

5) Then, the server computer (1000) transmits via the eighth secure connection (1460) the encrypted encryption/decryption key to the new mobile device.

6) Then the new mobile device associates the encrypted encryption/decryption key with the mobile_device_ID (1407) and saves the encrypted encryption/decryption key as encrypted-original-encryption/decryption key (1404A) and the mobile_device_ID (1407) as the first-copy-of-mobile_device_ID (1407A) in the non-transitory storage of the new mobile device.

7) Thereafter, the new mobile device will be able to communicate, e.g. using a Bluetooth connection (1450) with the computer (130), as previously.

If an embodiment is implemented on a mobile device (1430) and the computer (130) doesn't have wireless or Bluetooth connection (1450), then a universal serial bus device can be employed to plug into the computer (130) and used to communicate between the computer (130) and the mobile device (1430). Or, the mobile device (1430) and computer (130) may communicate through the server computer (1000), wired or wireless connection.

A mobile device and a client have been illustrated but it can be implemented between two mobile devices, or in between two clients, or in between two servers. As long two computing devices of any kind are able to communicate, it will do.

Code Injection Hacking

Besides a plethora of viruses in the form of a computer file, hackers have in their arsenal one more destructive hacking method, and it is code injection into a server's running process. Code injection may be done in the user's client computer as well, but the focus of this disclosure is related to the server computer, but a client computer can be affected, nonetheless.

FIG. 15 illustrates a method of remote code injection hacking commonly in use today. The hacker at a hacker's client (1500) uses a hacker-server-access-connection (1515) (see the fifth double-headed arrow line) to access a server (1510) and try to discover a flaw in any software, i.e. a running process (1545), operating on the server (1510) or any hardware flaw which may be present in the server (1510).

The hacker at the hacker's client (1500) running the terminal software (1530), the terminal software (1530) while connected through the hacker-server-access-connection (see the fifth double-headed arrow line, the hacker-server-access-connection (1515)) with the server (1510), acts as a window (1525) into the server (1510). Once a flaw in the server (1510) is found, the hacker then sends hacker's code (1550) from the window (1525) to a running process (1545) on the server (1510) (see the first dashed single-headed arrow line (1527)). This process is called: code injection. Once the hacker using terminal software (1530) gets inside the server (1510), the hacker can do any action at will, and in the majority cases, can do so without leaving any trace of its presence in the compromised server (1510).

The means for the hacker to inject executable code, namely the hacker's code (1550), into a compromised computer, e.g. the server (1510), is the hacker's access to the running process (1545) on the server (1510). The hacker's code (1550) is typically in the same format as the running process (1545) and, the operating system on the server (1510) and central processing unit are not able to make any distinction of the two codes in the random access memory of the server (1510). Therefore, executing both as if both are the native intended code of the running process (1545) operating on the server (1510).

Code Execution of the Prior Art

Computers understand electronic signals and they are represented in the form of low-signal which is a zero "0", and high-signal which is a one "1". Before a program's code in the format written by a computer programmer is processed by the computer's central processing unit, the program-code gets compiled and each instruction of the program-code gets translated into the format a computer understands: zeroes and ones. Zeroes and ones can also be converted into a hexadecimal format equivalent. The explanations below employ the hexadecimal format.

A hexadecimal format is a form of translating values using a sixteen-digit format, half byte we've discussed prior. For instance, we humans use the decimal system because we have ten fingers in our hands, therefore, using the base ten is appropriate. Since computers use only zeroes and ones, then a binary system is used.

But as explained before, the computer architecture handles zeroes and ones with the base of two. The values start with one, then one is multiplied by two (to wit, base two), becoming four. And four is multiplied by two, becoming eight. And eight multiplied by two becoming sixteen, which represents half-byte. A byte has "8" bits which represents the decimal values from "0-255".

The hexadecimal format represents a half-byte values and it goes from "0-9" to represent the decimal values of "0-9". The decimal equivalent from "10-16", is represented as follows: "A=10", "B=11", "C=12", "D=13", "E=14" and "F=15". Therefore from "0" to "15" has "16" numbers—a hex.

The hexadecimal representation still not a binary representation, but it is a representation that enables a programmer to explain what the underlying binary value in the computer's memory is.

As an example, the hexadecimal value of "EF" is the equivalent decimal value of "239". Conversion of the hexadecimal value "EF":"E=14—decimal" and "14=1110—binary"; "F=15—decimal" and "15=1111—binary". Therefore, the hexadecimal value becomes the binary value of: "11101111", which is the value of "239". The hexadecimal value of "EF" becomes the binary value "11101111" stored into the computer's memory and executed by the computer's central processing unit. We'll be using hexadecimal values but it is to be understood that what is stored in the computer's random access memory is its binary equivalent.

FIG. 16 illustrates an exemplar code in the random access memory in the server (1510). The running process (1545) having a code equivalent (1600). And the hacker's code (1550) having the hacker's code equivalent (1610). The code equivalent (1600) of the running process and hacker's code equivalent (1610) are the computer executable code being used/executed by the central processing unit of the server (1510). The code equivalent (1600) represents the actual computer code of the running process (1545) which is executed by the central processing unit of the server (1510). The hacker's code equivalent (1610) represents the hacker's code (1550), also the actual computer code which is executed by the central processing unit of the server (1510).

As illustrated, the format for the code equivalent (1600) for the running process (1545) is the same code format for the hacker's code equivalent (1610) for the hacker's code (1550. The central processing unit of the server (1510) does not distinguish the code equivalent (1600) that is intended and which is the good code, from the non-intended code, which is the hacker's code equivalent (1610). Therefore, the central processing unit of the server (1510) executes both.

Encrypting Random Access Memory Data

Figure 17:
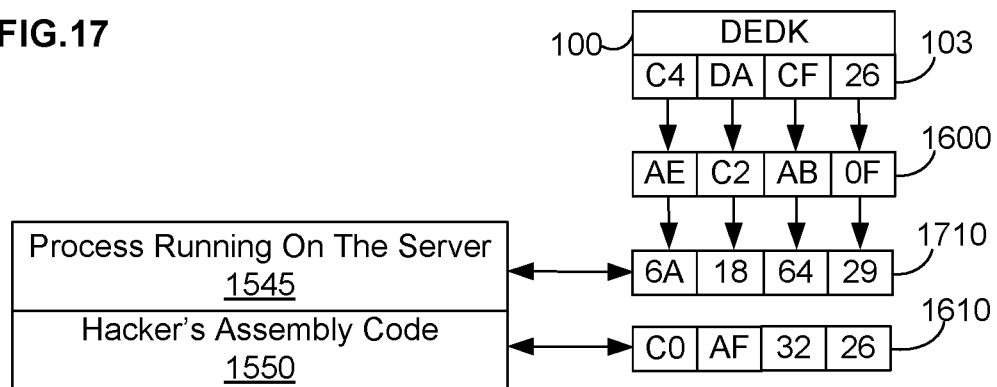
FIG. 17 illustrates code execution stored in a computer random access memory using devices and methods disclosed herein.

FIG. 17 illustrates the execution of encrypted code and data stored in the computer's random access memory using a preferred method disclosed herein. The running process (1545) has the code equivalent (1600) and the hacker's code (1550) has the hacker's code equivalent (1610), as explained above in regard to FIG. 16. The code equivalent (1600) is encrypted with the encryption/decryption key (103) producing the encrypted code (1710). The encrypted code (1710) becomes the new code equivalent for the running process (1545) which is stored into the random access memory (925) of the server (1510) for execution by the central processing unit (905) of the server (1510).

Each byte of the encryption/decryption key (103) is used to encrypt (e.g., by XORing in this example) one byte of the code equivalent (1600) of the running process (1545) producing one byte of the encrypted code (1710) that is stored in the random access memory (925) of the server (1510). The encrypted code (1710) becomes the new encrypted code equivalent for the running process (1545). As illustrated, the hacker's code (1550) is stored as is without any encryption, since the hacker does not have access to the encryption/decryption key (103).

Executing Encrypted Code from Random Access Memory

When stopping code injection into a process (e.g., a program) running in the random access memory (925) of the computer (130), the operating system (120) may function differently than as already explained for stopping virus infection of the software program (330).

As already explained, in applying a preferred method for stopping virus infection of non-encoded software (310), the operating system (120) decrypts the encrypted software file (to wit, the digital-DNA (300)) and stores the decrypted version, the non-encoded software (310), into the random access memory (925) of the computer (130). The mentioning of the computer (130) is to be interpreted as to cover the server (1510) or any computing device as well.

In order to provide more rigorous computer protection, a preferred method must preclude the hacker's code (1550) from being injected into a running process in the random access memory (925) of the computer (130).

Instead of the operating system (120) decrypting the encrypted software program, namely the digital-DNA (300), and storing the non-encoded software (310) in the random access memory (925) of the computer (130), the operating system (120), instead decrypts the optional-header-identification-code (320) and if it valid, e.g. contains the phrase "VALIDATED DNA", the operating system (120) removes the optional-header-identification-code (320) and stores the encrypted version software file code, the digital-DNA (300), into the random access memory (925) of the computer (130).

Figure 18:
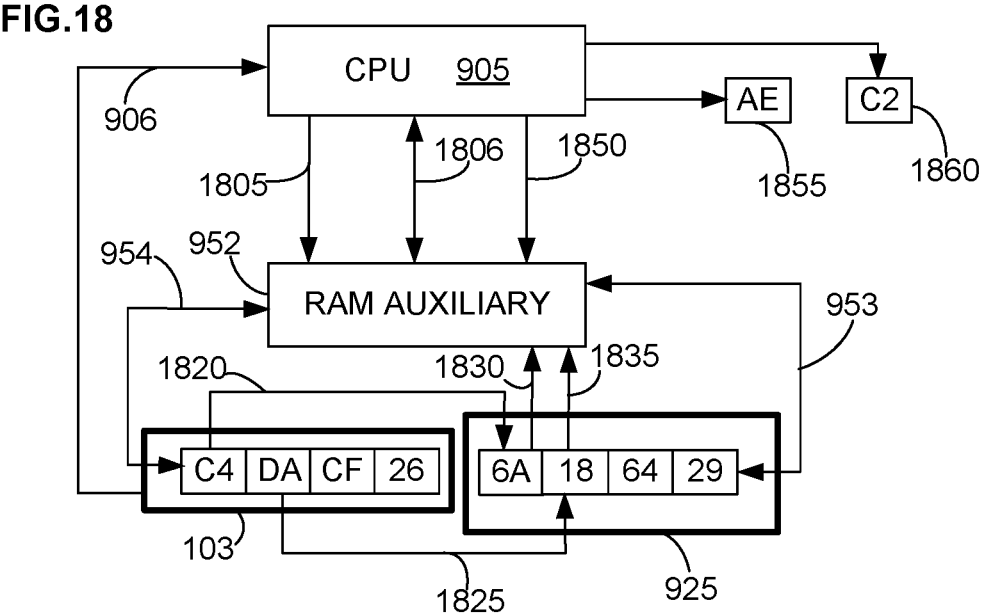
FIG. 18 illustrates the code execution using a disclosed preferred embodiment.

FIG. 18 illustrates this preferred method where the central processing unit (905) working in conjunction with random access memory auxiliary (952) processes encrypted code stored in the random access memory (925) of the computer (130). The address bus lines (1850), the data bus lines (1806), and the read/write line (1805) of the central processing unit (905) are connected to the random access memory auxiliary (952). Whenever, the central processing unit (905) needs code for processing (e.g., data), or execution (e.g., computer instruction code), or data to be stored into the random access memory (925), the central processing unit (905) sets a signal on read/write line (1805). In our exemplar explanation, if the read/write line (1805) has a low "0" value, it indicates a read from the random access memory (925), if it has a high "1", it indicates a write into the random access memory (925).

The central processing unit (905) sets the read/write line (1805) to "0" indicating a read, and it also places a value on the address bus lines (1850) indicating the location in random access memory (925) it intends to read. The random access memory auxiliary (952) proceeds and calculates which the byte value of the encryption/decryption key (103) it will use to decrypt the encrypted stored byte in random access memory (925) addressed by a value the central processing unit (905) has placed of the address bus lines (1850).

Encrypting and decrypting an encrypted continue string using an encryption key is easy. It starts by applying the first byte value of the string to the first value of the encryption key, one by one, from the first to the last byte of the encryption string against bytes of the string being encrypted/decrypted, and then starting from the beginning of the encryption key all the way to the end of it again, and again, until the whole string is encrypted/decrypted. As an example, a string to be encrypted '1234', the encryption key '12'. At the first pass, the bytes '12' of the string to be encrypted is encrypted with the bytes '12' of the encryption key. At the second pass, the bytes '34' of the string to be encrypted is encrypted with the bytes '12' of the encryption string.

But encrypting and decrypting data byte stored in random location of the random access memory (925) of the computer (130) requires a sophisticated algorithm to identify which byte of the encryption key is used to encrypt and decrypt the precise memory byte location addressed by the central processing unit (905). The explanation for the algorithm follows.

The random access memory auxiliary (952) takes a modulus between the value of the address bus lines (1850) and the length of the encryption/decryption key (103) deriving the modulus value (e.g., the random access memory address at the address bus lines (1850) MOD length of the encryption/decryption key (103)). Then adding the value of '1' to the derived modulus value deriving a summed value. Then using the summed value to point to a location of the encryption/decryption key (103), then using the respective value of the encryption/decryption key (103) where the derived summed value has pointed thereto to decrypt the location byte-value of the random access memory (925) addressed by the address bus lines (1850) of the central processing unit (905).

If it is assumed that the location of the random access memory (925) addressed by the central processing unit (905) is the first location, location zero (the binary system starts at a zero which represents the first location) with the encrypted value of "6A". The random access memory auxiliary (952) takes the modulus between the length of the encryption/decryption key (103) which is "4" and the location address which "0", the modulus operand result will be "0" (zero) (0 mod 4=0) and the value of '1' is added to the derived modulus result (0+1=1). Then the first byte of the value "C4" of the encryption/decryption key (103) is used in an XOR (any other encryption schema may be used) operation to decrypt (see the twenty-eight single-headed arrow line (1820)) the value "6A" deriving the decrypted value (see the twenty-ninth single-headed arrow line (1830)). Then the random access memory auxiliary (952) returns the decrypted value "AE" to the central processing unit (905) using the data bus lines (1806), and the central processing unit (905) executes the instruction value "AE" (1855).

Next, the central processing unit (905) requests the next byte at location "1" which represents the second location in the random access memory (925) of the computer (130). Then, the random access memory auxiliary (952) takes a modulus between the byte location "1" and the encryption/decryption key length which is "4" deriving the modulus value of "1" (1 mod 4=1) then adding the value of '1' to the derived modulus value deriving the summed modulus value of '2' (1+1=2). Then the random access memory auxiliary (952) uses the second byte "DA" of the encryption/decryption key (103) and in XOR operation (see thirty-first single-headed arrow line (1825)) decrypts the byte-value "18" of the byte memory location "2" deriving the decrypted value (see the thirtieth single-headed arrow line (1835)). Then random access memory auxiliary (952) returns the derived decrypted value of "C2" to the central processing unit (905) using the data bus lines (1806). And lastly, the central processing unit (905) executes the decrypted instruction byte-value "C2" (1860).

Preferably, the random access memory auxiliary (952) has a direct access connection (see the fourth double-headed arrow line (953) see also (FIG. 9)) to the random access memory (925) of the computer (130). The random access memory auxiliary (952) has direct access (see the third double-headed arrow line (954)) to the encryption/decryption key (103). Optionally, the central processing unit (905) of the computer (130) has a direct access connection (see the twenty-first single-headed arrow line (906)) to the encryption/decryption key (103).

Also, the device-with-encryption-decryption-key (100) may be incorporated into the random access memory auxiliary (952). When it is, then there will be no need to disable the device-with-encryption-decryption-key (100) after the reading the copy of the encryption/decryption key (103) which is stored at the latch memory (111) of the device-with-encryption-decryption-key (100). Or if the device-with-encryption-decryption-key (100) is incorporated into the random access memory auxiliary (952) then the latch memory (111) may not be present and the device-with-encryption-decryption-key (100) may only have the first-non-transitory computer storage medium (104).

The random access memory auxiliary (952) also may be used to encrypt/decrypt software files to derive digital-DNA, as well.

The random access memory auxiliary (952) and central processing unit (905) may be integrated into a single unit.

It may also be implemented where the central processing unit (905) has a smart random access memory controller comprising the random access memory auxiliary (952) integrated into it.

Executing Injected Code from Random Access Memory

Figure 19:
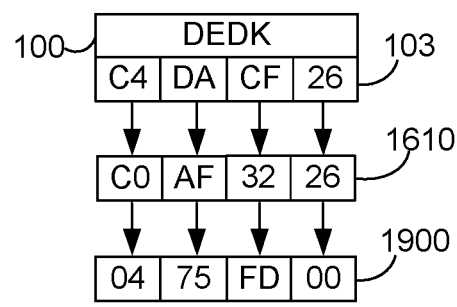
FIG. 19 illustrates the disabling of the hacker's random access memory injected code.

FIG. 19 illustrates what happens once the hacker's code (1550), which is un-encrypted (e.g., represented as hacker's code equivalent (1610)), is injected into the random access memory (925). Since the behavior of the random access memory auxiliary (952) is to decrypt digital-DNA code (also known as encrypted program code) from the random access memory (925) before returning it to the central processing unit (905), once a request for the execution of the hacker's code equivalent (1610) arrives at the central processing unit (905) of the computer (130) and the random access memory auxiliary (952) gets to it, the random access memory auxiliary (952) using the encryption/decryption key (103) will decrypt the hacker's code equivalent (1610) turning it into unusable code and is essentially a jumbled-hacker's-code (1900) which the central processing unit (905) cannot execute.

Once the central processing unit (905) tries and fails to execute the jumbled-hacker's-code (1900), the central processing unit (905) disables the jumbled-hacker's-code (1900) in the random access memory (925), generating an interrupt error. The operating system (120) generates an error to the user, ending the execution of the jumbled-hacker's-code (1900), thus preventing the action intended to be implemented by the hacker's code (1550). Alternatively, this operation may be performed without the random access memory auxiliary (952). A software driver (935) running on the random access memory (925) may be employed to perform the same functionality of performing the modulus operation with the length of the encryption/decryption key (103) and the intended location address of the random access memory (925) then using the byte retrieved from the encryption/decryption key (103) to encrypt/decrypt software code from the random access memory (925). Or it may be that the macro operating system (955) (see FIG. 9), if present, be used to perform the modulus operation and/or the encryption/decryption of data and/or executable program code for the central processing unit (905), thus, increasing the computer (130) operational speed. The macro operating system (955) may be executed by the random access memory auxiliary (952), or by a separate processing unit working in conjunction with the central processing unit (905).

Operating System Loading of the Prior Art

Figure 20:
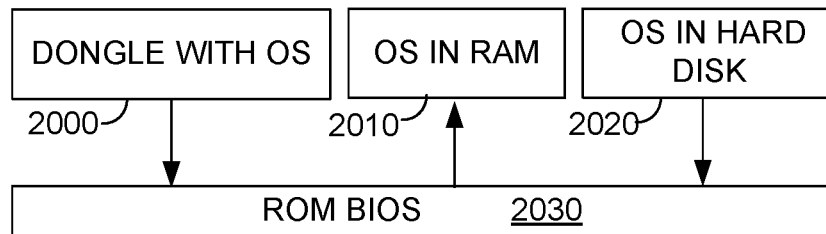
FIG. 20 illustrates the loading of the operating system of the prior art.

FIG. 20 illustrates loading the operating system as currently performed in the art once a computer is first turned on. There are essentially two methods of loading the operating system. In the first method, at the computer's power up, the ROM-BIOS (2030) loads the operating system stored in the computer's hard disk (2020) for execution into the random access memory (see FIG. 20 OS IN RAM (2010)).

In the second method, the computer is started via a peripheral attachment, such as a compact disk or a dongle (2000) that holds the operating system. When the compact disk or the dongle (2000) is connected to the computer at the time of startup, the ROM-BIOS (2030) first accesses the dongle (2000) and determines whether or not an operating system is present and properly configured on the dongle (2000). If the operating system is present in the compact disk or the dongle (2000) and properly configured, then at the computer's power up, ROM-BIOS (2030) loads the operating system from the compact disk or the dongle (2000) and stores it for execution in the random access memory of the computer (see FIG. 20 OS IN RAM (2010)).

The obvious disadvantages of the prior art's loading of the operating system from the dongle (2000) is that, once the operating system is loaded into random access memory, whatever computer virus is present on the compact disk or the dongle (2000), will automatically be loaded into the computer on the random access memory along with the operating system. And once there, the computer virus proceeds and infect the computer. Once such virus infects the operating system on computer's hard disk (2020), then it is possible for the virus to be executed first, before executing the operating system. Basically, when this happens, the virus takes control of the computer before the operating system in the computer's hard disk (2020) is even loaded.

Operating System Loading

Figure 21:
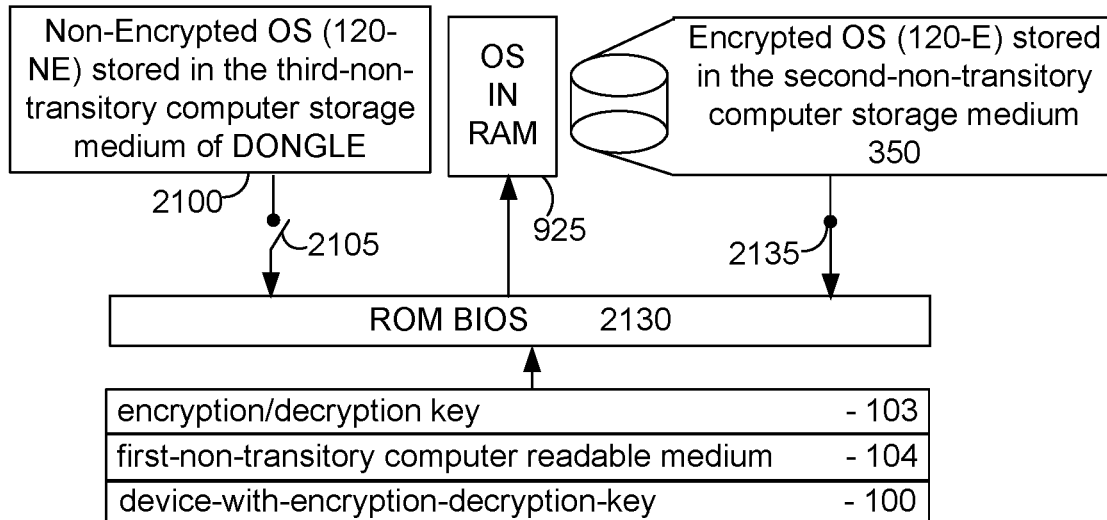
FIG. 21 illustrates the loading of the main operating system utilizing a method disclosed herein.

FIG. 21 illustrates a preferred embodiment with the loading of the operating system using the new methods disclosed herein. An attached dongle has a first switch (2105) which if closed, indicates to the basic input/output system (2130) to load the operating system stored in the third-non-transitory computer storage medium of the dongle. The operating system on second-non-transitory computer storage medium (350) of the computer (130) also has a second switch (2135) which if closed, indicates to the basic input/output system (2130) to load the operating system stored in the second-non-transitory computer storage medium (350) of the computer (130).

As per the illustration in FIG. 21, the first switch (2105) is turned off (i.e., opened) and the second switch (2135) is turned on (i.e., closed). In this illustration, the basic input/output system (2130) using the encryption/decryption key (103), reads the encrypted operating system (120-E) from the second-non-transitory computer storage medium (350) of the computer (130) and decrypts the encrypted operating system (120-E) using the encryption/decryption key (103) deriving the operating system (120), then stores the operating system (120) that has been decrypted in the random access memory (925) of the computer (130).

In an alternative embodiment, the basic input/output system (2130) loads the encrypted operating system (120-E) into the random access memory (925) of the computer (130). Then, once the central processing unit (905) is instructed to execute the encrypted operating system (120-E), the basic input/output system (2130) (or the random access memory auxiliary (952)) using the encryption/decryption key (103) performs the decryption using the same mechanism with the use of the modulus, as has been explained in the discussion above relating to FIG. 18. Alternatively, the basic input/output system (2130) loads the encrypted operating system (120-E) into random access memory (925) and decryption is performed by the random access memory auxiliary (952), as has been explained in the discussion above relating to FIG. 18.

Figure 22:
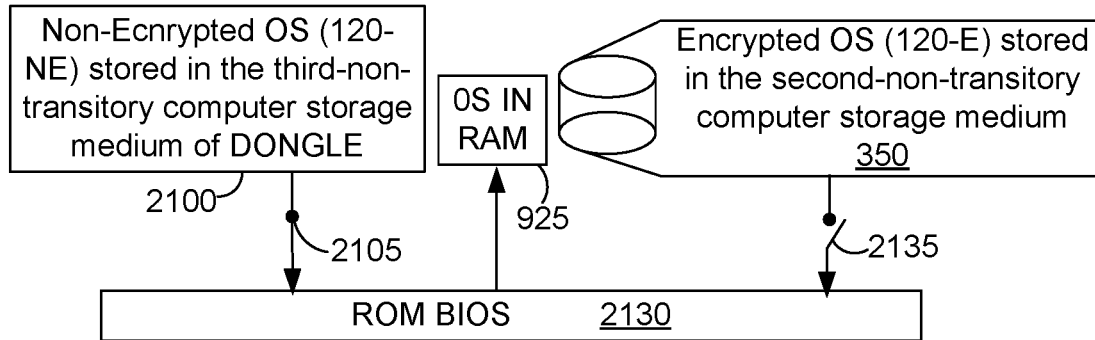
FIG. 22 illustrates the loading of the operating system from a dongle of an embodiment.

FIG. 22 illustrates a preferred embodiment of the new method disclosed herein, once the first switch (2105) is turned on connecting the dongle to the basic input/output system (2130) and second switch (2135) is turned off, disconnecting the ability of the encrypted operating system (120-E) to be loaded from second-non-transitory computer storage medium (350) of the computer (130). In this arrangement, the basic input/output system (2130) turns off/disconnects the device-with-encryption-decryption-key (100) from the computer (as per the illustration in FIG. 22, the device-with-encryption-decryption-key (100) is not present), therefore, not allowing any program from the dongle to read the encryption/decryption key (103).

There are two ways of implementing the basic input/output system (2130) handling of the dongle. The first, it may be implemented such that the basic input/output system (2130) wouldn't allow the operating system stored in the third non-transitory computer storage medium (2100) to be loaded.

In the second way, the basic input/output system (2130) allow the operating system stored in the third non-transitory computer storage medium (2100) of the dongle to be loaded into the random access memory (925) of the computer (130). If the second arrangement is implemented, and if the dongle happens to be infected by a computer virus, and if the computer virus infects the computer. And as taught before, once the computer is powered up and loading of the operating system of FIG. 21 takes place, the virus will be disabled because it is not encrypted. If the computer virus happens to be an operating system infector and infects the operating system (120) stored in the second-non-transitory computer storage medium (350) of the computer (130), then once the computer (130) is restarted with the arrangement of FIG. 21, the computer virus will be disabled because the encrypted operating system (120-E) stored in the second-non-transitory computer storage medium (350) of the computer (130) is encrypted and the operating system loader software routines will work normally because it will get decrypted by the basic input/output system (2130), but the infecting virus code will be disabled because it lacks encryption and once the basic input/output system (2130) decrypts it, it becomes gibberish.

It is preferably that only one switch be closed at once, either first switch (2105) or second switch (2135): If one is on, the other is off. In preferred embodiments, both switches are not closed or opened at the same time. It is possible that a single switch be used, if it is on, load one operating system, if is off, load the other operating system.

A dongle has been illustrated, but it can be a compact disk in a compact disk reader or any other plugin device attached to the computer and accessible by the basic input/output system.

Also, the encrypted operating system (120-E) stored in the second-non-transitory computer storage medium (350) of the computer (130) typically is the primary operating system, the attached operating system on the dongle is typically the secondary operating system.

The first switch (2105) and the second switch (2135) may be mechanical or electronic. If mechanical, the switch will be set manually. If electronic, the switch may be set manually or by a software.

The basic input/output system (2130) is any software (whether embedded or not) which the central processing unit (905) of the computer (130) uses at the startup to decrypt the encrypted operating system (120-E) stored in the second-non-transitory computer storage medium (350) of the computer (130) deriving the operating system (120) and load the operating system (120) into random access memory (925) of the computer (130), or to load operating system stored in the third non-transitory computer storage medium (2100) of the dongle into the random access memory (925) of the computer (130) and disable the device-with-encryption-decryption-key (100). The basic input/output system (2130) may be part of the computer (130), or in the central processing unit (905), or stored in a ROM (e.g., the basic input/output system (2130)), flash memory, Electrical Erasable Programmable Read Only Memory, etc.

Comparison Between a Computer and a Human being

The new method and device disclosed herein may also be illustrated by comparison between the computer (130) and a human being. The computer (130) may be compared to a human body in the sense that a computer virus adversely affects the normal operation of a computer and a human infecting virus adversely affects the health of the human being.

Figure 23:
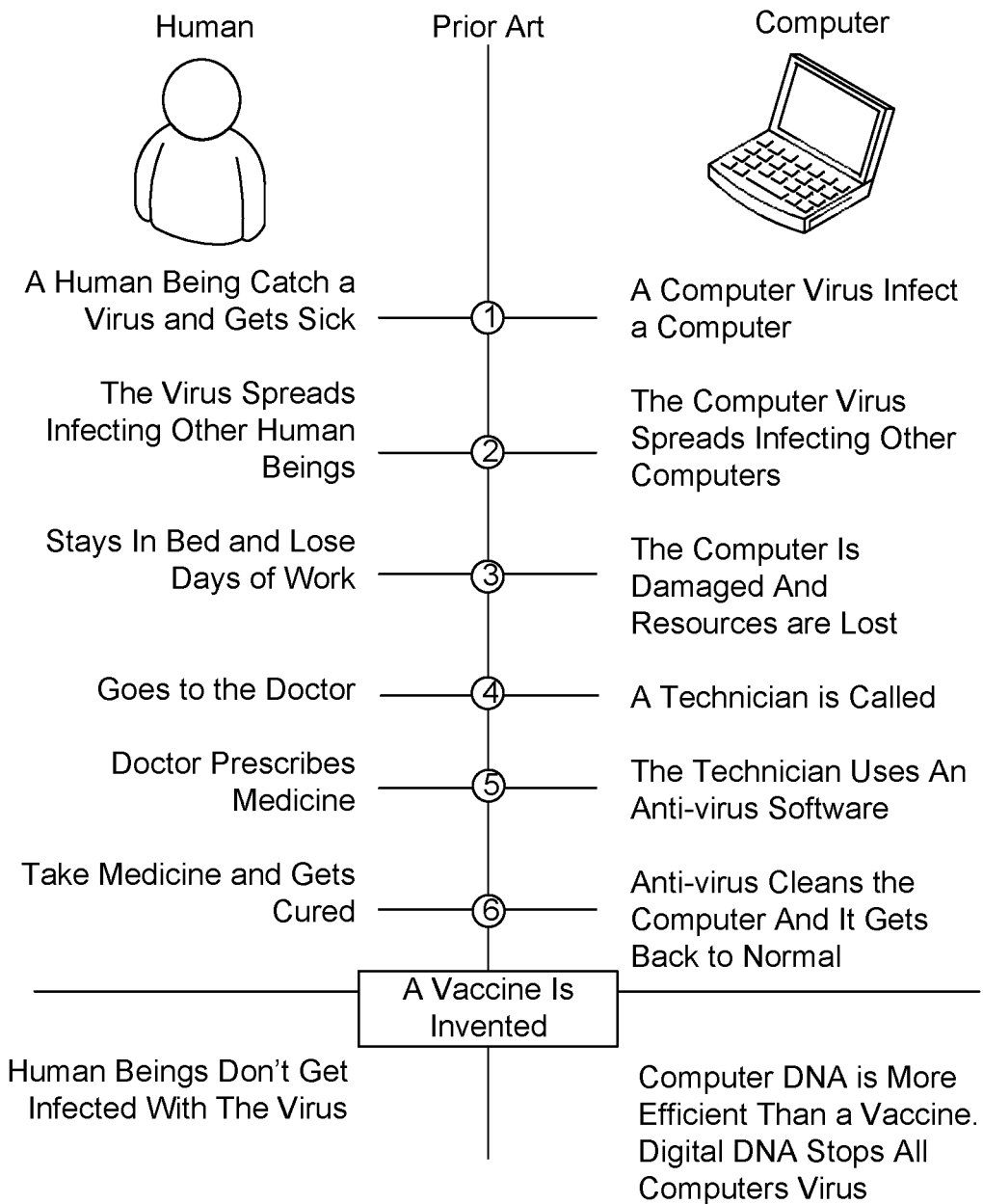
FIG. 23 illustrates the comparison between a human body and a computer.
Figure 25:
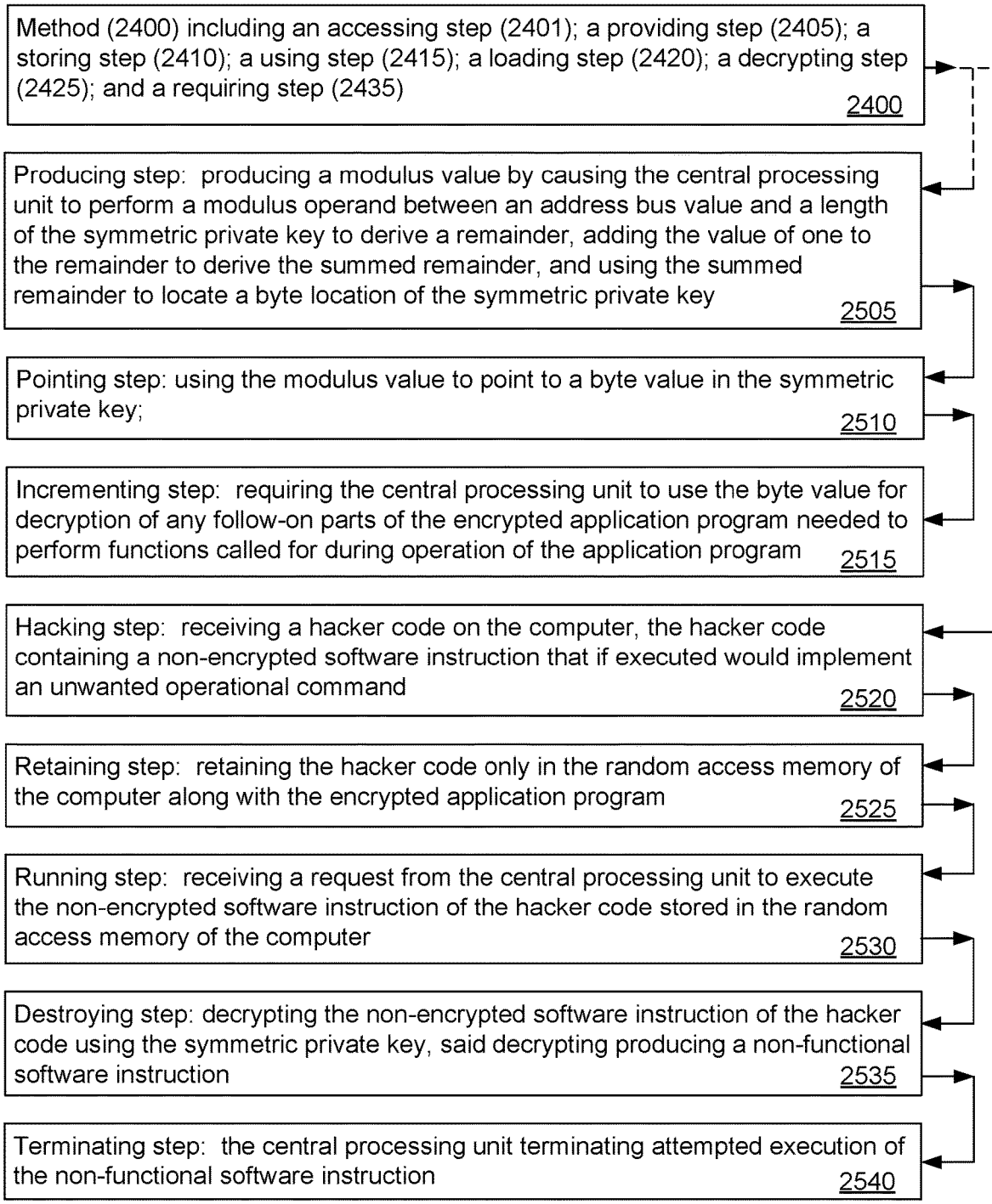
FIG. 25 diagrams optional additional steps the method for preventing a hacker code from infecting an application program on a computer.
Figure 26:
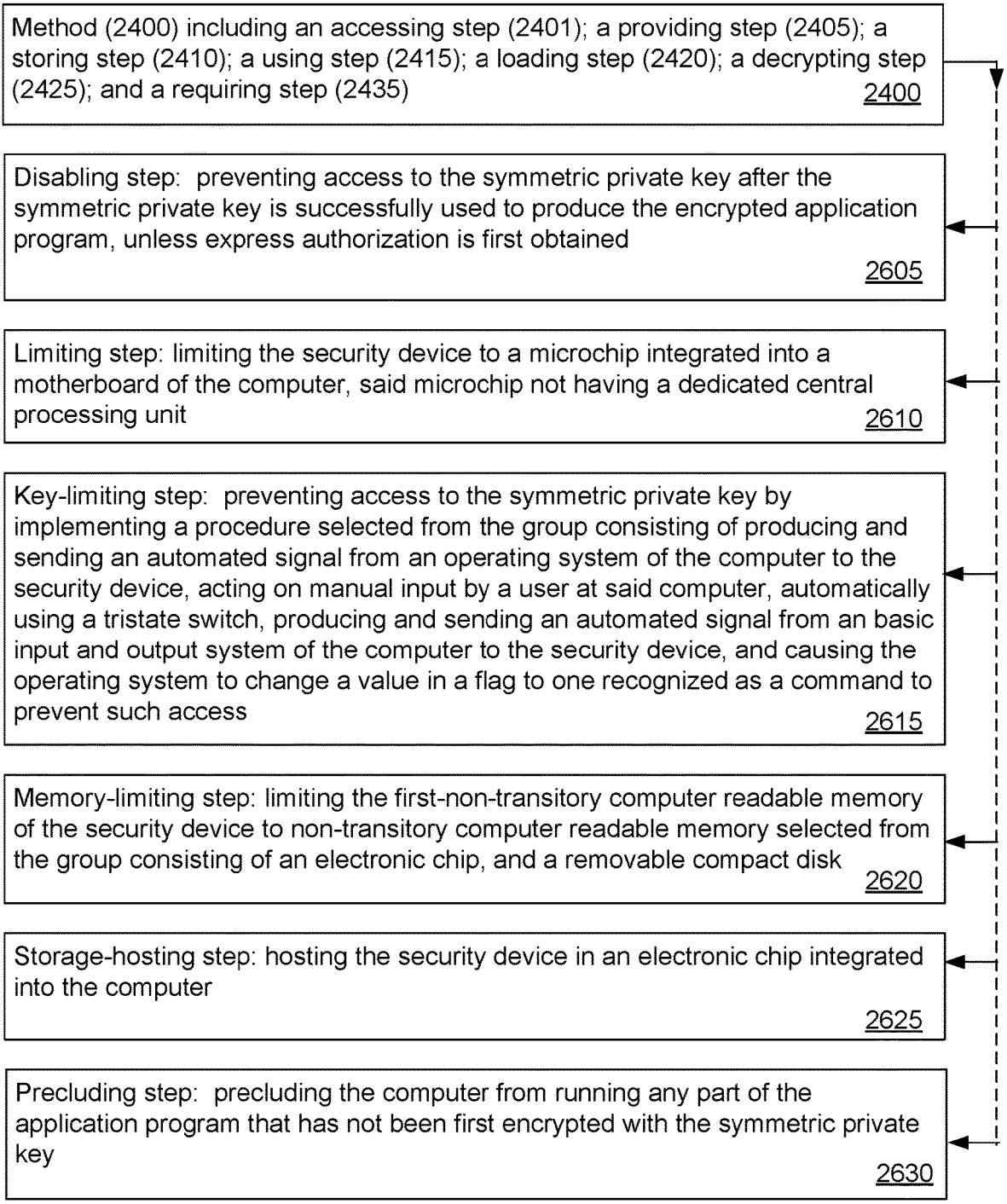
FIG. 26 diagrams further optional additional steps the method for preventing a hacker code from infecting an application program on a computer.
Figure 27:
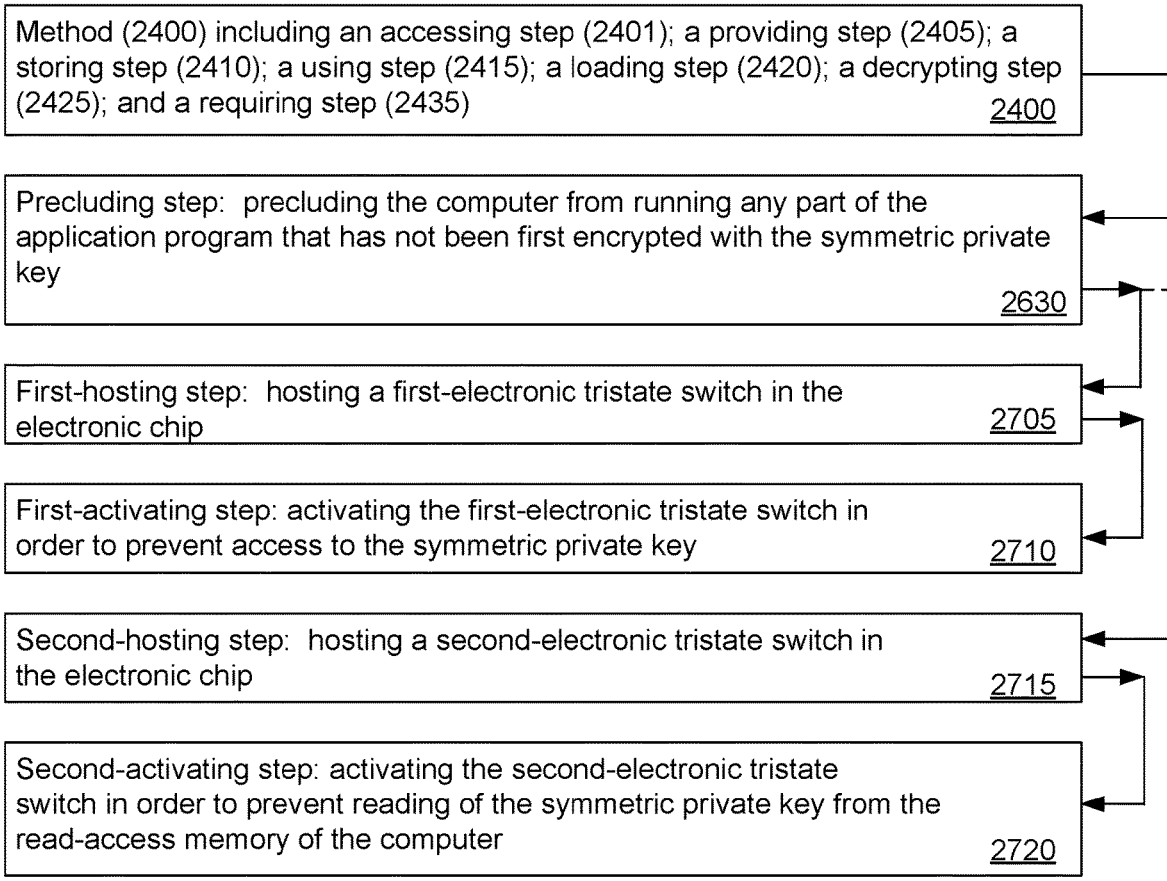
FIG. 27 diagrams more optional steps the method for preventing a hacker code from infecting an application program on a computer.

FIG. 23 illustrates such comparison. First, making the comparison with the prior art, then at the very end, with a preferred embodiment. On the left is a human, and on the right a computer.

Step (1): A human catches a virus—a computer catches a computer virus.

Step (2): The human virus spreads to other humans—a computer virus spreads to other computers.

Step (3): An infected human stay in bed and loses days of work—an infected computer isn't able to fully perform.

Step (4): A sick human goes to a doctor—a computer technician pays a visit to an infected computer.

Step (5): The doctor prescribes medication to the sick human—the technician runs an antivirus software in the infected computer. And, Step (6): The human takes the prescribed medicine and gets healed—the antivirus cleans the computer and the computer gets back to normal operation.

Once a vaccine is invented to combat the virus, the virus no longer affects the human—the devices and methods disclosed herein are more potent than a vaccine. A vaccine stops only one the virus it was designed to stop. But the digital-DNA once applied in the computer, computer viruses of all kind can no longer affect the computer.

CONCLUSION

The processes for enabling computer virus prevention as disclosed herein are preferably performed by a combination of hardware and software. If a virus is injected into a computer possessing the device-with-encryption-decryption-key (100), it is injected in an unencrypted form into the computer's digital-DNA, which is encrypted. In order to be run on the computer, the virus would necessarily be run through a decryption step using the encryption/decryption key (103) for decryption of the computer virus turning it into gibberish. This destroys the operability of the virus before the virus can be executed.

The method and devices disclosed do not require specially-designed software application programs. Therefore, the same operational application programs in their original un-encoded state could be used at any computer. However, each operational application program installed using the method and devices disclosed herein is installed to an encrypted state, i.e. what is termed, the digital-DNA (300) of the computer (130).

The methods and devices disclosed herein will work on any operational application program as long as the computer (130) has access to the device-with-encryption-decryption-key (100).

When the operational application program in its encrypted state is executed in a computer with the device-with-encryption-decryption-key (100), the encryption/decryption key (103) is used to first decrypt what is needed to execute the operational application program.

Preferred methods and devices disclosed herein only require a single encryption key (e.g., the encryption/decryption key (103)) for all operational application programs, which must be installed using the device-with-encryption-decryption-key (100). A single key is needed for every installed operational application program, not a plurality of encryption keys for installed programs. Further, this single key is kept hidden and unavailable from any running process, and is only available to authorized software.

The encryption/decryption key (103) is a private key system (which is symmetrical) for encrypting and decrypting, not a public-key-system (asymmetrical) where a private key is used for encryption and a public key is used for decryption. If a public-key-system were to be used, the private key will be the one used for encrypting the software code and the public-key will be used by the computer to do the decrypting the encrypted software code. Anyone possessing the private-key will be able to encrypt virus program and the encrypted virus program will be decrypted in the computer since the computer uses the public-key for decryption. Therefore, the public-key-system allows a computer virus to be introduced into the computer.

The encryption/decryption key (103) is not stored on the computer's hard disk, since, if the key were to be stored in the computer's hard disk, anyone could then copy it and then use it to encrypt a software virus to run in the computer or use it to encrypt a code to be injected into a running process of the computer.

In either case: use of a public key or a key stored in the computer's hard disc, would increase the potential for viral infection and loss of the computer's security.

Preferred methods and devices disclosed herein execute software code that has been converted to the computer's digital-DNA. If an un-encoded program is present in the computer as software file, the file will not be executed by the central processing unit (905) of the computer (130). Or, if the executable software code is un-encoded process in the random access memory (925) of the computer (130), the central processing unit (905) will not execute it. This functionality only happens because the behavior of the operating system (120) and central processing unit (905) change from what it would otherwise be using current computer methodology and technology.

In a preferred embodiment, before the operating system (120) loads a software file into the random access memory (925) of the computer (130), it will decrypt it, and if it doesn't have a valid digital-DNA format, the operating system (120) will not load it into the random access memory (925) of the computer (130). If it has a valid digital-DNA format, the operating system (120) will load the encrypted version, i.e. digital-DNA (300). The same is true for un-encoded software code loaded into the random access memory (925) of the computer (130), once it gets decrypted it will be in a format not known to the central processing unit (905). The operating system (120) designates if it has a valid format by reading the optional-header-identification-code (320) part of the encrypted software code, i.e. the digital- DNA (300), if the optional-header-identification-code (320) is present and valid, then the operating system (120) loads the code.

In another embodiment, the operating system (120) decrypts the digital-DNA (300), i.e. the first-encrypted software program, and loads it into the random access memory (925) of the computer (130), and if prior to decryption, the software happens to be an un-encoded version, it will become encrypted and therefore the computer will not run it.

Preferred methods and devices disclosed herein operate automatically without requiring user's intervention to insert an encryption and/or a decryption key for the operating system's encryption/decryption operation, or to supply a user's identification and/or password for the operation of the encryption/decryption. And without requiring the use of a dedicated central processing unit within the device-with-encryption-decryption-key to: manage the enabling or disabling of the device-with-encryption-decryption-key (100); or to enable or disable the encryption/decryption key (103) within the device-with-encryption-decryption-key (100); or to move code (which may be executable or data) from one storage location to another within the device-with-encryption-decryption-key (100); or to move the encryption/decryption key (103) from one storage location to another within the device-with-encryption-decryption-key (100); or requiring the user to manually perform the encryption/decryption of the operating system symmetric private key.

Preferably, the device-with-encryption-decryption-key (100) is easy to build and of low cost, without downgrading the device with the security of the device-with-encryption-decryption-key (100) and doesn't require separate computer code for its operation.

Preferably, the central processing unit (905) does the requests for data/code to be read from or stored to the random access memory (925), but does not do the actual encryption/decryption. The encryption/decryption is done by a chip or software which is not part of current central processing unit's architecture nor is it necessary for the central processing unit's functioning as currently implemented into central processing unit's technologies.

It is within the scope of the present disclosure that non-preferred methods and devices may be implemented into the central processing unit (905) to be designed in the future, and the encryption/decryption may be done by the actual central processing units. If implemented into the central processing unit, then the encryption/decryption key (103) may be part of the central processing unit, like registers are part of every central processing unit, and the encryption/decryption key (103) may be stored into special register inside the central processing unit.

If implemented into the central processing unit (905), preferably an embedded macro operating system (955) or similar program does the encryption/decryption operations in behalf of the central processing unit (905), freeing the central processing unit (905) from the modulus operations which can be resource intensive, thus, speeding the operation of the computer (130)

The disclosure that the central processing unit (905) is doing the encryption/decryption should be interpreted broadly to include a combination of the central processing unit (905), the random access memory auxiliary (952), and/or the embedded macro operating system (955). Or a combination of the central processing unit (905), a memory management controller, and/or the embedded macro operating system (955). If the device-with-encryption-decryption-key (100) is implemented at the memory management controller. Or a combination of the central processing unit (905) and any other program (e.g., operating system, or driver, or basic input/output system, or embedded macro operating system (955)), or computer chip used to work in synchrony with the central processing unit (905) doing the encryption of code sent by the central processing unit (905) to be stored in the random access memory (925) of the computer (130), or doing the decryption of encrypted executable code or data stored in the random access memory (925) of the computer (130).

Preferred methods and devices disclosed herein may be implemented with an API (the acronym stands for Application Program Interface) where a program platform like a code interpreter interpreting executable code (or any other kind of program), e.g. PHP, ASP.NET, JSP, etc., the platform program takes a decrypted file-code and passes to the API and the API using the encryption/decryption key (103) encrypts the file and sends it back to the platform, or the platform sends an encrypted file-code and receives a decrypted one.

The term "computer" or the term "server" are interchangeable and are broadly defined so that when the computer (130) is used, the server (1510) may be substituted therefor, and vice versa.

It was mentioned throughout the disclosure the encryption/decryption key (103), it is to be broadly interpreted to mean that the encryption/decryption key (103) is stored in the non-transitory memory cells of the first-non-transitory computer storage medium (104) of the device-with-encryption-decryption-key (100) and also to be broadly interpreted to include copied encryption/decryption key (120-A) under the control of the operating system (120). It has been mentioned the copied encryption/decryption key (110), it is to be broadly interpreted to mean that the copied encryption/decryption key (110) is stored in the latch memory cells of the latch memory (111) of the device-with-encryption-decryption-key (100), or under the control of the operating system (120) as copied encryption/decryption key (120-A).

Whenever the following abbreviations appear in the drawings or in the disclosure they stand for: RAM=Read Access Memory; OS=Operating System; ROM=Read Only Memory; I/O=Input and Output; Encryption/Decryption Key=Symmetric Encryption/Decryption Key; and, BIOS=Basic Input Output System.

Whenever the term encryption/decryption key is used it is to be broadly interpreted to include symmetric encryption/decryption key. Whenever the term device private key is used it is to be broadly interpreted to include device symmetric private key. The above-described embodiments including the drawings are examples that provide illustrations of a variety of embodiments using the methods and devices disclosed herein. Other embodiments will be obvious to those skilled in the art. Thus, the scope of the invention is determined by the appended claims and their legal equivalents rather than by the examples given.

Whenever the term 'random access memory of the computer' is used, it is to be broadly interpreted to include any random access memory which is necessary for the operation of the computer and including the random access memory utilized by the central processing unit of the computer.

The macro operating system (955) is to be broadly interpreted to include any embedded software which works with the central processing unit (905) or the random access memory auxiliary (952) to perform encryption and/or decryption operation in the computer (130).

INDUSTRIAL APPLICABILITY

The invention has application to the computer industry.

What is claimed is:

1. A method for preventing hacker code from infecting an application program, the method comprising the steps of:
    accessing a computer comprising a second-non-transitory computer storage medium; a random access memory; an address bus; a central processing unit; and an operating system, the operating system stored in the second-non-transitory computer storage medium of the computer;
    providing a security device comprising a first-non-transitory computer storage medium, said security device being a separate unit from components necessary to operate the computer;
    storing a symmetric private key on the security device, the symmetric private key being symmetric in that it is usable for encryption and decryption of the application program stored in the random access memory of the computer;
    using the symmetric private key to produce an encrypted application program upon first installation of the application program on the computer, the encrypted application program comprising encrypted operational instructions needed to run the application program, such that after such first installation, the encrypted application program is the only installed version of the application program on the computer;
    upon receiving a command on the computer to run the application program:
        loading the encrypted application program into the random access memory of the computer;
        requiring the central processing unit to decrypt, using the symmetric private key, that part of the encrypted application program needed implement the command to run the application program; and
        requiring the central processing unit to decrypt, on the fly, only those follow-on parts of the encrypted application program needed to perform functions called for during operation of the application program.

2. The method of claim 1, further comprising the step of precluding the computer from running any part of the application program that has not been first encrypted with the symmetric private key.

3. The method of claim 1, further comprising the steps of:
    producing a modulus value by causing the central processing unit to perform a modulus operand between an address bus value and a length of the symmetric private key to derive a remainder, adding a value of one to the remainder deriving an added remainder, using the added remainder to locate a byte location of the symmetric private key;
    using the modulus value to point to a byte value in the symmetric private key;
    requiring the central processing unit to use the byte value for decryption of any follow-on parts of the encrypted application program needed to perform functions called for during operation of the application program.

4. The method of claim 1, further comprising the steps of:
    receiving a hacker code on the computer, the hacker code containing a non-encrypted software instruction that if executed would implement an unwanted operational command;
    retaining the hacker code only in the random access memory of the computer along with the encrypted application program;
    receiving a request from the central processing unit to execute the non-encrypted software instruction of the hacker code stored in the random access memory of the computer;
    decrypting the non-encrypted software instruction of the hacker code using the symmetric private key, said decrypting producing a non-functional software instruction; and
    the central processing unit terminating attempted execution of the non-functional software instruction.

5. The method of claim 1, further comprising the step of preventing access to the symmetric private key after the symmetric private key is successfully used to produce the encrypted application program, unless express authorization is first obtained.

6. The method of claim 1, further comprising the step of limiting the security device to a microchip integrated into a motherboard of the computer, said microchip not having a dedicated central processing unit.

7. The method of claim 1, further comprising the step of preventing access to the symmetric private key by implementing a procedure selected from the group consisting of producing and sending an automated signal from an operating system of the computer to the security device, acting on manual input by a user at said computer, automatically using a tristate switch, producing and sending an automated signal from an basic input and output system of the computer to the security device, and causing the operating system to change a value in a flag to one recognized as a command to prevent such access.

8. The method of claim 1, further comprising the step of limiting the first-non-transitory computer storage medium of the security device to that selected from the group consisting of an electronic chip, and a removable compact disk.

9. The method of claim 1, further comprising the step of hosting the security device in an electronic chip integrated into the computer.

10. The method of claim 9, further comprising the steps of:
    hosting a first-electronic tristate switch in the electronic chip; and
    activating the first-electronic tristate switch in order to prevent access to the symmetric private key.

11. The method of claim 9, further comprising the steps of:
    hosting a second-electronic tristate switch in the electronic chip; and
    activating the second-electronic tristate switch in order to prevent reading of the symmetric private key from the random access memory of the computer.

* * * * *